United States Patent
Huang et al.

(10) Patent No.: US 8,374,859 B2
(45) Date of Patent: Feb. 12, 2013

(54) AUTOMATIC ANSWERING DEVICE, AUTOMATIC ANSWERING SYSTEM, CONVERSATION SCENARIO EDITING DEVICE, CONVERSATION SERVER, AND AUTOMATIC ANSWERING METHOD

(75) Inventors: Shengyang Huang, Tokyo (JP); Hiroshi Katukura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 849 days.

(21) Appl. No.: 12/542,170

(22) Filed: Aug. 17, 2009

(65) Prior Publication Data

US 2010/0049517 A1  Feb. 25, 2010

(30) Foreign Application Priority Data

Aug. 20, 2008 (JP) ................. P2008-212190
Jun. 24, 2009 (JP) ................. P2009-150146
Jun. 24, 2009 (JP) ................. P2009-150147

(51) Int. Cl.
| | |
|---|---|
| G10L 15/00 | (2006.01) |
| G10L 21/00 | (2006.01) |
| G10L 21/06 | (2006.01) |
| G10L 13/08 | (2006.01) |
| G10L 13/00 | (2006.01) |
| H04M 3/00 | (2006.01) |
| H04M 11/00 | (2006.01) |
| H04M 1/64 | (2006.01) |

(52) U.S. Cl. ........ 704/231; 704/235; 704/251; 704/270; 704/270.1; 704/275; 704/277; 704/260; 704/258; 379/265.06; 379/88.18; 379/71

(58) Field of Classification Search ................. 704/231, 704/235, 251, 270.1, 270, 275, 277, 260, 704/258; 379/265.06, 88.18, 71
See application file for complete search history.

(56) References Cited

U.S. PATENT DOCUMENTS 5,357,596 A * 10/1994 Takebayashi et al. ........ 704/275
5,577,165 A * 11/1996 Takebayashi et al. ........ 704/275

(Continued)

FOREIGN PATENT DOCUMENTS

| CN | 101075435 A | 11/2007 |
|---|---|---|
| CN | 101122972 A | 2/2008 |

(Continued)

OTHER PUBLICATIONS

Nan Tang; Yu, J.X.; Ozsu, M.T.; Byron Choi; Kam-Fai Wong; , "Multiple Materialized View Selection for XPath Query Rewriting," Data Engineering, 2008. ICDE 2008. IEEE 24th International Conference on , vol., No., pp. 873-882, Apr. 7-12, 2008.*

Douglas R. Smith. Requirement enforcement by transformation automata. In Proceedings of the 6th Workshop on Foundations of Aspect-Oriented Languages, pp. 5-14, 2007.*

(Continued)

*Primary Examiner* — Edgar Guerra-Erazo
(74) *Attorney, Agent, or Firm* — Lexyoume IP Meister, PLLC.

(57) ABSTRACT

An automatic answering device and an automatic answering method for automatically answering to a user utterance are configured: to prepare a conversation scenario that is a set of input sentences and replay sentences, the input sentences each corresponding to a user utterance assumed to be uttered by a user, the reply sentences each being an automatic reply to the inputted sentence; to accept a user utterance; to determine the reply sentence to the accepted user utterance on the basis of the conversation scenario; and to present the determined reply sentence to the user. Data of the conversation scenario have a data structure that enables the inputted sentences and the reply sentences to be expressed in a state transition diagram in which each of the inputted sentences is defined as a morphism and the reply sentence corresponding to the inputted sentence is defined as an object.

14 Claims, 60 Drawing Sheets

U.S. PATENT DOCUMENTS

| | | | |
|---|---|---|---|
| 6,240,406 B1* | 5/2001 | Tannen | 1/1 |
| 6,324,513 B1* | 11/2001 | Nagai et al. | 704/275 |
| 6,341,372 B1* | 1/2002 | Datig | 717/136 |
| 6,882,723 B1 | 4/2005 | Peterson et al. | |
| 7,319,951 B2* | 1/2008 | Rising et al. | 704/9 |
| 7,720,684 B2* | 5/2010 | Huerta et al. | 704/257 |
| 8,065,148 B2* | 11/2011 | Huerta et al. | 704/257 |
| 2002/0059563 A1* | 5/2002 | Pavlovic et al. | 717/137 |
| 2002/0198697 A1* | 12/2002 | Datig | 704/1 |
| 2004/0098253 A1 | 5/2004 | Balentine et al. | |
| 2005/0138600 A1* | 6/2005 | Pavlovic et al. | 717/104 |

FOREIGN PATENT DOCUMENTS

| | | |
|---|---|---|
| EP | 2157570 | 8/2009 |
| GB | 2408170 | 5/2005 |
| JP | 2002-366190 | 12/2002 |
| WO | 00/65814 | 11/2000 |
| WO | 2006/031609 | 3/2006 |

OTHER PUBLICATIONS

Cortes, C.; Haffner, P.; Mohri, M.; , "Lattice kernels for spoken-dialog classification," Acoustics, Speech, and Signal Processing, 2003. Proceedings. (ICASSP '03). 2003 IEEE International Conference on , vol. 1, No., pp. I-628-31 vol. 1, Apr. 6-10, 2003.*

Lin et al., (1999). "A distributed architecture for cooperative spoken dialogue agents with coherent dialogue state and history." In: Proc. Workshop Automatic Speech Recognition and Understanding.*

Chinese Patent Office, Chinese Office Action dated Sep. 26, 2012 of the corresponding CN Patent Application No. 2009101670654.

European Patent Office, Extended European Search Report (EESR) dated Aug. 23, 2012 of the corresponding EP Application No. 09168152.8.

"Talisma CRM", 2009 URL http://www.vitals.co.jp/solution/crm.html (as of Aug. 11, 2009).

European Patent Office, Partial European Search Report, of EP09168152, Apr. 24, 2012.

* cited by examiner

X1 ((OTHER) | (timer)) X2
X1 (NO, I DON'T.) X3 ((OTHER) | (timer)) X2

X1 ((OTHER) | (timer)) X1
X1 (I LIKE IT.) X2
X1 (I DON'T LIKE IT.) X3

FIG. 16

X1 (GIVE ME A CLUE.) X3 (IT'S XX.) X4 (⟨OTHER⟩ | ⟨timer⟩) X2
X1 (⟨OTHER⟩ | ⟨timer⟩) X2
X1 (IT'S XX.) X4
X3 (⟨OTHER⟩ | ⟨timer⟩) X2

FIG. 27

| UTTERED SENTENCE TYPE | | DATA (SENTENCE) EXAMPLE |
|---|---|---|
| DA | DECLARATIVE AFFIRMATIVE SENTENCE | I LIKE SATO. |
| LA | LOCATIONAL AFFIRMATIVE SENTENCE | I LIKE SATO'S SERIOUS FACE WHEN HE IS AT BAT. |
| NA | NEGATIONAL AFFIRMATIVE SENTENCE | I DO NOT WANT TO TALK WITH ANYONE WHO DISLIKES SATO. |
| DQ | DECLARATIVE INTERROGATIVE SENTENCE | DO YOU LIKE SATO ? |
| LQ | LOCATIONAL INTERROGATIVE SENTENCE | HOW DO YOU LIKE SATO AT BAT ? |
| NQ | NEGATIONAL INTERROGATIVE SENTENCE | IT IS NOT TRUE YOU LIKE SATO, IS IT ? |
| ... | ... | ... |

FIG. 28

| DETERMINATION TYPE | USED DICTIONARY |
|---|---|
| DETERMINATION D | DEFINITION EXPRESSION DICTIONARY |
| DETERMINATION N | NEGATIONAL EXPRESSION DICTIONARY |
| ⋮ | ⋮ |

FIG. 31

| TOPIC SPECIFICATION INFORMATION | TOPIC TITLE (SECOND MORPHEME INFORMATION) | | |
|---|---|---|---|
| | FIRST SPECIFICATION INFORMATION 1001 | SECOND SPECIFICATION INFORMATION 1002 | THIRD SPECIFICATION INFORMATION 1003 |
| TOPIC SPECIFICATION INFORMATION (= [SEVEN SAMURAI]) 810D1 | SEVEN SAMURAI  8201 | * 8202 | * INTERESTING |
| | SEVEN SAMURAI | * | INTERESTING |
| | ... | ... | ... |
| TOPIC SPECIFICATION INFORMATION (= [RAN]) 810D2 | RAN  8203 | * 8204 | * |
| | RAN | * | INTERESTING |
| | ... | ... | ... |
| TOPIC SPECIFICATION INFORMATION (= [YOJIMBO]) 810D3 | YOJIMBO  8205 | * 8206 | * |
| | YOJIMBO | * | INTERESTING |
| | ... | ... | ... |

FIG. 32

| TYPE | CONTENTS |
|---|---|
| D | DECLARATIVE SENTENCE |
| T | DECLARATIVE SENTENCE INCLUDING TIME CONCEPT SUCH AS "WHEN" |
| L | DECLARATIVE SENTENCE INCLUDING LOCATION CONCEPT SUCH AS "WHERE" |
| N | SENTENCE NEGATING DECLARATIVE SENTENCE |
| ⋮ | ⋮ |

AUTOMATIC ANSWERING DEVICE, AUTOMATIC ANSWERING SYSTEM, CONVERSATION SCENARIO EDITING DEVICE, CONVERSATION SERVER, AND AUTOMATIC ANSWERING METHOD

CROSS REFERENCE TO RELATED APPLICATIONS

This application is based upon and claims the benefit of priority from the prior Japanese Patent Application No. 2008-212190 filed on Aug. 20, 2008, the prior Japanese Patent Application No. 2009-150146 filed on Jun. 24, 2009 and the prior Japanese Patent Application No. 2009-150147 filed on Jun. 24, 2009, the entire contents of which are incorporated herein by reference.

BACKGROUND OF THE INVENTION

1. Field of the Invention

The present invention relates to an automatic answering device, a conversation scenario editing device, a conversation server, an automatic answering system, and an automatic answering method. More specifically, the present invention relates to: an automatic answering device, an automatic answering system and an automatic answering method which are capable of automatically outputting an answer in response to an utterance of a user in accordance with a conversation scenario and thereby establishing a conversation with the user; a conversation scenario editing device for generating and editing a conversation scenario used by the automatic answering device and the automatic answering system; and a conversation server for the automatic answering device and the automatic answering system.

2. Description of the Related Art Japanese Patent Application Publication No. 2002-366190 discloses an automatic conversion device configured to output an answer corresponding to a content of an utterance upon receipt of the utterance from a user. This related automatic conversation device generally adopts a method of outputting an answer corresponding to an utterance of a user by using, or more specifically searching, a database in which each of utterances of users and an answer corresponding to the utterance are stored as a pair.

However, in the method adopted by the related automatic conversion device to output the answer corresponding to the utterance of the user on the basis of a one-to-one relationship, it is difficult to establish a natural conversation about a certain topic between the user and the automatic conversation device, or to realize a situation in which a content with a certain story prepared in advance (such as explanation of a structure of a system or description of emergency care) is spoken little by little to the user by using the automatic conversation device.

As a technique for establishing such natural conversations, there has been disclosed a technique using a scenario which enables conversations to proceed in accordance with a previously prepared course of conversations while answering utterances from a user. However, only a KB (knowledge-base) engineer with expertise is able to produce such a scenario.

Meanwhile, the distribution of commodities and services through networks has been expanded with diffusion and development of communication networks and network communication devices. In this regard, customer relation services (services to offer answers or advice in response to requests from customers, including support services, for example) have begun to be provided to customers by service providers through networks.

In an aspect of a customer relation service through a network, there has been a service in a FAQ (frequently asked question) mode provided on a homepage or a service in an offline mode provided in a form of an electronic mail. However, such a service has not been satisfactory due to an incapability of real-time correspondence. In this context, a customer relation service in a real-time chat mode has been disclosed with a title "Talisma CIM" by Vital Information Inc. This is a service in which an operator called an agent provides an answer to a question from a customer in a chat mode while utilizing a database called an online Q&A search system (Talisma Knowledge Management).

However, the customer relation service in the above-described related mode requires costs for a database professional to prepare and offer a database for chat operators for each business, and the required costs are as high as costs for conventional manuals for telephone services. Accordingly, this service cannot exert remarkable superiority in light of reduction of labor costs in the running costs.

SUMMARY OF THE INVENTION

An object of the present invention is to provide an automatic answering device, an automatic answering system, and an automatic answering method which allow conversations to proceed in accordance with a course of a conversation scenario prepared in advance, while answering to utterances by a user, a conversation scenario editing device which allows a person having no professional knowledge to generate and edit the conversation scenario used by the automatic answering device and the automatic answering system, and a conversation server for the automatic answering device and the automatic answering system.

Another object of the present invention is to provide an automatic answering device, an automatic answering system, an automatic answering method, a conversation scenario editing device, and a conversation server which are capable of satisfying customers by answering to the customers in real time, while suppressing cost increases for chat operators and preparation for a database to be used by the chat operators.

A first aspect of the present invention is an automatic answering device configured to answer automatically to a user utterance, the automatic answering device comprising: an input unit configured to accept a user utterance; and an output unit configured to output a reply sentence in a form recognizable by a user, in response to the user utterance accepted by the input unit, wherein the reply sentence is determined based on a conversation scenario which is a set of inputted sentences and reply sentences, the inputted sentences each corresponding to a user utterance assumed to be uttered by the user, the reply sentences each being a reply from the automatic answering device to the inputted sentence, and data of the conversation scenario have a data structure that enables the inputted sentences and the reply sentences to be expressed in a state transition diagram in which each of the inputted sentences is defined as a morphism and the reply sentence corresponding to the inputted sentence is defined as an object.

According to the first aspect of the present invention, it is possible to provide an automatic answering device which allows conversations to proceed in accordance with a course of a conversation scenario prepared in advance, while answering to utterances by a user.

The conversation scenario may include a scenario which describes, as a single morphism, an inputted sentence corresponding to all the user utterances other than a user utterance containing a predetermined content, and any of inputted sentences corresponding to all the user utterances may be linked with any one of the reply sentences in the scenario.

According to the above-described configuration, it is possible to define a reply sentence which can cover infinite user utterances.

The conversation scenario may include a scenario which describes a silent state of the user as a morphism, and an inputted sentence corresponding to a user utterance representing the silent state of the user may be linked with any one of the reply sentences in the scenario.

According to the above-described configuration, it is possible to continue a conversation even in a silent state of a user.

The conversation scenario may include a scenario which describes a composition of a plurality of morphisms as a single morphism, and in the scenario, a reply sentence corresponding to a last morphism of the plurality of morphisms may be identical to a reply sentence corresponding to the single morphism formed of the composition of the plurality of morphisms.

According to the above-described configuration, it is possible to create a course of conversations that leads to an utterance that a doer (an automatic conversation system) adheres to while respecting an utterance of an opponent.

The conversation scenario may include a scenario which describes a morphism representing a unit element that does not allow transition of the object, and in the scenario, an inputted sentence corresponding to a predetermined user utterance may be linked with a reply sentence identical to a reply sentence outputted to the user in a precedent session.

According to the above-described configuration, it is possible to create a course of conversations which enables the doer (the automatic conversation system) to finish speaking an utterance irrespective of an utterance by an opponent (a user).

The conversation scenario may include a scenario which describes a unit element that does not allow transition of the object, the unit element being formed of a composition of a plurality of morphisms and objects which are coupled to each other in a circulating manner, and a closed loop may be formed by the inputted sentences and the reply sentences in the scenario.

According to the above-described configuration, it is possible to create a course of conversations which can continuously urge utterances by the opponent (the user) within a course of closed conversations.

The automatic answering device may further comprise: a conversation process unit configured to transmit the user utterance accepted by the input unit, and to receive the reply sentence corresponding to the transmitted user utterance and operation control information which is information describing an operation to be executed corresponding to the reply sentence by the automatic answering device; and an operation control unit configured to receive the operation control information from the conversation process unit, and to execute the operation in accordance with the received operation control information.

According to the above-described configuration, it is possible to present a reply sentence to a user and execute an operation corresponding to the reply sentence.

The automatic answering device may further comprise: a browser unit configured to receive data of a content, and to allow the user to browse the received content, wherein the operation control unit drives the browser unit to execute processing determined by the received operation control information.

According to the above-described configuration, it is possible to allow the user to view various contents, to perform conversations while viewing the contents, and to acquire marketing information by way of automatic conversations.

The automatic answering device may further comprise: a telephone unit configured to execute an outgoing call, an incoming call, and a telephone call by way of an Internet protocol telephone, wherein the operation control information is information driving the telephone unit to execute connection, continuation, and termination of a telephone call from the user to an opponent, and the operation control unit drives the telephone unit to execute processing determined by the received operation control information.

According to the above-described configuration, it is possible to relay a telephone call between the user and the opponent more automatically.

The automatic answering device may further comprise: a conversation device including the input unit, the output unit, the conversation process unit, and the operation process unit; and a conversation server configured to receive the user utterance from the conversation device, to search for and to determine a reply sentence corresponding to the received user utterance on the basis of the conversation scenario, and to transmit the determined reply sentence to the conversation device, wherein, when the conversation server determines, as a consequence of a search, that the conversation scenario does not includes a reply sentence corresponding to the user utterance accepted from the user, the conversation server transmits the user utterance in order to obtain a reply to the user utterance from an expert, receives data of a reply from the expert corresponding to the transmitted user utterance, transmits the received data of the reply from the expert to the conversation device, transmits a conversation log storing the inputted sentence corresponding to the user utterance, the data of the reply from the expert, and a reply sentence corresponding to the data of the reply from the expert, and receives and stores a conversation scenario generated based on the transmitted conversation log.

According to the above-described configuration, it is possible to deal with inquiries, questions, and the like from customers without using chat operators and also to deal with unexpected questions, complicated questions, and the like to which a conventional system cannot reply.

Moreover, it is possible to provide a customer relation service capable of satisfying customers by answering to the customers in real time, while suppressing cost increases for chat operators and preparation for a database to be used by the chat operators.

A second aspect of the present invention is a conversation scenario editing device comprising: an input unit enabling an operator to input sentences in order to generate a conversation scenario, the sentences including an inputted sentence, a reply sentence, and an inputted sentence corresponding to a user utterance assumed to be uttered by a user in response to the reply sentence, the conversation scenario being a set of inputted sentences and reply sentences, the inputted sentences each corresponding to a user utterance assumed to be uttered by the user to an automatic answering device configured to automatically answer to utterances of the user, the reply sentences each being a reply from the automatic answering device to the inputted sentence, the input unit being configured to receive input from the operator and to output inputted information; an editor unit connected to the input unit and configured to receive the inputted information outputted from the input unit, to generate and edit data as the conversation scenario in response to the received inputted information, and to output the data of the conversation scenario in the course of generation and edition and after completion of generation and edition; a conversation scenario retention unit connected to the editor unit and configured to store the data of the conversation scenario outputted from the editor unit while linking the inputted sentences with the reply sentences, wherein the data of the conversation scenario have a data structure that enables the inputted sentences and the reply sentences to be expressed in a state transition diagram in which each of the inputted sentences is defined as a morphism and the reply sentence corresponding to the inputted sentence is defined as an object; and an output unit connected to the editor unit and configured to output information of the data of the conversation scenario in a form recognizable by the operator, the conversation scenario outputted from the editor unit in the course of generation and edition and after completion of generation and edition outputted from the editor unit, wherein the output unit presents the state transition diagram to the operator in the course of generation and edition and after completion of generation and edition of the conversation scenario, the state transition diagram having a form in which state transition among the inputted sentences and the reply sentences are recognizable, the state transition diagram showing all of destinations and sources of transition of the reply sentences.

According to the second aspect of the present invention, it is possible to provide a conversation scenario editing device which is capable of generating and editing contents of conversations along a course of a conversation scenario prepared in advance while answering to utterances by a user.

For example, the present invention has the following advantages.

- It is possible to define a reply from a system as an object and to define a user utterance as a morphism. That is, it is possible to treat the conversation as state transition.
- It is possible to show all of transition destinations of replies from the system (to read the state transition by using information on the transition destinations).
- It is possible to show all of sources of the replies from the system (to read "compositions and unit elements" by using information on the sources).
- It is possible to show all of reply sequences of the replies from the system (to read scenarios by using the reply sequences)

The conversation scenario editing device may further comprise: a dynamic knowledge generation unit configured to generate dynamic knowledge being data formed by restructuring the conversation scenario so as to allow the automatic answering device to search the conversation scenario to find the morphism corresponding to the inputted sentence and the object corresponding to the morphism at a higher speed and higher efficiency.

According to the above-described configuration, it is possible to search for the morphism corresponding to an inputted sentence and the object in response to this morphism and to output a reply sentence which is the object at a high speed.

A third aspect of the present invention is a conversation server comprising: a semantic interpretation dictionary unit configured to store a semantic interpretation dictionary for rewording a reply sentence corresponding to a user utterance assumed to be uttered by a user to an automatic answering device configured to answer automatically to a user utterance; a conversation scenario storage unit configured to store data of a conversation scenario which is a set of inputted sentences and reply sentences, the inputted sentences each corresponding to a user utterance assumed to be uttered by the user, the reply sentences each being a reply from the automatic answering device to the inputted sentence; and a reply process unit communicatively connected to the automatic answering device and connected to the semantic interpretation dictionary unit and the conversation scenario unit, the reply process unit configured: to receive the user utterance from the automatic answering device; to acquire any of a synonym and a synonymous sentence with the user utterance by making reference to the semantic interpretation dictionary stored in the semantic interpretation dictionary unit; to determine an inputted sentence corresponding to any of the synonym and the synonymous sentence thus acquired, by searching the data of the conversation scenario stored in the conversation scenario storage unit; to generate a reworded reply sentence in a way that a reply sentence linked with the determined inputted sentence is reworded corresponding to the user utterance in reference to the semantic interpretation dictionary unit; and to send the automatic answering device the reworded reply sentence and operation control information which is information describing an operation to be executed corresponding to the reworded reply sentence by the automatic answering device.

According to the third aspect of the present invention, it is possible to provide a conversation server for an automatic answering device which allows conversations to proceed in accordance with a course of a conversation scenario prepared in advance, while answering to utterances by a user.

A third aspect of the present invention is an automatic answering system comprising: an automatic answering device configured to answer automatically to a user utterance and to present, to a user, a reply sentence in response to the user utterance determined based on a conversation scenario; and a conversation scenario editing device configured to generate the conversation scenario for the automatic answering device, wherein the conversation scenario is a set of inputted sentences and reply sentences, the inputted sentences each corresponding to a user utterance assumed to be uttered by the user, the reply sentences each being a reply from the automatic answering device to the inputted sentence, and data of the conversation scenario have a data structure that enables the inputted sentences and the reply sentences to be expressed in a state transition diagram in which each of the inputted sentences is defined as a morphism and the reply sentence corresponding to the inputted sentence is defined as an object.

According to the fourth aspect of the present invention, it is possible to provide an automatic answering system which allows conversations to proceed in accordance with a course of a conversation scenario prepared in advance, while answering to utterances by a user.

The automatic answering system may further comprise: a conversation server configured to receive the user utterance from the automatic answering device, to determine the reply sentence corresponding to the received inputted sentence on the basis of the conversation scenario generated by the conversation scenario editing device, and to transmit the determined reply sentence to the automatic answering device.

According to the above-described configuration, it is possible to determine a reply that is a response to a content of an utterance and operation control information that is information describing an operation corresponding to this reply and is supposed to be executed by the automatic answering device on the basis of a conversation scenario, and to output the reply and the operation control information to the automatic answering device.

When the conversation server determines that the conversation scenario does not includes a reply sentence corresponding to the user utterance accepted from the user, the conversation server may transmit the user utterance in order to obtain a reply corresponding to the user utterance from an expert, receive data of a reply from the expert corresponding to the transmitted user utterance, transmit the received data of the reply from the expert to the conversation device, transmit a conversation log storing the inputted sentence corresponding to the user utterance, the data of the reply from the expert, and a reply sentence corresponding to the data of the reply from the expert, and receive and stores a conversation scenario generated based on the transmitted conversation log.

According to the above-described configuration, it is possible to deal with inquiries, questions, and the like from customers without using chat operators and also to deal with unexpected questions, complicated questions, and the like to which a conventional system cannot reply.

Moreover, it is possible to provide a customer relation service capable of satisfying customers by answering to the customers in real time, while suppressing cost increases for chat operators and preparation for a database to be used by the chat operators.

The automatic answering system may further comprise: an expert side terminal device configured to receive the user utterance accepted from the user from the conversation server, to accept the reply from the expert to the received user utterance, and to transmit the data of the reply from the expert to the conversation server; and a conversation log database configured to receive, from the conversation server, the conversation log including the user utterance and the data of the reply from the expert transmitted from the expert side terminal device, and to store the conversation log, wherein the conversation scenario editing device generates the conversation scenario based on the user utterance and the data of the reply from the expert corresponding to the user utterance in the conversation log stored in the conversation log database, and transmits the generated conversation scenario to the conversation server.

According to the above-described configuration, even in response to a question from a customer to which a system is not able to reply, it is possible to provide a user with a reply that reflects professional knowledge or the like, and to gradually reduce occurrence of situations where the system cannot reply, by means of feeding back contents of replies by professionals as the conversation scenario.

A fifth aspect of the present invention is an automatic answering system configured to answer automatically to a user utterance, comprising: a conversation scenario editing device including: a first input unit configured to enable an operator to input sentences in order to generate a conversation scenario, the sentences including an inputted sentence, a reply sentence, and an inputted sentence corresponding to a user utterance assumed to be uttered by a user in response to the reply sentence, the conversation scenario being a set of inputted sentences and reply sentences, the inputted sentences each corresponding to a user utterance assumed to be uttered by the user, the reply sentences each being a reply, the first input unit being configured to receive input from the operator and to output inputted information; an editor unit connected to the first input unit and configured to receive the inputted information outputted from the first input unit, to generate and edit data as the conversation scenario in response to the received inputted information, and to output the data of the conversation scenario in the course of generation and edition and after completion of generation and edition; a conversation scenario retention unit connected to the editor unit and configured to store the data of the conversation scenario outputted from the editor unit while linking the inputted sentences with the reply sentences, wherein the data of the conversation scenario have a data structure that enables the inputted sentences and the reply sentences to be expressed in a state transition diagram in which each of the inputted sentences is defined as a morphism and the reply sentence corresponding to the inputted sentence is defined as an object; and a first output unit connected to the editor unit and configured to output information of the data of the conversation scenario in a form recognizable by the operator, the conversation scenario outputted from the editor unit in the course of generation and edition and after completion of generation and edition, wherein the first output unit presents the state transition diagram including a reply sequence to the operator in the course of generation and edition and after completion of generation and edition of the conversation scenario, the state transition diagram having a form in which state transition among the inputted sentences and the reply sentences are recognizable, the state transition diagram showing all of destinations and sources of transition of the reply sentences, a conversation device including: a second input unit configured to receive the user utterance and to output the user utterance; a conversation process unit connected to the second input unit and configured to receive the user utterance outputted from the second input unit, to transmit the received user utterance, to receive a reply sentence and operation control information corresponding to the reply sentence, and to output the reply sentence and the operation control information thus received; an operation control unit connected to the conversation process unit and configured to execute a designated operation on the basis of the operation control information outputted from the conversation process unit; and a second output unit connected to the conversation process unit and the operation control unit and configured to output any of the reply sentence outputted from the conversation process unit and a reply sentence designated by the operation control unit in a form recognizable by the user, and a conversation server connected to the conversation process unit, the conversation server including: a semantic interpretation dictionary unit configured to store a semantic interpretation dictionary for rewording the reply sentence corresponding to the user utterance; a conversation scenario storage unit configured to store the data of the conversation scenario generated and edited by the conversation scenario editing device; and a reply process unit communicatively connected to the automatic answering device and connected to the semantic interpretation dictionary unit and the conversation scenario unit, the reply process unit configured: to receive the user utterance from the automatic answering device; to acquire any of a synonym and a synonymous sentence with the user utterance by making reference to the semantic interpretation dictionary stored in the semantic interpretation dictionary unit; to determine an inputted sentence corresponding to any of the synonym and the synonymous sentence thus acquired, by searching the data of the conversation scenario stored in the conversation scenario storage unit; to generate a reworded reply sentence in a way that a reply sentence linked with the determined inputted sentence is reworded corresponding to the user utterance in reference to the semantic interpretation dictionary unit; and to send the automatic answering device the reworded reply sentence and operation control information which is information describing an operation to be executed corresponding to the reply reworded sentence by the automatic answering device.

According to the fifth aspect of the present invention, it is possible to provide an automatic answering system which allows conversations to proceed in accordance with a course of a conversation scenario prepared in advance, while answering to utterances by a user.

A sixth aspect of the present invention is an automatic answering method for automatically answering to a user utterance, the automatic answering method comprising: preparing a conversation scenario which is a set of inputted sentences and reply sentences, the inputted sentences each corresponding to a user utterance assumed to be uttered by the user, the reply sentences each being a reply from the automatic answering device to the inputted sentence, wherein data of the conversation scenario have a data structure that enables the inputted sentences and the reply sentences to be expressed in a state transition diagram in which each of the inputted sentences is defined as a morphism and the reply sentence corresponding to the inputted sentence is defined as an object; accepting a user utterance; determining a reply sentence to the accepted user utterance on the basis of the conversation scenario; and presenting the determined reply sentence to the user.

According to the sixth aspect of the present invention, it is possible to provide an automatic answering method which allows conversations to proceed in accordance with a course of a conversation scenario prepared in advance, while answering to utterances by a user.

The step of preparing a conversation scenario may include: receiving input from an operator by allowing the operator to input sentences in order to generate the conversation scenario, the sentences including an inputted sentence, a reply sentence, and an inputted sentence corresponding to a user utterance assumed to be uttered by the user in response to the reply sentence; generating and editing the data of the conversation scenario in response to information of the input received from the operator; storing the data of the conversation scenario in the course of generation and edition and after completion of generation and edition while linking the inputted sentences with the reply sentences; and outputting information of the data of the conversation scenario in the course of generation and edition and after completion of generation and edition in a form recognizable by the operator, wherein the state transition diagram is presented to the operator in the step of outputting the conversation scenario to the operator, the state transition diagram having a form in which state transition among the inputted sentences and the reply sentences are recognizable, the state transition diagram showing all of destinations and sources of transition of the reply sentences.

The above-described configuration has the following advantages, for example.
- It is possible to define a reply from a system as an object and to define a user utterance as a morphism. That is, it is possible to treat the conversation as state transition.
- It is possible to show all of transition destinations of replies from the system (to read the state transition by using information on the transition destinations).
- It is possible to show all of sources of the replies from the system (to read "compositions and unit elements" by using information on the sources).
- It is possible to show all of reply sequences of the replies from the system (to read scenarios by using the reply sequences)

BRIEF DESCRIPTION OF THE DRAWINGS

FIG. 16 is a view showing an example that expresses the conversation scenario in FIG. 15 in the form of data.
FIG. 27 is a chart showing "uttered sentence types", two alphabet codes representing the uttered sentence types, and examples of uttered sentences corresponding to the uttered sentence types.

FIG. 28 is a view showing relationships between sentence types and dictionaries for determining the types.

FIG. 31 is a view showing a data structure example of topic titles (also referred to as "second morpheme information").

FIG. 32 is a view for explaining data structure examples of reply sentences.

DETAILED DESCRIPTION OF THE EMBODIMENTS

Now, embodiments of the present invention will be described below with reference to the accompanying drawings.

(First Embodiment)

A first embodiment is proposed as an automatic conversation system configured to output a reply in response to a user utterance or the like on the basis of a conversation scenario prepared in advance, and as a conversation scenario editing device configured to generate and edit the conversation scenario.

(1. Configuration Examples of Automatic Conversation System and Conversation Scenario Editing Device)

Figure 1:
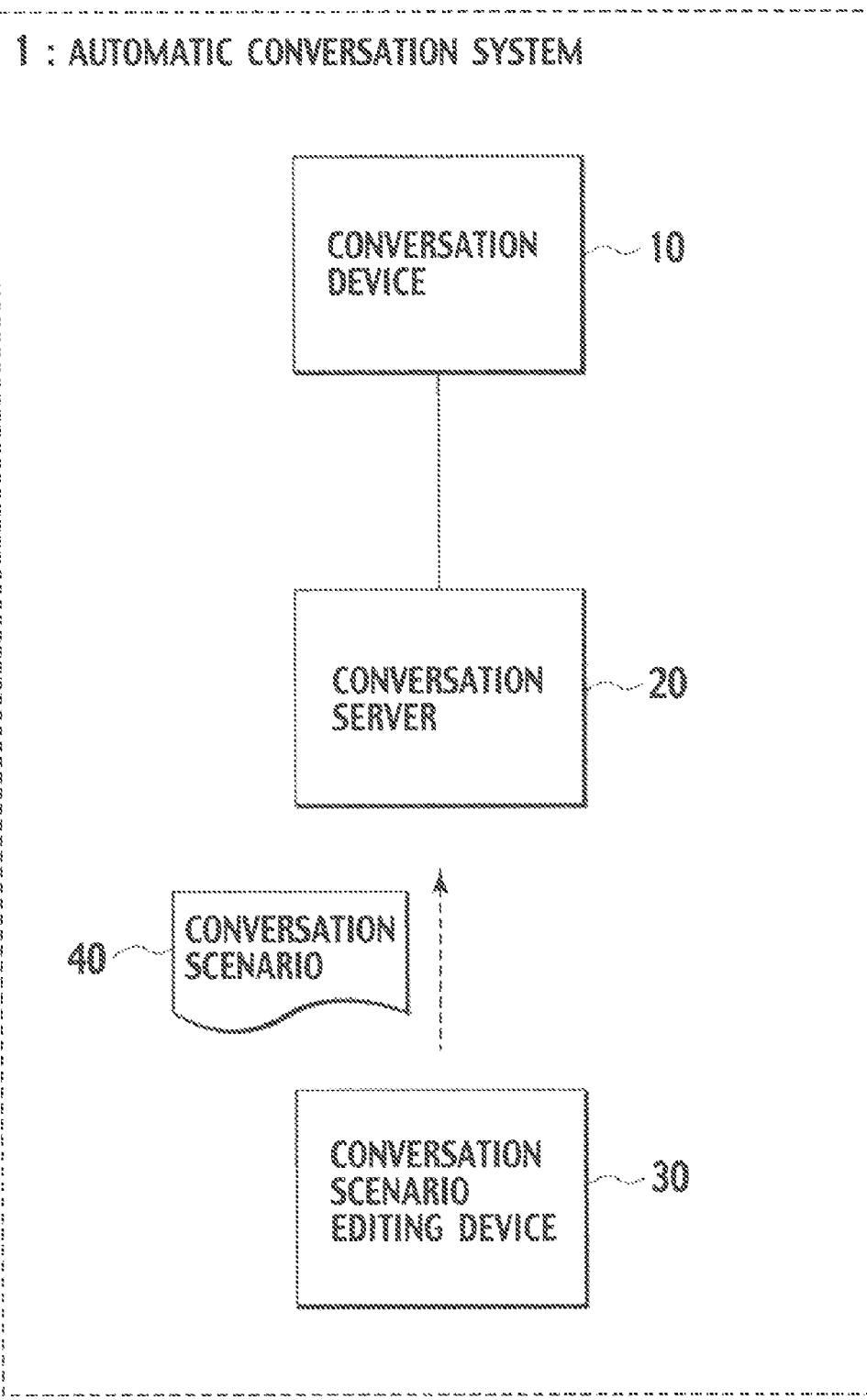
FIG. 1 is a block diagram showing a configuration example of an automatic conversation system.

Now, configuration examples of the automatic conversation system and the conversation scenario editing device will be described below. FIG. 1 is a block diagram showing a configuration example of an automatic conversation system 1. The automatic conversation system 1 includes a conversation device 10, a conversation server 20 connected to the conversation device 10, and a conversation scenario editing device 30 configured to generate and edit a conversation scenario to be used by the conversation server 20.

When a user inputs an utterance, the conversation device 10 transmits contents of the utterance to the conversation server 20. Upon receipt of the contents of the utterance, the conversation 20 determines a reply that is a response to the contents of the utterance and operation control information, which is information describing an operation corresponding to this reply and being supposed to be executed by the conversation device 10, on the basis of a conversation scenario and outputs the response and the operation control information to the conversation device 10. The conversation scenario editing device 30 generates and edits a conversation scenario 40, and outputs the conversation scenario thus generated or edited. The outputted conversation scenario 40 is stored in the conversation server 20.

Now, the above-mentioned constituents will respectively be described below in detail.

(1.1. Conversation Device)

The conversation device 10 has functions to acquire an utterance from a user (a user utterance) as an input, to transmit contents of the input (hereinafter referred to as a inputted sentence) to the conversation server 20, to receive a reply and operation control information returned from the conversation server 20, and to execute an output of the reply and an operation corresponding to the operation control information on the basis of the received contents.

The conversation device 10 is typically an information processing device including a central processing unit (CPU), a main memory (RAM), a read-only memory (ROM), an input-output device (I/O), and an external storage device such as a hard disk device when necessary, or an instrument, a toy or the like that includes the above-mentioned information processing device. For example, the conversation device 10 is a computer, a cellular telephone, a so-called Internet appliance, a robot or the like. A program is stored in the ROM or the hard disk device of the conversation device 10, for example, so that the conversation device is realized by loading this program on the main memory and causing the CPU to execute this program. Meanwhile, the program does not necessarily have to be stored in the storage device inside the information processing device, and a configuration may be employed in which the program is supplied from an external device (such as an ASP (application service provider) server) and the program is loaded on the main memory.

Figure 2:
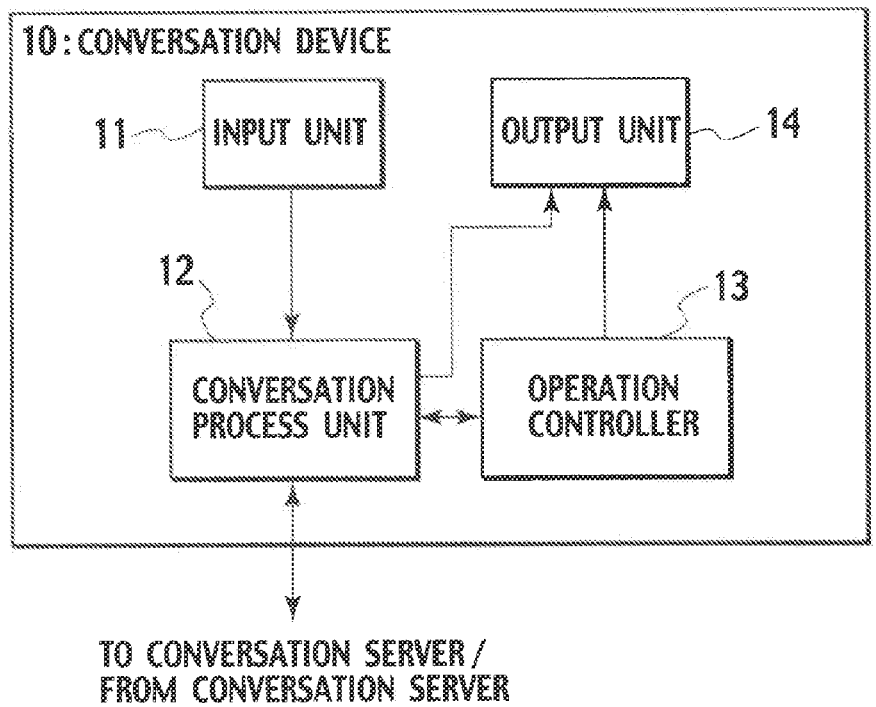
FIG. 2 is a block diagram showing a configuration example of a conversation device.

FIG. 2 is a block diagram showing a configuration example of the conversation device 10. The conversation device 10 includes an input unit 11, a conversation process unit 12 connected to the input unit 11, an operation controller 13 connected to the conversation process unit 12, and an output unit 14 connected to the conversation process unit 12 and to the operation controller 13. Moreover, the conversation process unit 12 is able to communicate with the conversation server 20.

The input unit 11 has functions to receive the contents of utterance (the inputted sentence) from the user and to convert the contents into a signal such as an electric signal, which is processable by the conversation process unit 12, and to pass the signal to the conversation process unit 12. The input unit 11 is any one or a combination of a keyboard, a pointing device, a touch panel, and a microphone, for example.

The conversation process unit 12 transmits the inputted sentence received from the input unit 11 to the conversation server 20 and calls on the conversation server 20 to transmit a reply sentence in response to the inputted sentence and the operation control information corresponding to the reply sentence. Moreover, when the conversation process unit 12 receives the reply sentence and the operation control information corresponding to the reply sentence from the conversation server 20, the conversation process unit 12 passes the reply sentence to the output unit 14 for the purpose of output and passes the operation control information to the operation controller 13.

The operation controller 13 executes a designated operation on the basis of the operation control information passed from the conversation process unit 12. If the designated operation is execution of display using the output unit 14 (such as playback of the designated operation), the operation controller 13 causes the output unit 14 to execute this operation. Meanwhile, if the designated operation is to output a difference reply sentence from the reply sentence acquired from the conversation server 20 (such as outputting the different sentence "Please say something!" in response to the reply sentence "What shall we talk about?" acquired from the conversation server 20), the operation controller 13 causes the output unit 14 to output the different reply sentence.

The output unit 14 has a function to output the reply sentence in the form recognizable to the user. The form of outputting the reply sentence has no limitations in the present invention. When the output unit 14 is supposed to offer the reply sentence in the form of character information, the output unit 14 may be a liquid crystal display device, for example. Alternatively, when the output unit 14 is supposed to offer the reply sentence in the form of voice information, the output unit 14 may be a combination of an artificial voice generator and a speaker.

(1.2. Conversation Server)

The conversation server 20 is the device having functions to determine the reply that is the response to the contents of the utterance and the operation control information, which is the information describing the operation corresponding to this reply and being supposed to be executed by the conversation device 10, on the basis of the conversation scenario, and to output the response and the operation control information to the conversation device 10.

The conversation server 20 is typically an information processing device including a central processing unit (CPU), a main memory (RAM), a read-only memory (ROM), an input-output device (I/O), and an external storage device such as a hard disk device when necessary. For example, the conversation server 20 is a computer, a workstation, a server machine or the like. A program is stored in the ROM or the hard disk device of the conversation server 20, for example, so that the conversation server is realized by loading this program on the main memory and causing the CPU to execute this program. Meanwhile, the program does not necessarily have to be stored in the storage device inside the information processing device, and a configuration may be employed in which the program is supplied from an external device (such as an ASP (application service provider) server) and the program is loaded on the main memory.

The conversation device 10 may be connected to the conversation server 20 with wire or wirelessly, or through a network (or a combination of networks) including a local area network (LAN), a wireless LAN, and the Internet. Alternatively, the conversation device 10 and the conversation server 20 do not necessarily have to be independent devices. The present invention may be embodied by a configuration in which the conversation device 10 and the conversation server 20 are realized by using a single device.

Figure 3:
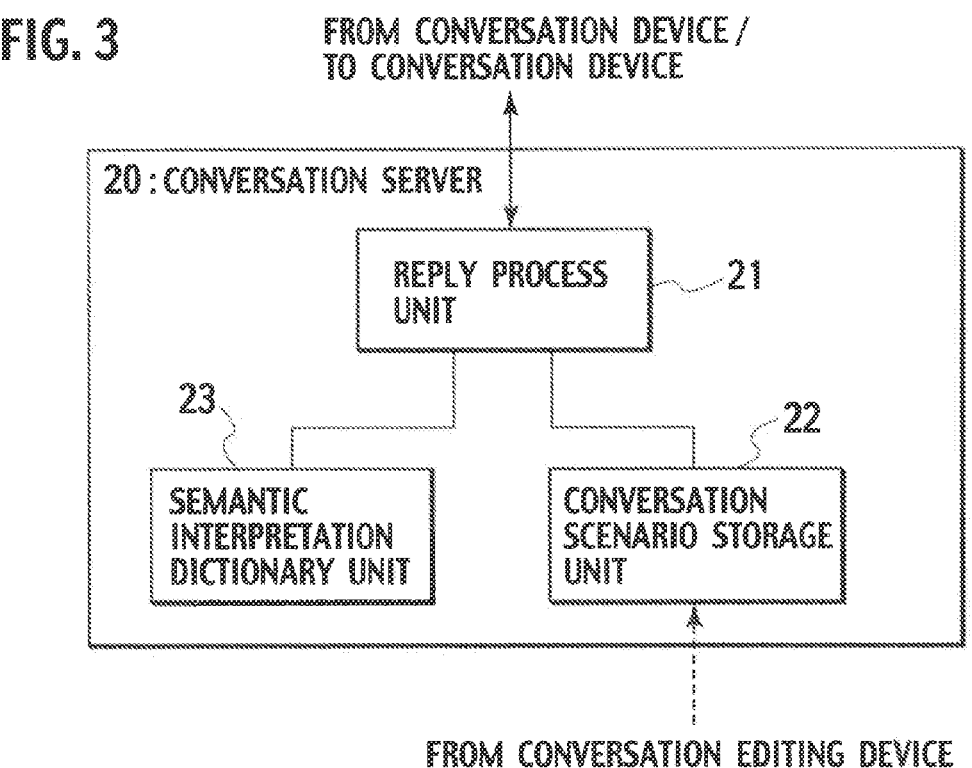
FIG. 3 is a block diagram showing a configuration example of a conversation server.

FIG. 3 is a block diagram showing a configuration example of the conversation server 20. The conversation server 20 includes a reply process unit 21 which can communicate with the conversation device 10, a semantic interpretation dictionary unit 23 connected to the reply process unit 21, and a conversation scenario storage unit 22.

The reply process unit 21 receives the inputted sentence from the conversation device 10, then selects or determines the reply sentence corresponding to this inputted sentence on the basis of the conversation scenario stored in the conversation scenario storage unit 22, and then transmits the reply sentence thus determined and the operation control information linked with this reply sentence to the conversation device 10. Meanwhile, the reply process unit 21 makes reference to a semantic interpretation dictionary stored in the semantic interpretation dictionary unit 23 to acquire a synonymous term or a synonymous sentence with the inputted sentence, and selects or determines the reply sentence based on the synonymous term or the synonymous sentence.

The semantic interpretation dictionary unit 23 has a function to store the semantic interpretation dictionary for rewording the reply sentence (such as expansion using the synonymous terms) in response to the inputted sentence. The semantic interpretation dictionary corresponds to a database having a function as a thesaurus and the like.

The conversation scenario storage unit 22 has a function to store the conversation scenario 40 which is generated or edited by the conversation scenario editing device 30. The conversation scenario 40 will be described later.

(1.3. Conversation Scenario Editing Device)

The conversation scenario editing device 30 has functions to generate a new conversation scenario to be used by the above-described conversation server 20, and to generate a modified conversation scenario by changing a conversation scenario generated in advance, adding contents thereto or partially deleting the contents.

The conversation scenario editing device 30 is typically an information processing device including a central processing unit (CPU), a main memory (RAM), a read-only memory (ROM), an input-output device (I/O), and an external storage device such as a hard disk device when necessary. For example, the conversation scenario editing device 30 is a computer, a workstation or the like. A program is stored in the ROM or the hard disk device of the conversation scenario editing device 30, for example, so that the conversation editing device 30 is realized by loading this program on the main memory and causing the CPU to execute this program. Meanwhile, the program does not necessarily have to be stored in the storage device inside the information processing device, and a configuration may be employed in which the program is supplied from an external device (such as an ASP (application service provider) server) and the program is loaded on the main memory.

Figure 4:
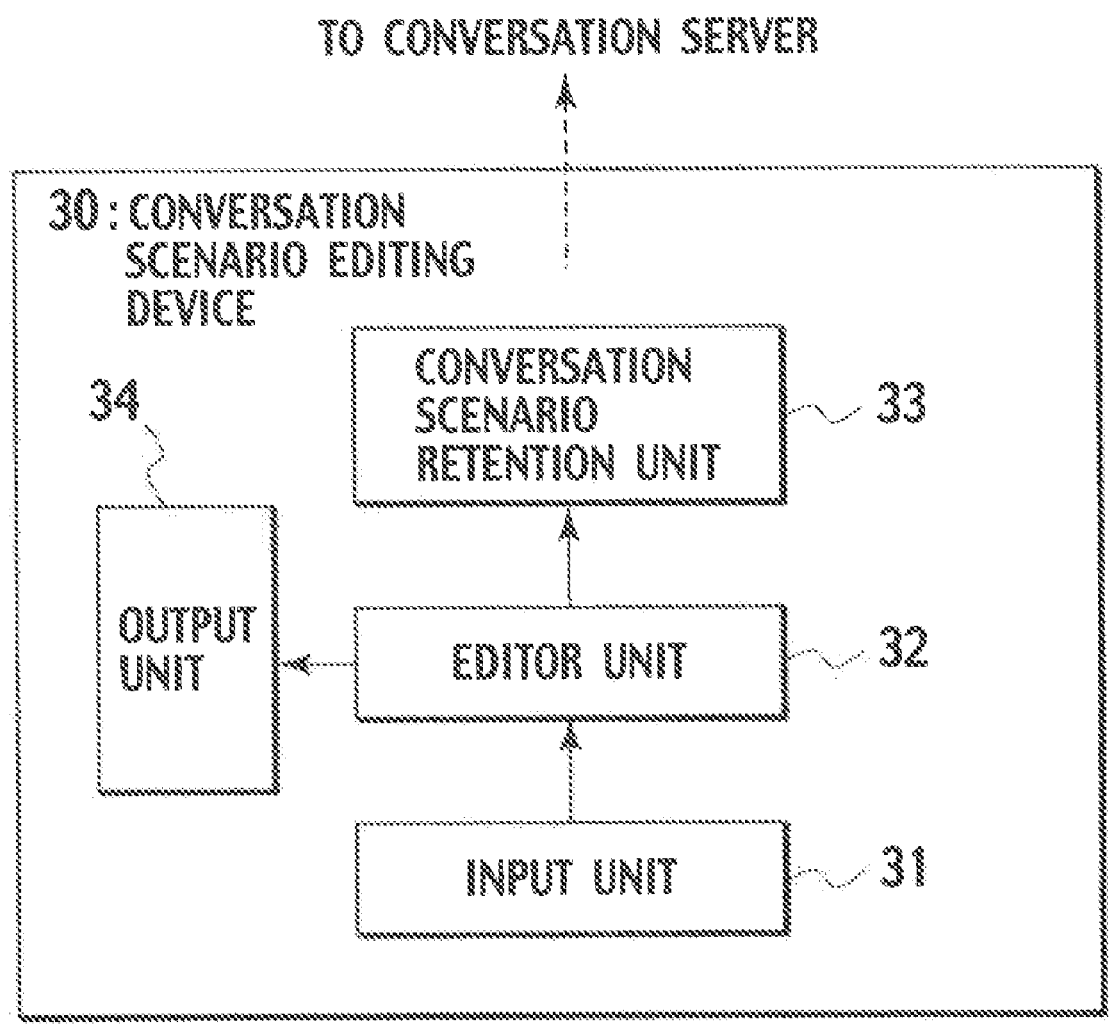
FIG. 4 is a block diagram showing a configuration example of a conversation scenario editing device.

FIG. 4 is a block diagram showing a configuration example of the conversation scenario editing device 30. The conversation scenario editing device 30 includes an input unit 31, an editor unit 32 connected to the input unit 31, and an output unit 34 as well as a conversation scenario retention unit 33 connected to the editor unit 32.

The input unit 31 has functions to receive an input from the user (an operator) of the conversation scenario editing device 30 and to convert the input into a signal such as an electric signal, which is processable by the editor unit 32, and to pass the signal to the editor unit 32. The input unit 31 is any one or a combination of a keyboard, a pointing device, a touch panel, and a microphone, for example.

The output unit 34 has a function to output the contents of the conversation scenario either in the course of editing or after completion of editing in the form recognizable by the operator. The output unit 34 is a liquid crystal display device, for example.

The editor unit 32 has functions to generate data as the conversation scenario and to edit (add, change, or delete) the data in response to the contents inputted from the input unit 31. Here, the operator is allowed to grasp the contents of the conversation scenario in real time by causing the output unit 34 to display the contents of the conversation scenario in the course of editing. Meanwhile, the editor unit 32 outputs the data of the conversation scenario after completion of editing to the conversation scenario retention unit 33.

Moreover, the editor unit 32 may also have functions to check whether or not an appropriate state transition relationship is maintained in the generated conversation scenario, to generate a message or the like notifying that there is a violation when there is such a violation or a message notifying the inputted sentence or the reply sentence subject to the violation, and to display the message or the like on the output unit.

Moreover, the editor unit 32 may further include a semantic interpretation dictionary unit that corresponds to the semantic interpretation dictionary unit 23 in the conversation server 20. When there are any of inputted sentences and reply sentences having the semantically overlapping contents in the conversation scenario, the editor unit 32 may have a function to edit, integrate those sentences or to urge the operator to perform such editing or integration by use of this semantic interpretation dictionary unit.

The conversation scenario retention unit 33 has a function to store or retain the data of the conversation scenario, which is received from the editor unit 32, in the form that is readable afterwards. The data of the conversation scenario stored in the conversation scenario retention unit 33 are transmitted to the conversation scenario storage unit 22 in the conversation server 20 when appropriate or at predetermined timing, for example. Such transfer of the conversation scenario from the conversation scenario retention unit 33 to the conversation scenario storage unit 22 may be carried out by way of a storage medium or through any of the communication network and a communication cable.

(1.3.1 Concerning Conversation Scenario)

Now, the conversation scenario 40 will be described. The conversation scenario of the present invention has the following features.

(1) The conversation scenario defines a reply sentence as an "object" and defines a user utterance (an inputted sentence) as a "morphism".

By providing this feature, it is possible to express a course of conversations determined by the conversation scenario in the form of a "state transition diagram". The conversation scenario of the present invention can output the reply sentences corresponding to all the inputted sentences (the user utterances) by using the "other" function to be described later. Moreover, the conversation scenario can deal with "silence" of the user (no input) by use of a "timer" utterance to be described later (by treating the silence as the morphism).

Figure 5:
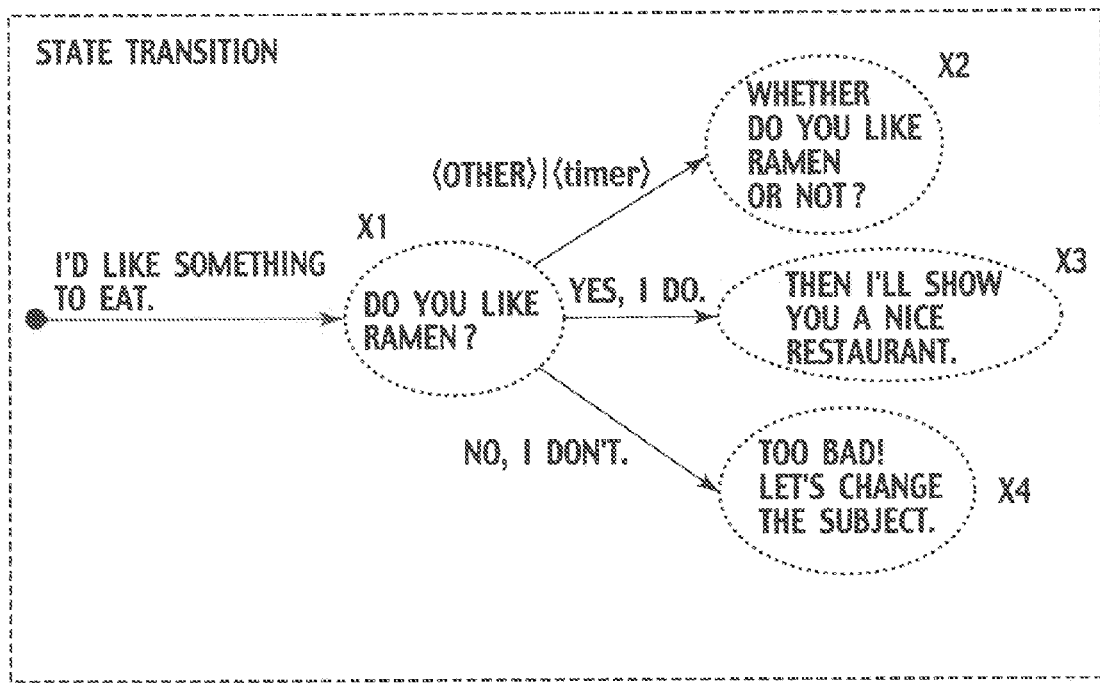
FIG. 5 is a state transition diagram showing an example of a conversation scenario corresponding to a category of a discourse.

FIG. 5 is a state transition diagram showing an example of the conversation scenario. In the drawing, oval frames X1, X2, X3, and X4 respectively represent reply sentences, which correspond to the "object". In the drawing, sentences displayed respectively near arrows represent inputted sentences, which correspond to the "morphism". In the drawing, a mark <other> in the drawing shows an inputted sentence other than a morphism "YES, I DO." or a morphism "NO, I DON'T." from the reply sentence X1. In the drawing, a mark <timer> represents a state of passage of a certain time period when the user remains silent. Moreover, an expression "<other> | <timer>" means a state where either <other> or <timer> is applicable.

In the example shown in FIG. 5, a "morphism" representing "I'D LIKE SOMETHING TO EAT.", i.e. the reply sentence X1, leads to transition to an "object" representing "DO YOU LIKE RAMEN?" When the first morphism "NO, I DON'T." occurs after output of the reply sentence X1, the state transits to the reply sentence X4 that represents "TOO BAD! LET'S CHANGE THE SUBJECT." On the other hand, when the second morphism "YES, I DO." occurs after output of the reply sentence X1, the state transits to the reply sentence X3 that represents "THEN I'LL SHOW YOU A NICE RESTAURANT." Meanwhile, when the morphism other than the first and second morphisms occurs after output of the reply sentence X1 or when the user maintains silence for a certain time period, the state transits to the reply sentence X2 that represents "DO YOU LIKE RAMEN OR NOT?"

Figure 6:
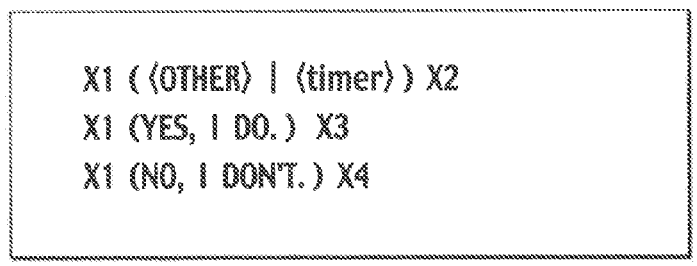
FIG. 6 is a view showing an example that expresses the conversation scenario in FIG. 5 in the form of data.

The contents in FIG. 6 show an example of expressing the above-described conversation scenario of FIG. 5 in the form of data. Here, an expression "X1 (utterance A) X2" represents a reply sequence, which describes that a reply state of X1 transmits to a reply state of X2 by the utterance A.

(2) The Conversation scenario can define compositions for morphisms.

By applying this feature, it is possible to accept an utterance which diverges from a main scenario and to put the diverging utterance back to the original (the main scenario) Therefore, a creator of a conversation scenario is able to construct an intended course (or "a story") of conversations and to cause the conversation system to execute the conversations along this story.

Figures 7, 8:
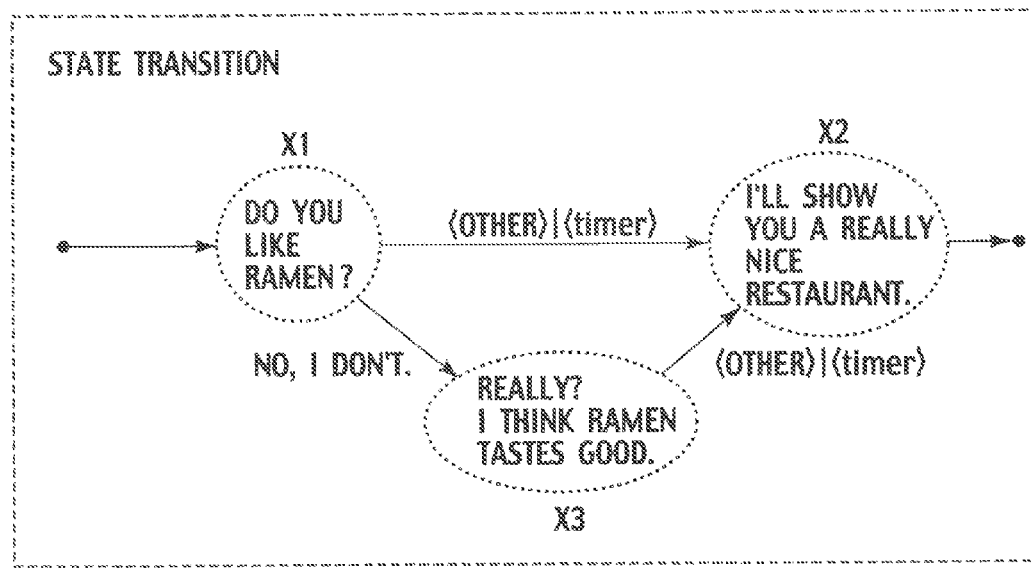
FIG. 7 is a state transition diagram showing an example of a conversation scenario containing a composition of morphisms.
FIG. 8 is a view showing an example that expresses the conversation scenario in FIG. 7 in the form of data.

FIG. 7 is a state transition diagram showing an example of a conversation scenario containing a composition of morphisms. Reference codes and expressions in this drawing are similar to those in FIG. 5. In the conversation scenario of this example, when a first morphism "NO, I DON'T." occurs after output of a reply sentence X1 that represents "DO YOU LIKE RAMEN?", the state transits to a reply sentence X3 that represents "REALLY? I THINK RAMEN TASTES GOOD." Meanwhile, when a morphism other than the first morphism occurs or when the user maintains silence for a certain time period, the state transits to a reply sentence X2 that represents "THEN I'LL SHOW YOU A NICE RESTAURANT."

Only one morphism "<other>|<timer>" is defined after output of the above-described reply sentence X3 "REALLY? I THINK RAMEN TASTES GOOD." Accordingly, the state transits to the reply sentence X2 "THEN I'LL SHOW YOU A NICE RESTAURANT." after any inputted sentences (the user utterances) or a passage of a predetermined period.

Since the present invention allows use of an example of the conversation scenario containing the composition of morphisms as described above, it is possible to lead to an utterance that a doer adheres to while respecting an utterance of an opponent.

The above-described conversation scenario in FIG. 7 can be expressed by reply sequences as shown in the contents in FIG. 8. Here, an object X2 represents a source of the object X2. The original of source of the sourced object X2 is the object X2, which formally corresponds to a definition of a morphism "(NO, I DON'T.) X3 (<other>|<timer>)" between the objects X1 and X2. This morphism represents a composition of the morphism "NO, I DON'T." and the morphism "<other>|<timer>".

(3) The conversation scenario can define unit elements.

The conversation scenario of the present invention can define unit elements. A "unit element" means a morphism which does not allow transition of an object. Definition of the unit element enables the following.

(a) It is possible to execute a "forcible reply" to a user utterance.

Figure 9:
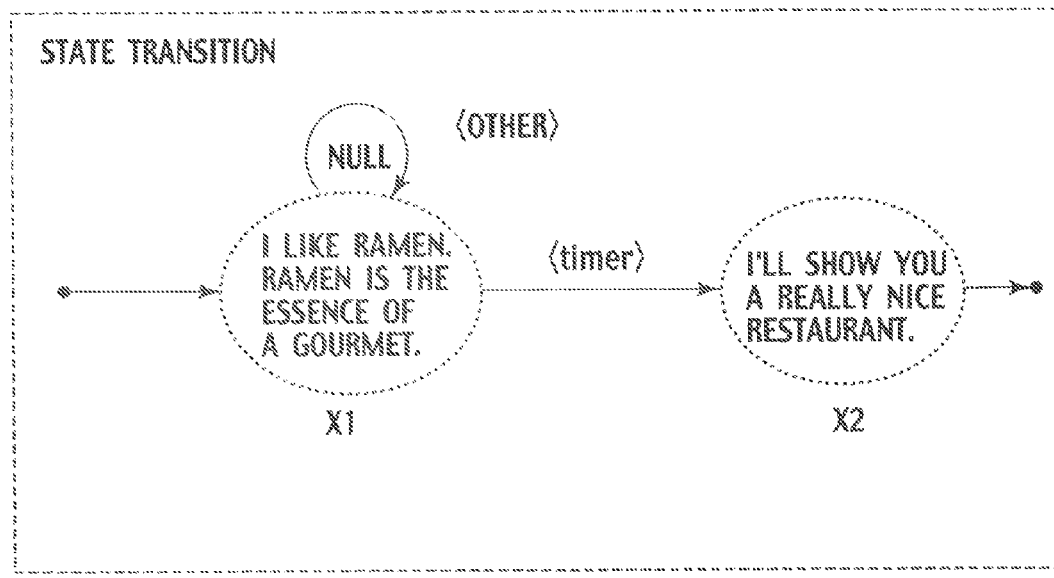
FIG. 9 is a state transition diagram showing an example of a conversation scenario to execute a forcible reply by using a NULL function.

FIG. 9 is a state transition diagram showing an example of a conversation scenario which executes a forcible reply. In this example, a first morphism <other> provided with NULL is defined at the time of outputting a reply sentence X1 "I LIKE RAMEN. RAMEN IS THE ESSENCE OF A GOURMET." Therefore, the reply "I LIKE RAMEN. RAMEN IS THE ESSENCE OF A GOURMET." is forcibly outputted while the inputted sentence is ignored no matter what the inputted sentence (the user utterance) says. Meanwhile, after output of the reply sentence X1 "I LIKE RAMEN. RAMEN IS THE ESSENCE OF A GOURMET.", the state transits to a reply sentence X2 that represents "I'LL SHOW YOU A REALLY NICE RESTAURANT." on the basis of a second morphism <timer>.

In this example, the ignorance of the utterance of the opponent is expressed by "NULL". In the example shown in FIG. 9, NULL is attached to <other> in order to ignore all utterances. Here, it is also possible to ignore only "NO, I DON'T." instead.

Figure 10:
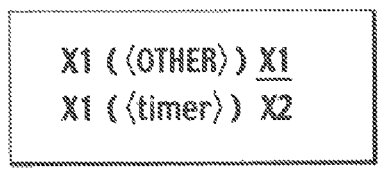
FIG. 10 is a view showing an example that expresses the conversation scenario in FIG. 9 in the form of data.

The above-described conversation scenario in FIG. 9 can be expressed by reply sequences as shown in the contents in FIG. 10. Here, the object X1 represents a source of the object X1. The sourced object $\overline{X1}$ shares the same transition destination as that of the object X1 which is the origin of the source. In this context, the object X1 is the same as the object X1, and the morphism "(<other>)" is the morphism from the object X1 to the object X1 and thereby constitutes the unit morphism.

(b) It is possible to execute an "adherent reply" to a user utterance.

Figures 11, 12:
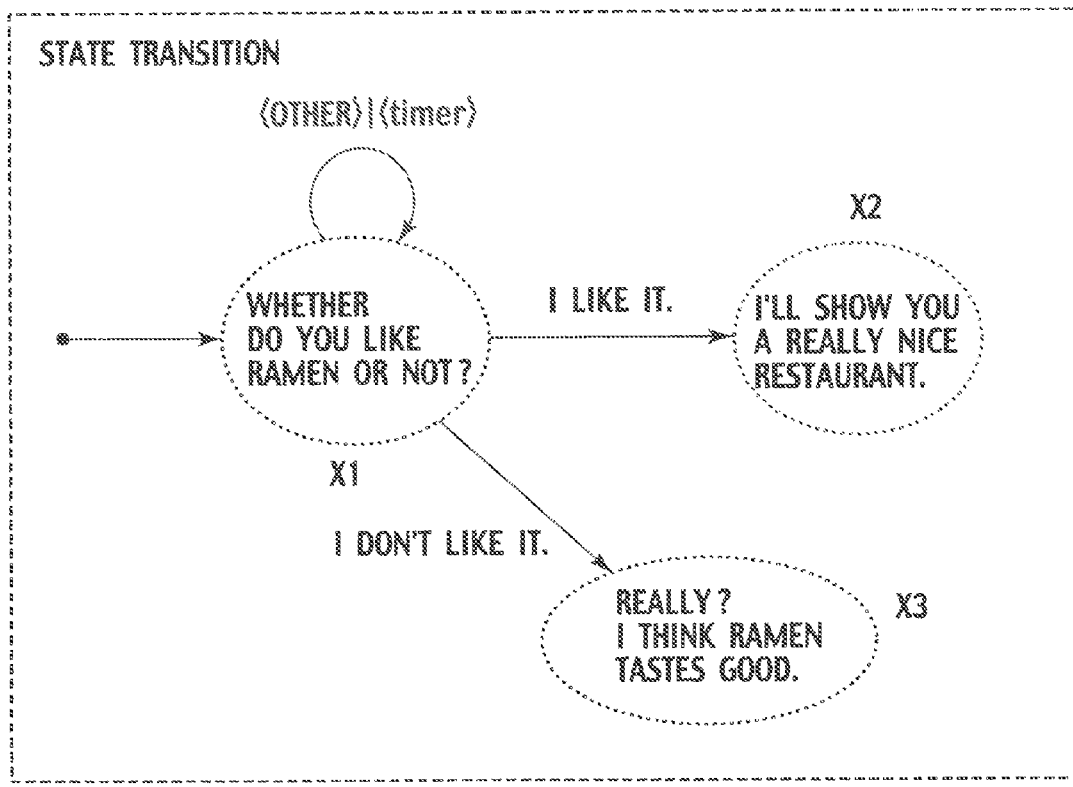
FIG. 11 is a state transition diagram showing an example of a conversation scenario to execute an "adherent reply" to a user utterance by using a source function.
FIG. 12 is a view showing an example that expresses the conversation scenario in FIG. 11 in the form of data.

FIG. 11 is a state transition diagram showing an example of a conversation scenario which executes an "adherent reply" to a user utterance. In the example of FIG. 11, when a first morphism that represents "I DON'T LIKE IT." occurs after output of a first reply sentence X1 that represents "DO YOU LIKE RAMEN OR NOT?", the state transits to a reply sentence X3 that represents "REALLY? I THINK RAMEN TASTES GOOD." Meanwhile, when a second morphism that represents "I LIKE IT." occurs after output of the first reply sentence X1, the state transits to a reply sentence X2 that represents "I'LL SHOW YOU A REALLY NICE RESTAURANT." On the other hand, when the morphism other than the first and second morphisms occurs or when the user maintains silence for a certain time period after output of the reply sentence X1, the state returns to the reply sentence X1 that represents "DO YOU LIKE RAMEN OR NOT?" again. In this way, it is possible to cause the user to select one of the morphisms "I LIKE IT." and "I DON'T LIKE IT." forcibly.

The above-described conversation scenario in FIG. 11 can be expressed by reply sequences as shown in the contents in FIG. 12. Here, the object X1 represents the source of the object X1. The sourced object $\overline{X1}$ shares the same transition destination as that of the object $\overline{X1}$ which is the origin of the source. In this context, the object X1 is the same as the object X1, and the morphism "(<other>)" also corresponds to the morphism from the object X1 to the object X1 and is therefore called the unit morphism.

(c) It is possible to establish "closed loop replies" by using a "unit element constructed by compositions".

Figure 13:
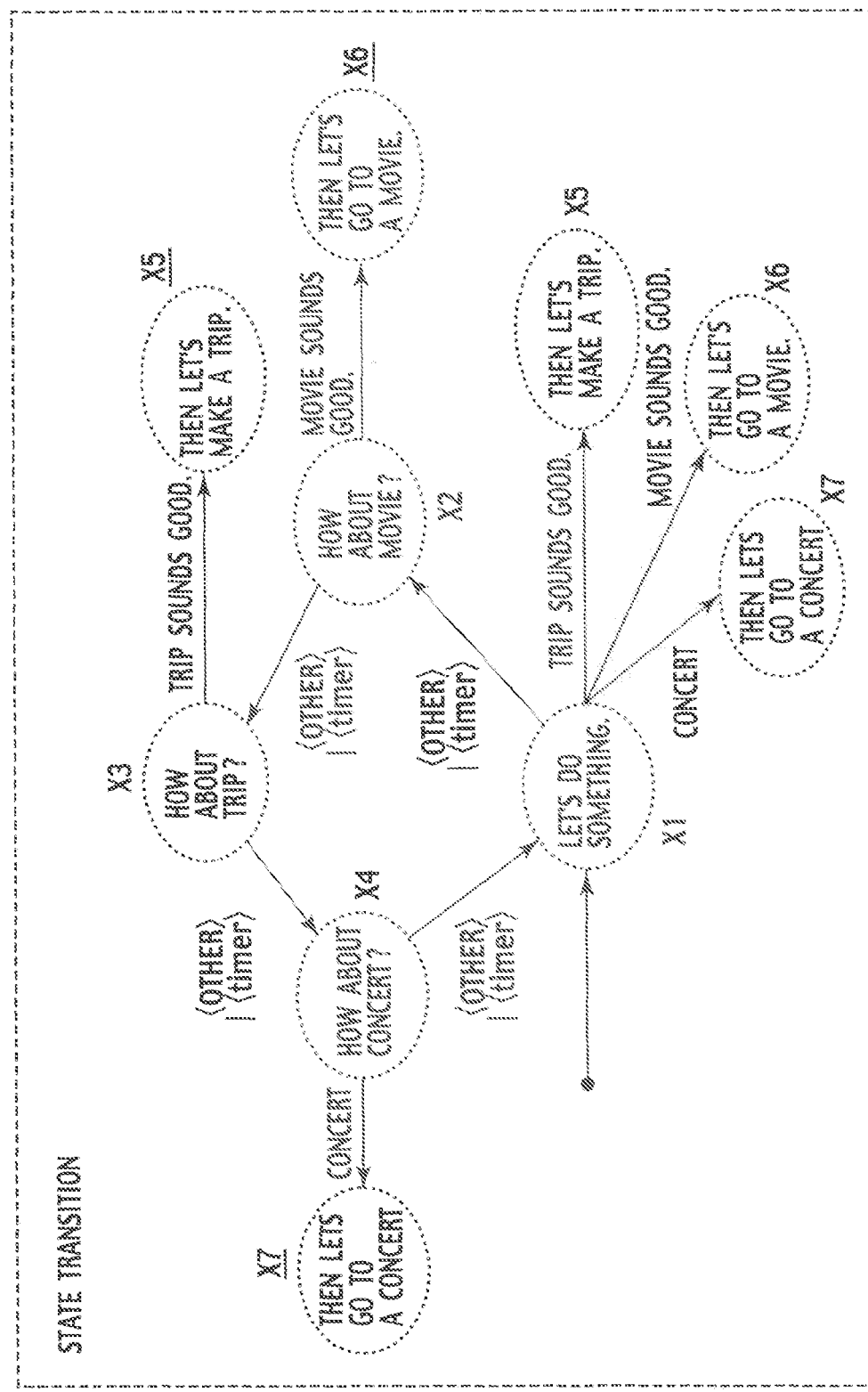
FIG. 13 is a state transition diagram showing an example of a conversation scenario in which "closed loop replies" are established by a "unit element constructed by compositions".
Figure 14:
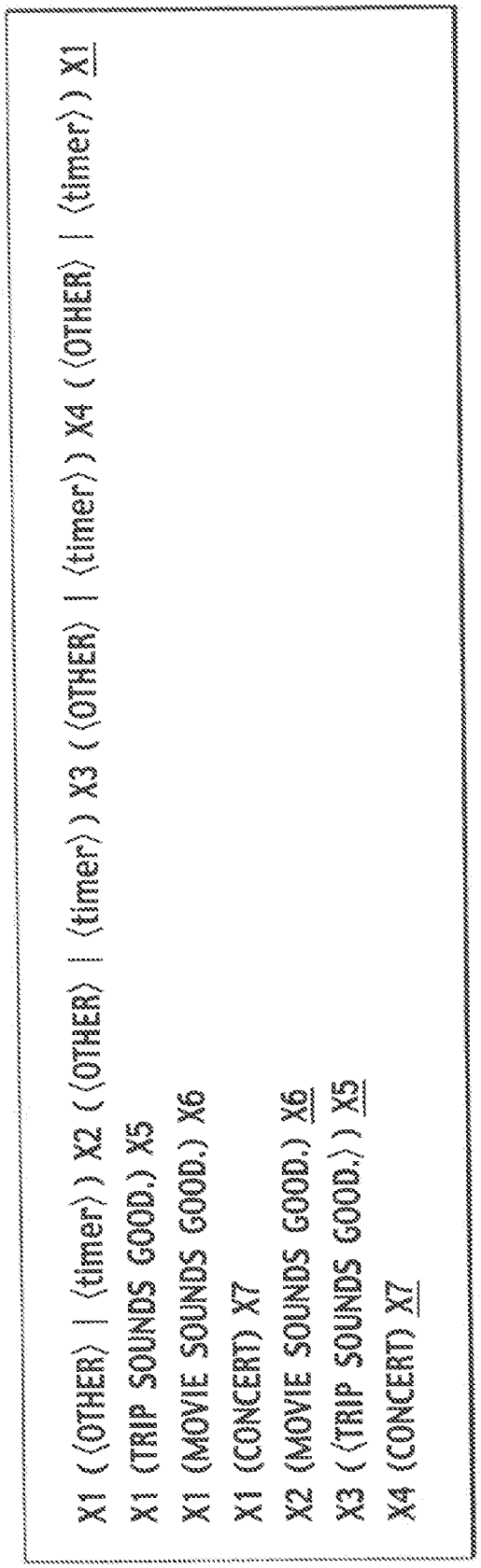
FIG. 14 is a view showing an example that expresses the conversation scenario in FIG. 13 in the form of data.

By providing this feature, it is possible to urge an utterance of an opponent within a closed loop. FIG. 13 is a state transition diagram showing an example of a conversation scenario in which the "closed loop replies" are established by the "unit element constructed by compositions". In this example, the closed loop is constructed by reply sentences X1, X2, X3, and X4 so that the course of conversations can be controlled by this closed loop. The above-described conversation scenario in FIG. 13 can be expressed by reply sequences as shown in the contents in FIG. 14. In this case as well, a sequence corresponding to a morphism from the object X1 to the object X1, namely, (<other>|<timer>) X2 (<other>|<timer>) X3 (<other>|<timer>) X4 (<other>|<timer>) is called the unit element. The unit element in this case establishes the closed loop.

The explanation on the "item (3) the conversation scenario can define unit elements." has been completed.

(4) An associative law applies to a combination of morphisms.

By providing this feature, it is possible to establish reply sequences S1 and S2 along two different paths relative to a reply sequence S corresponding to a certain morphism, and moreover, to treat these reply sequences S1 and S2 to be equal to each other. In this case, assuming that the reply sequence S is the reply sequence concerning a certain problem, then the reply sequences S1 and S2 correspond to the reply sequences that provide different interpretations of the reply sequence S and offer information concerning solutions of the problem. Due to this feature, the conversation scenario according to the present invention can deal with logical utterances from the user.

Figure 15:
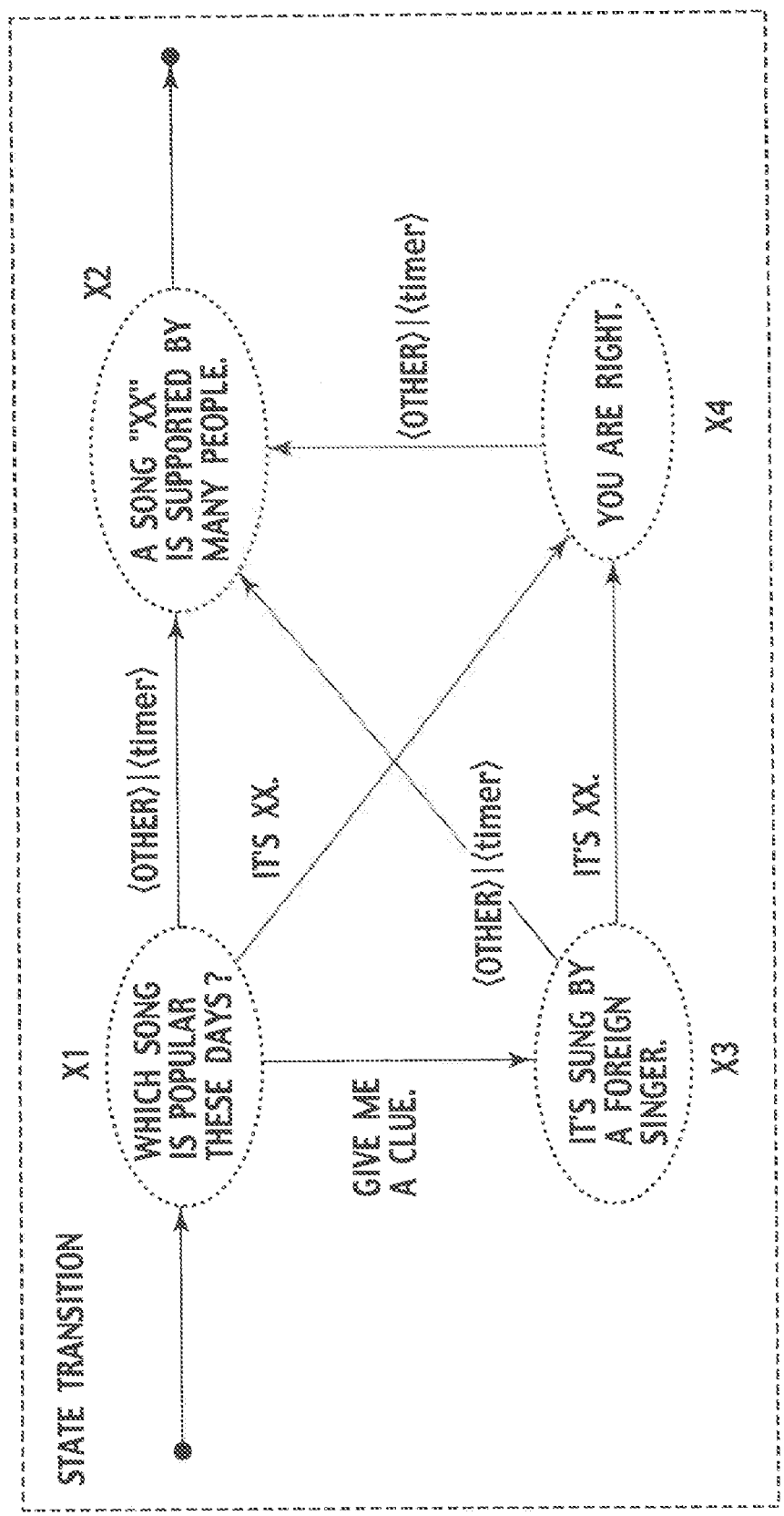
FIG. 15 is a state transition diagram showing an example of a conversation scenario in which an associative law applies to compositions of morphisms.

FIG. 15 shows a state transition diagram of an example of a conversation scenario in which the associative law applies to compositions of morphisms. The above-described conversation scenario in FIG. 15 can be expressed by reply sequences as shown in the contents in FIG. 16. Here, objects X2 and X4 represent sources of the objects X2 and X4, respectively. Hence the following equation formally holds true:

(GIVE ME A CLUE.) $X3$ (IT'S $XX$.) $X4$ (⟨other⟩ | ⟨timer⟩) =

(IT'S $XX$.) $X4$ (⟨other⟩ | ⟨timer⟩) =

(GIVE ME A CLUE.) $X3$ (⟨other⟩ | ⟨timer⟩)

(5) The conversation scenario can draw a commutative diagram.

By providing this feature, it is possible to define a morphism in order to reach an arbitrary target. For this reason, it is possible to set up a goal for a scenario and to grasp the entire scenario at the same time.

(7) Other Features

A "range of discourse that can deal with the inputted sentence as the object and with the reply sentence as the morphism" has a totally different search scheme from a "range of discourse that can deal with the inputted sentence as the morphism and with the reply sentence as the object". Accordingly, the present invention cannot deal with the former case in a similar manner to the latter case. Hence the former range of discourse will not be discussed in this specification (1.4. Position of Conversation Scenario Editing Device)

Now, the position of the conversation scenario editing device 30 of the present invention will be summarized.

(1) The following features apply to the conversation scenario which includes the object and the morphism.

The conversation scenario defines a reply sentence as an object and an inputted sentence as a morphism (state transition).

The conversation scenario leads to a reply sentence that a doer adheres to while paying respect to an inputted sentence (context preservation: compositions).

The conversation scenario states a response sentence decisively regardless of the inputted sentence (forcible reply: unit element).

The conversation scenario repeatedly urges an opponent until he or she says a required utterance (adherent reply: unit element).

The conversation scenario urges an inputted sentence within a closed loop (closed loop: unit element)

The conversation scenario executes conversations that lead to a solution of a problem (problem solution: associative law)

The conversation scenario executes conversations that lead to a goal (conversations with a goal: commutative diagram).

The above-described features can also be organized by using the reply sequences. The conversation scenario editing device 30 has a function to express the above-described features of the conversation scenario by using the reply sequences.

The conversation server 20 is required to perform a simple search by utilizing the above-described conversation scenario. Specifically, the conversation server grasps a current state as the object (the reply sentence) in the conversation scenario. When there is an utterance from a user, the conversation server 20 searches for the most appropriate morphism (the inputted sentence) by conducting semantic interpretation and defines the object (the reply sentence) corresponding to the searched morphism (the inputted sentence) as a subsequent state.

Figure 17:
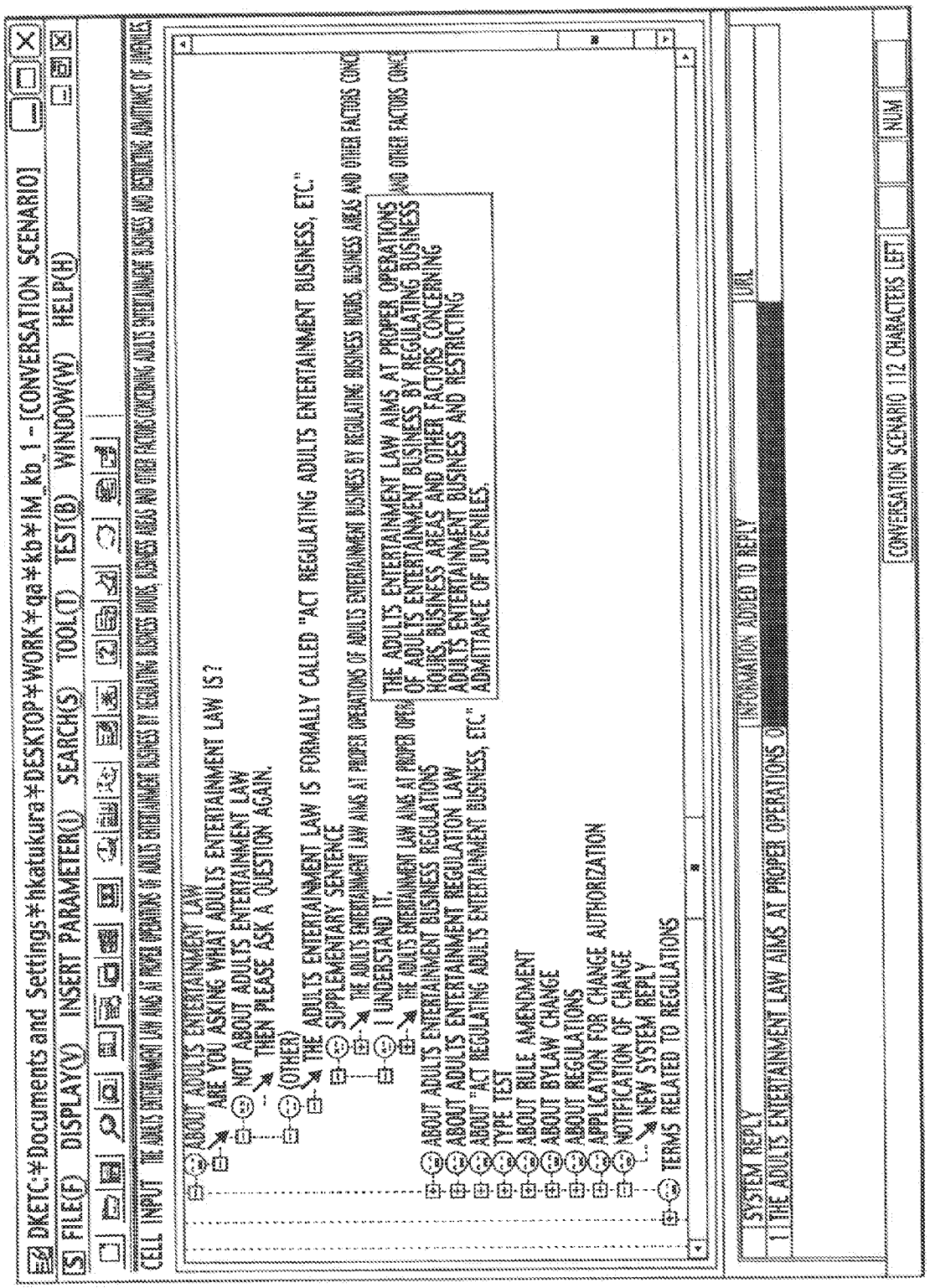
FIG. 17 is a view showing an example of an edit screen of the conversation scenario editing device.

Here, in addition to expressing the above-described conversion scenario by use of the state transition diagrams and the data based on the diagrams (FIGS. 6, 8, 10, and so forth), it is also possible to generate and edit the conversation scenario by use of a graphic user interface (GUI) such as an outline editor shown in FIG. 17.

(2. Operation Example of Conversation Scenario Editing Device)

Next, an operation example of the conversation scenario editing device 30 will be described.

Figure 18:
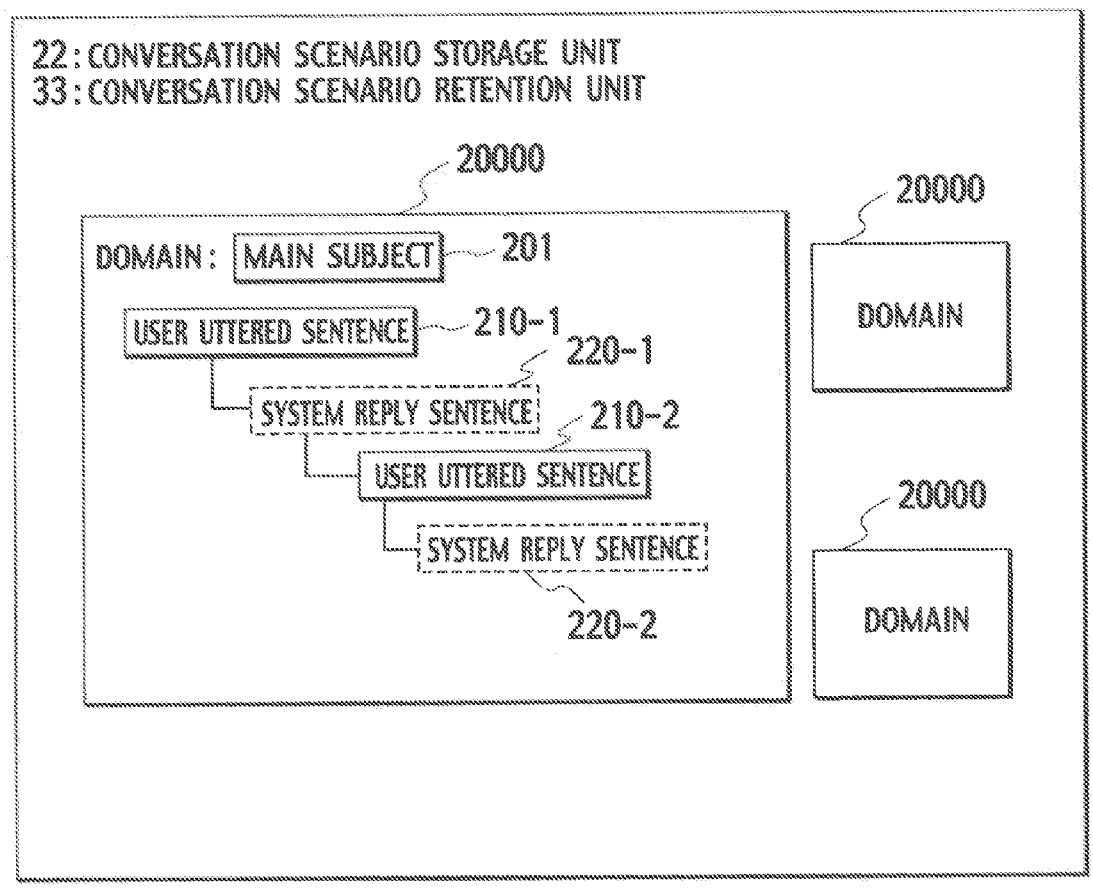
FIG. 18 is a view showing a data structure example of a conversation scenario retention unit and a conversation scenario storage unit.

The conversation scenario editing device 30 according to this embodiment is able to establish conversations with a user regarding multiple different main subjects (conversation themes). FIG. 18 is a view showing a data structure example of a conversation scenario stored in the conversation scenario retention unit 33 and the conversation scenario storage unit 22 (hereinafter simply abbreviated as the conversation scenario retention unit 33).

The conversation scenario retention unit 33 is able to possess individual conversation scenario data for respective domains 20000 corresponding to discourse categories or main subjects (conversation themes) 201. For example, the conversation scenario retention unit 33 can possess the conversation scenario data respectively concerning a "weather" domain, and a "coffee beans" domain. When a user starts an utterance concerning the weather, the conversation server 20, or more particularly the reply process unit 21, searches for a reply sentence (also referred to as a system reply sentence or a system utterance) corresponding to an inputted sentence (also referred to as a user utterance), while giving priority to the conversation scenario belonging to the "weather" domain, and thereby outputs the system utterance in response to the user utterance. Meanwhile, when the user starts an utterance concerning the coffee beans, the reply process unit 21 searches for a system utterance corresponding to the user utterance, while giving priority to the conversation scenario belonging to the "coffee beans" domain, and thereby outputs the system utterance in response to the user utterance.

Each of the domains 20000 includes system uttered sentences 210 and system uttered sentences 220. In the example shown in FIG. 18, a user uttered sentence 210-1 and a system uttered sentence 220-1 linked therewith are recorded. Moreover, a user uttered sentence 210-2 supposed to be uttered by the user in response to the system uttered sentence 220-1 is recorded and a system uttered sentence 220-2 prepared as a reply from the automatic conversation system in response to the user uttered sentence 210-2 is also recorded.

For example, the above-described conversation scenario may include the following conversations between the user and the system.

User uttered sentence 210-1: "Lovely day, isn't it?"
System uttered sentence 220-1: "Do you like good weather?"
User uttered sentence 210-2: "Yes, I do."
System uttered sentence 220-2: "Don't you like rainy days?"

Note that the conversation scenario shown in FIG. 18 represents one of the simplest aspects. The conversation scenario to be handled by this automatic conversation system may also include multiple user uttered sentences to be prepared in response to a single system uttered sentence so that the conversation system can deal with various situations when the user reacts differently and return different user utterances to the same system utterance.

The conversation scenario editing device 30 has functions to generate conversation scenario data including a new domain 20000 to be stored in the conversation scenario retention unit 33 and the user uttered sentences 210 as well as system uttered sentences 220 in the domain 20000, and to store the conversation scenario data in the conversation scenario retention unit 33.

(3. Input Example of Conversation Scenario)

Next, an input example of the conversation scenario will be described. FIG. 19 to FIG. 23 are views showing an example of transition of an input screen when a conversation scenario is inputted in terms of a certain domain 20000.

Figure 19:
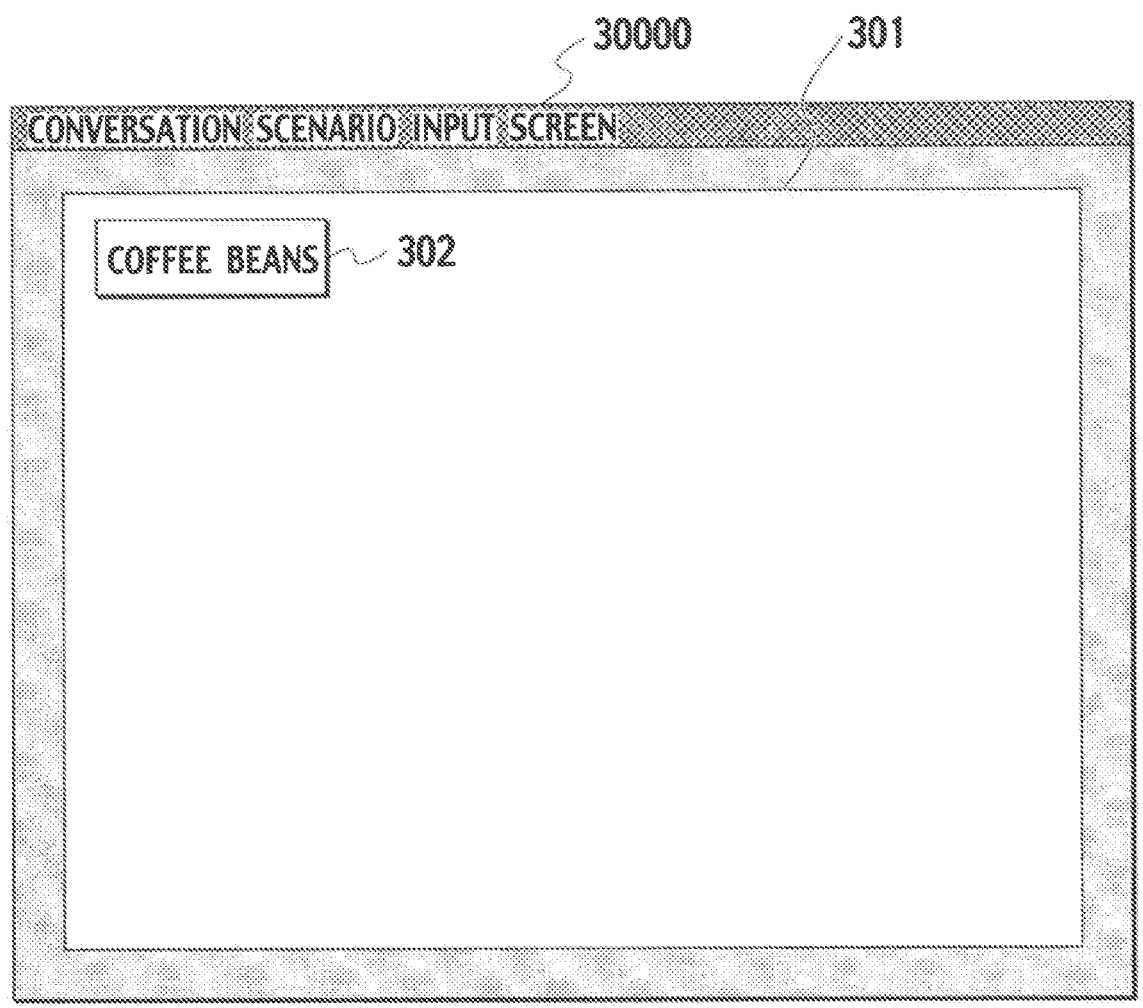
FIG. 19 is a view showing an example of an input screen for generating conversation scenario data using the conversation scenario editing device.

FIG. 19 shows an example of an input interface screen generated by the conversation scenario editing device 30. Here, the domain 20000 will be described as being related to "coffee beans".

The conversation scenario editing device 30, or more particularly the editor unit 32, generates a window 30000 that constitutes an input interface and causes the output unit 34 to display the window 30000. The window 30000 is provided with a display area 301 where user uttered sentences and system uttered sentences are inputted thereto when an operator operates the input unit 31. The example of FIG. 19 shows a state where a domain name 302 is displayed and the editor unit 32 stands by for an input of the conversation scenario to be stored in the domain 20000.

Figure 20:
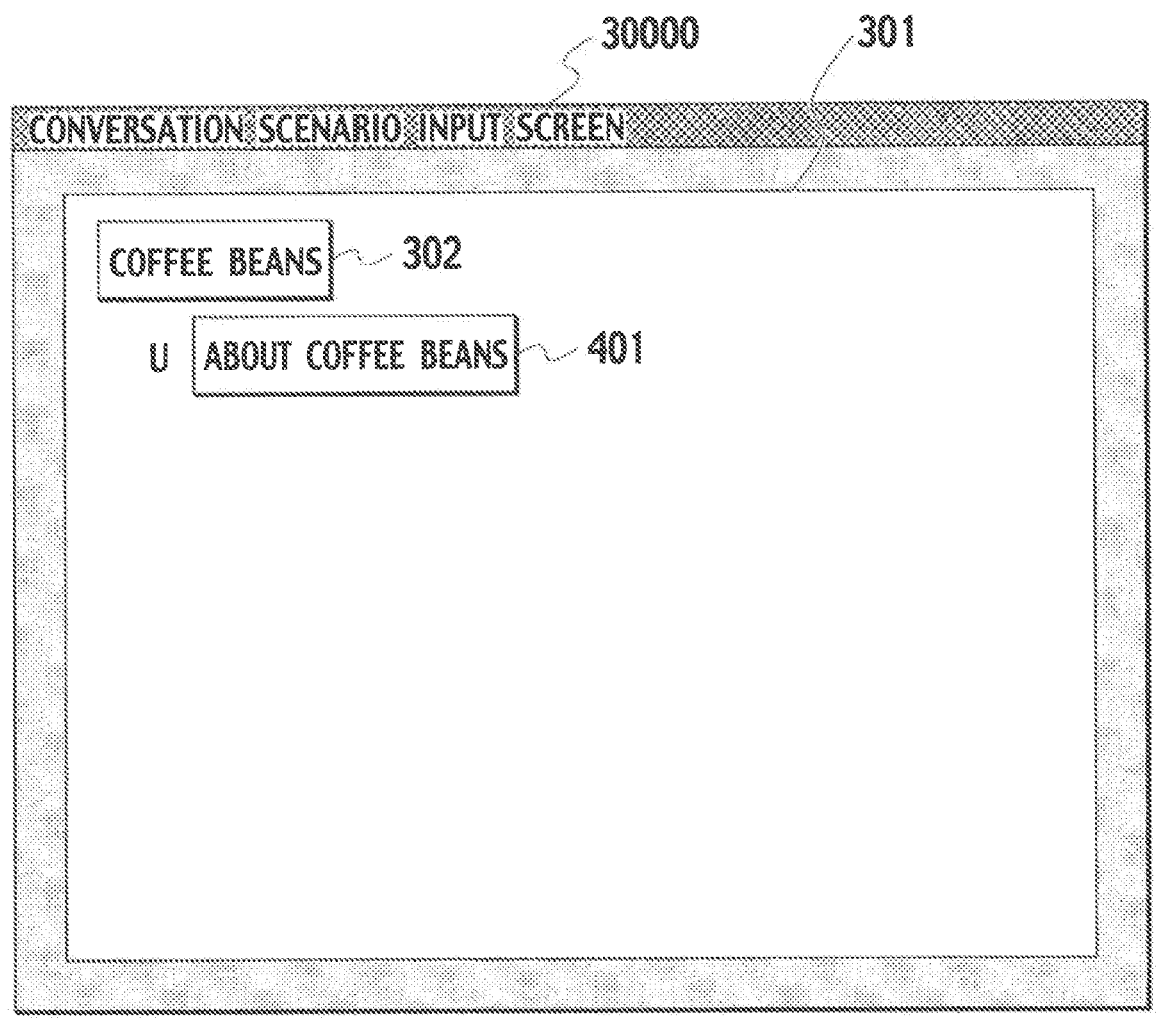
FIG. 20 is another view showing the example of the input screen for generating the conversation scenario data using the conversation scenario editing device which is subsequent to the input screen shown in FIG. 19.

FIG. 20 shows a screen example of a state where a user uttered sentence 401 that represents a start of the conversation scenario to be stored in the domain 20000 is inputted.

When automatic conversations are actually executed, the reply process unit 21 of the conversation server 20 selects the domain 20000, which has a domain name 302 of "coffee beans", from the conversation scenario storage unit 22 as the domain 20000 used for extracting the system uttered sentence corresponding to the user utterance when the user uttered sentence matches the user uttered sentence 401 "ABOUT COFFEE BEANS" as described herein or deems to be the same utterance content. In this case, the reply process unit 21 selects the system uttered sentences while giving priority to the domain 20000.

Figure 21:
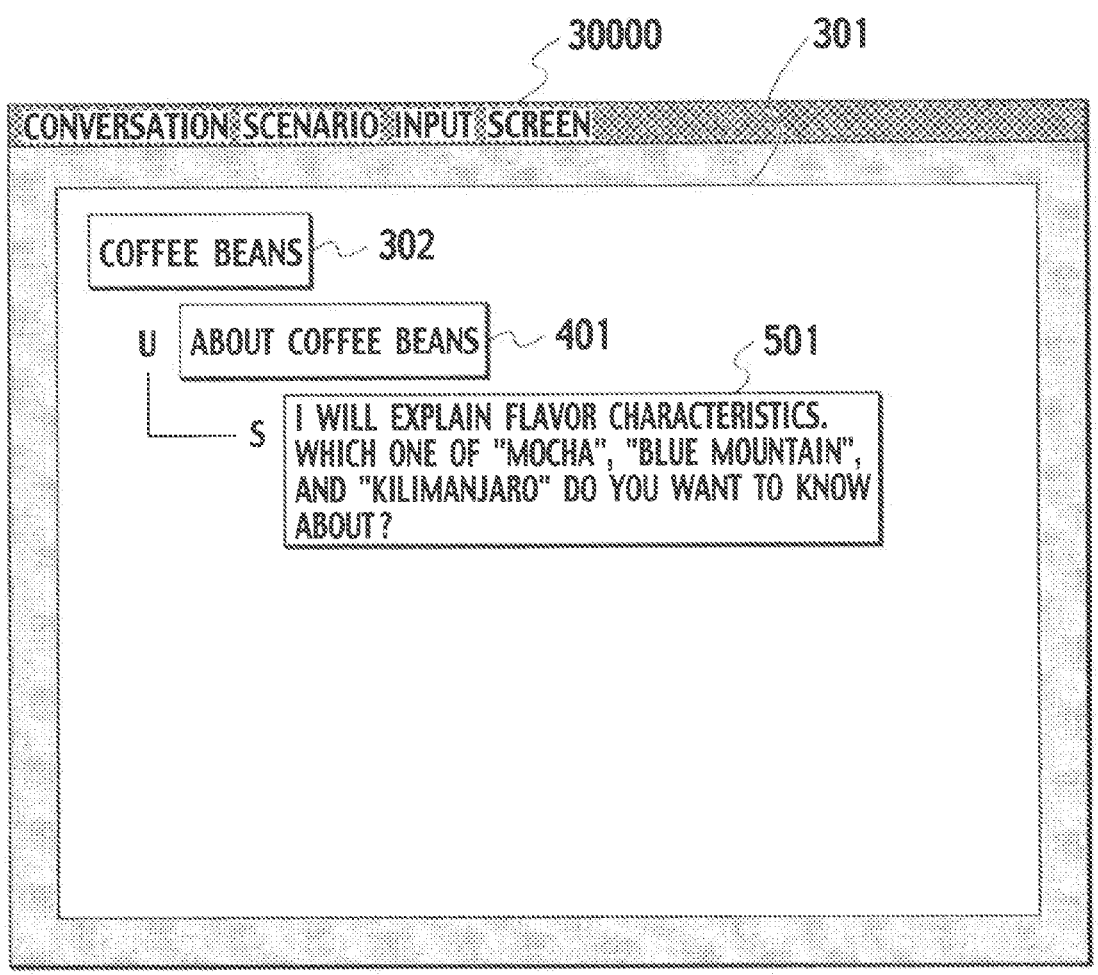
FIG. 21 is another view showing the example of the input screen for generating the conversation scenario data using the conversation scenario editing device which is subsequent to the input screen shown in FIG. 20.

The operator who is an input unit of the conversation scenario inputs the system uttered sentence which is a reply to the user uttered sentence 401. FIG. 21 shows a display example of the window 30000 in a state where a system uttered sentence 501 concerning the user uttered sentence 401 "ABOUT COFFEE BEANS" is inputted by the operator. This example is based on an assumption to describe the conversation scenario in which the automatic conversation system utters the system uttered sentence 501 "I WILL EXPLAIN FLAVOR CHARACTERISTICS. WHICH ONE OF "MOCHA", "BLUE MOUNTAIN", AND "KILIMANJARO" DO YOU WANT TO KNOW ABOUT?" that is an inquiry in response to the user uttered sentence 401 "ABOUT COFFEE BEANS".

Figure 22:
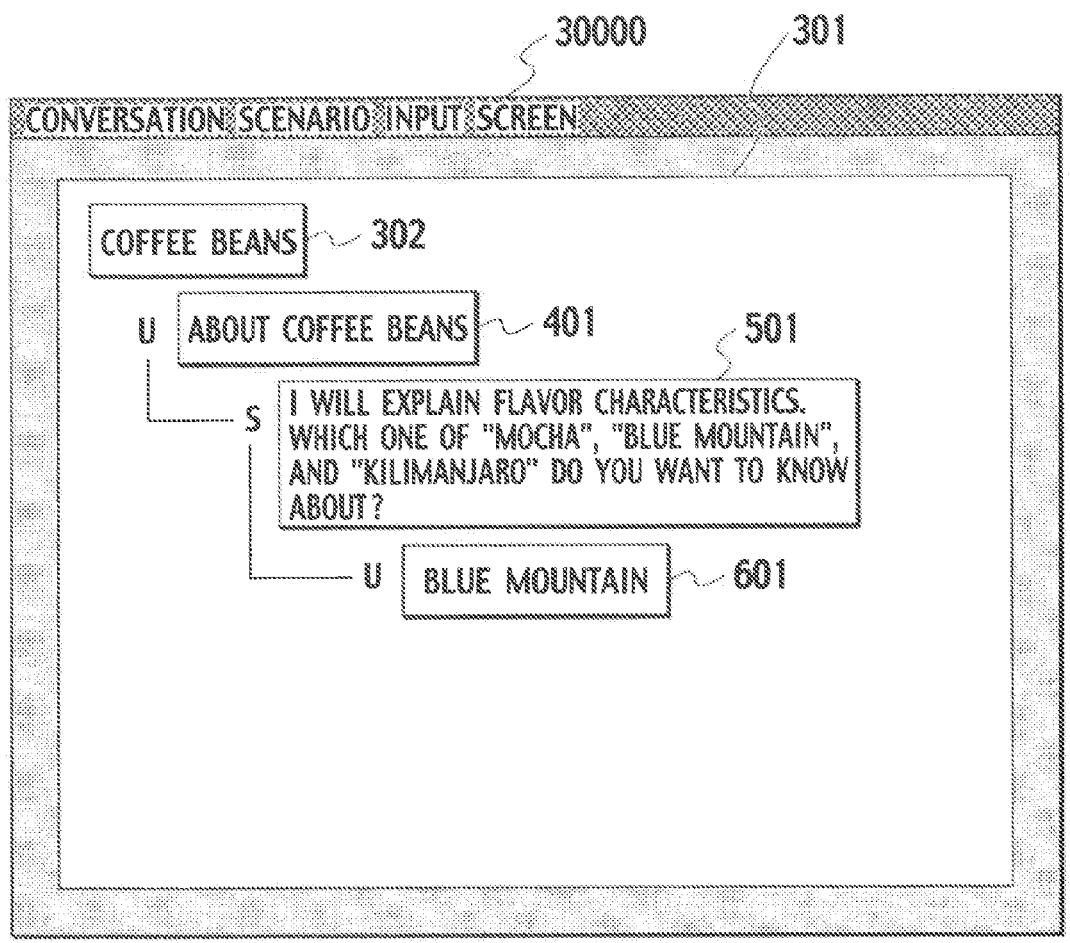
FIG. 22 is another view showing the example of the input screen for generating the conversation scenario data using the conversation scenario editing device which is subsequent to the input screen shown in FIG. 21.

Next, the operator who is the input unit of the conversation scenario inputs a predicted user uttered sentence in response to the system uttered sentence 501. FIG. 22 shows a display example of the window 30000 in a state where a predicted user uttered sentence 601 to be replied to the system uttered sentence 501. This example is based on a prediction that the user replies "BLUE MOUNTAIN" to the system uttered sentence 501 "I WILL EXPLAIN FLAVOR CHARACTERISTICS. WHICH ONE OF "MOCHA", "BLUE MOUNTAIN", AND "KILIMANJARO" DO YOU WANT TO KNOW ABOUT?" and on an assumption that a user uttered sentence 601 "BLUE MOUNTAIN" is inputted by the user.

Figure 23:
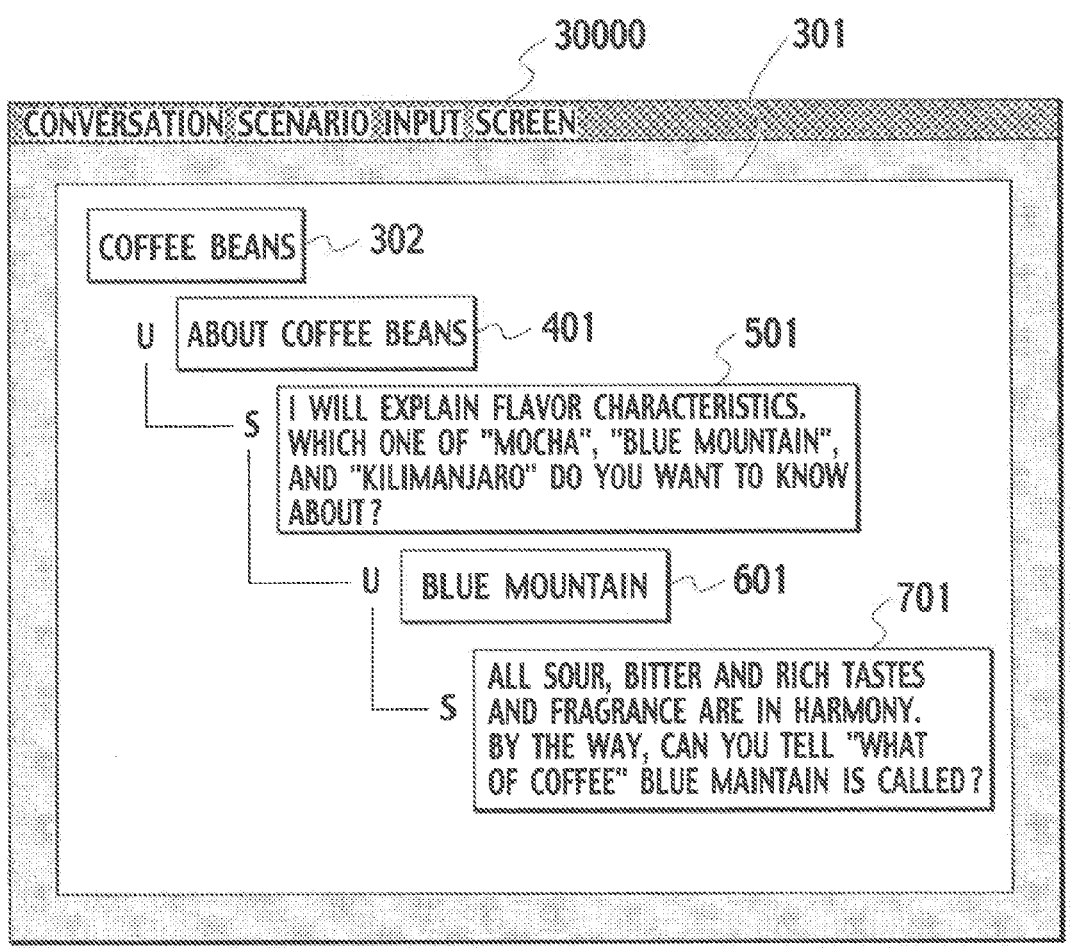
FIG. 23 is another view showing the example of the input screen for generating the conversation scenario data using the conversation scenario editing device which is subsequent to the input screen shown in FIG. 22.

Next, the operator who is the input unit of the conversation scenario inputs a system uttered sentence in response to the user uttered sentence 601. FIG. 23 shows a display example of the window 30000 in a state where a system uttered sentence 701 is inputted in response to the user uttered sentence 601. The input unit of the conversation scenario inputs the system uttered sentence 701 as a reply to the user uttered sentence 601.

By using this conversation scenario, the automatic conversation system can return an appropriate reply to the user who wishes to learn about the Blue Mountain coffee beans. Note that the input unit of the conversation scenario is able to continue to input user uttered sentences and system uttered sentences thereafter so that the conversations between the user and the automatic conversation system continue.

The conversation scenario (a set of the user uttered sentences and the system uttered sentences) thus inputted is written and stored in the conversation scenario retention unit 33 by using the editor unit 32. This conversation scenario is transferred to the conversation scenario storage unit 22 of the conversation server 20. Here, the conversation scenario may be converted and transplanted into a suitable form for the conversation server 20 when the conversation scenario is transferred to the conversation scenario storage unit 22.

The reply process unit 21 of the conversation server 20 is able to output a scenario reply in response to a user utterance by making reference to the new conversation scenario that is stored in the conversation scenario storage unit 22.

(4. Modified Example)

This embodiment can also be realized by being modified as described below.

(1) Modified example of conversation scenario editing device.

Figure 24:
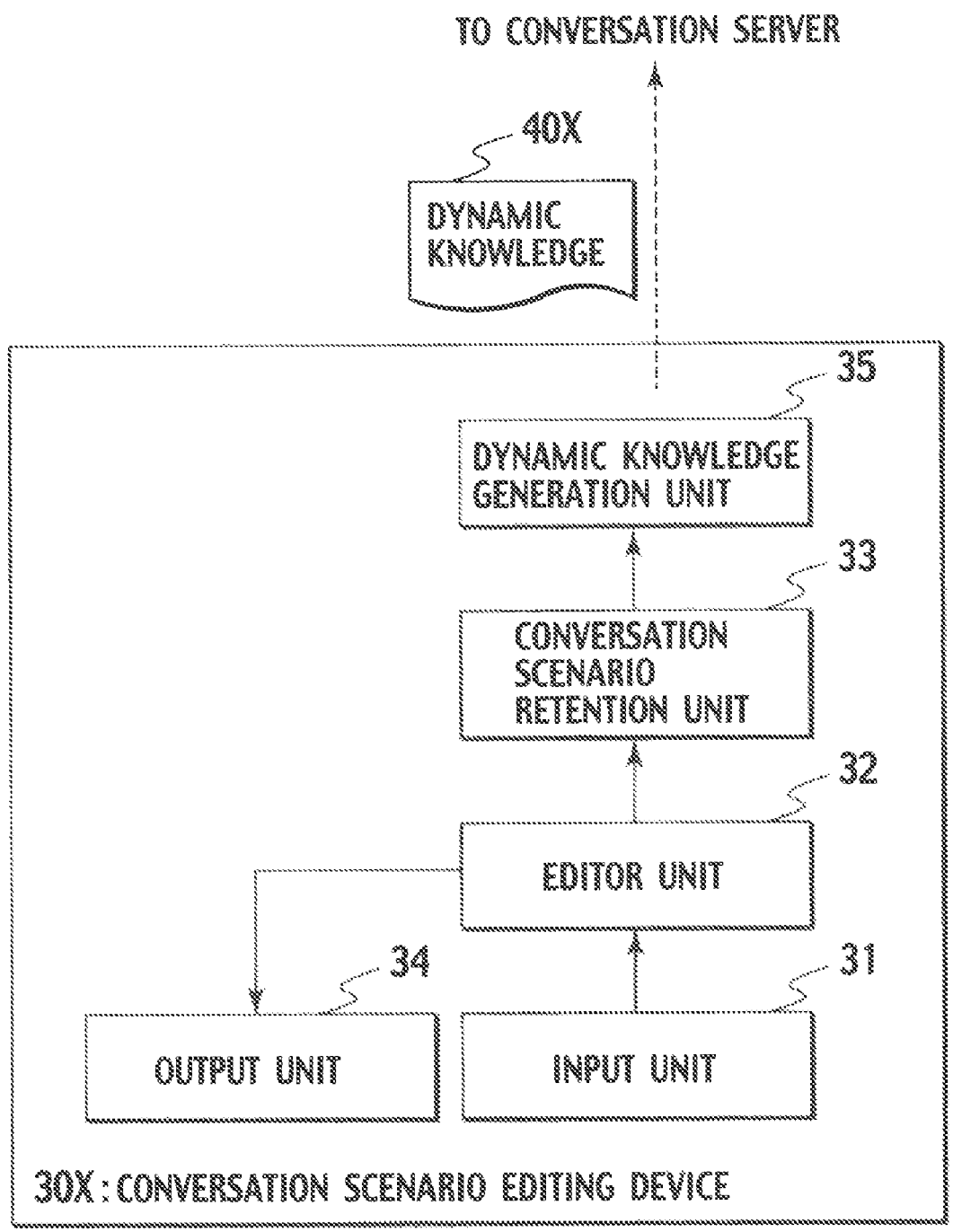
FIG. 24 is a functional block diagram showing a modified configuration example of the conversation scenario editing device.

FIG. 24 is a functional block diagram of a conversation scenario editing device 30X according to a modified example. The conversation scenario editing device 30X basically includes a similar configuration of the above-described conversation scenario editing device 30 and is different in that the device 30X further includes a dynamic knowledge generation unit 35 which is connected to the conversation scenario retention unit 33. Note that the same constituents are designated by the same reference numerals and description thereof will be omitted.

The dynamic knowledge generation unit 35 has a function to generate dynamic knowledge 40X based on the conversation scenario 40 stored in the conversation scenario retention unit 33. The dynamic knowledge 40X represents data reconstructed so as to enable the conversation server 20 to search for the inputted sentence that is the morphism and the reply sentence that is the object thereof at a higher speed and higher efficiency from the conversation scenario which is the reply sequence.

According to this modified example, it is possible to reduce a processing load on the conversation server 20 and to return the reply sentence at a high speed.

(5. Different Example of Configuration of Conversation Server)

Figure 25:
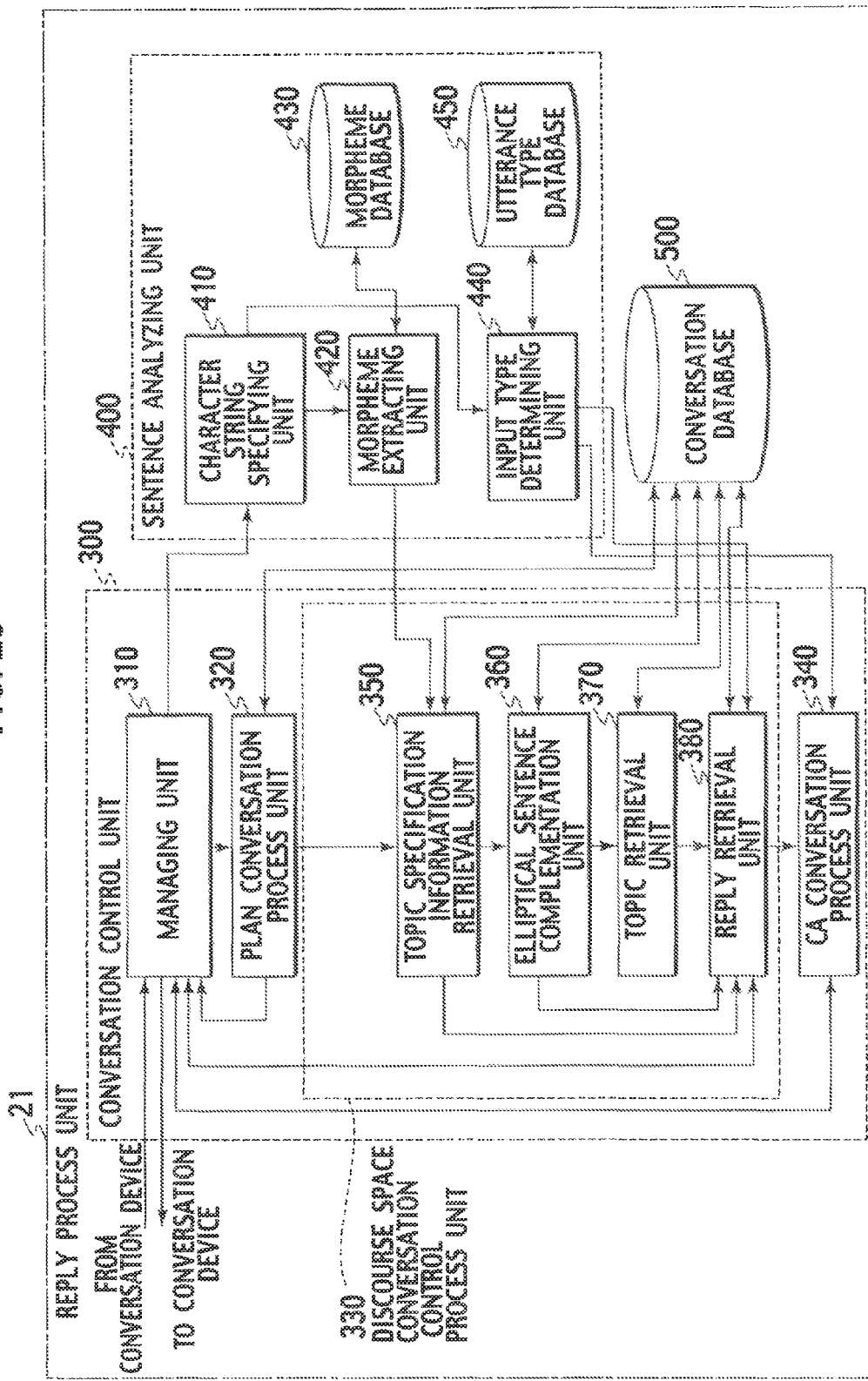
FIG. 25 is a functional block diagram of a reply process unit.

The present invention can also be realized by applying the following configuration of the conversation server 20 and the reply process unit 21. Such a configuration can be achieved by modifying any of the conversation controllers disclosed in US Patent Application Publication No. 2007/0094007, US Patent Application Publication No. 2007/0094008, US Patent Application Publication No. 2007/0094005, and US Patent Application Publication No. 2007/0094004, which are incorporated by reference herein for all purposes. Now, a configuration example of the conversation 20, or more precisely, of the reply process unit 21 will be described below. FIG. 25 is an enlarged block diagram of the reply process unit 21 which is a block diagram showing a concrete configuration example of a conversation controller 300 and a sentence analyzing unit 400. The reply process unit 21 includes the conversation controller 300, the sentence analyzing unit 400, and a conversation database 500. The conversation database 500 has a function to store either the conversation scenario 40 or the dynamic knowledge 40X.

[5.1. Sentence Analyzing Unit]

Next, a configuration example of the sentence analyzing unit 400 will be described with reference to FIG. 25.

The sentence analyzing unit 400 analyses a character string specified at the input unit 100 or the speech recognition unit 200. In the present embodiment as shown in FIG. 25, the sentence analyzing unit 400 includes a character string specifying unit 410, a morpheme extracting unit 420, a morpheme database 430, an input type determining unit 440 and an utterance type database 450. The character string specifying unit 410 segments a series of character strings specified by the input unit 100 or the speech recognition unit 200 into segments. Each segment is a minimum segmented sentence which is segmented in the extent to keep a grammatical meaning. Specifically, if the series of the character strings have a time interval more than a certain interval, the character string specifying unit 410 segments the character strings there. The character string specifying unit 410 outputs the segmented character strings to the morpheme extracting unit 420 and the input type determining unit 440. Note that a "character string" to be described below means one segmented character string.

[5.1.1. Morpheme Extracting Unit]

The morpheme extracting unit 420 extracts morphemes constituting minimum units of the character string as first morpheme information from each of the segmented character strings based on each of the segmented character strings segmented by the character string specifying unit 410. In the present embodiment, a morpheme means a minimum unit of a word structure shown in a character string. For example, each minimum unit of a word structure may be a word class such as a noun, an adjective and a verb.

Figure 26:
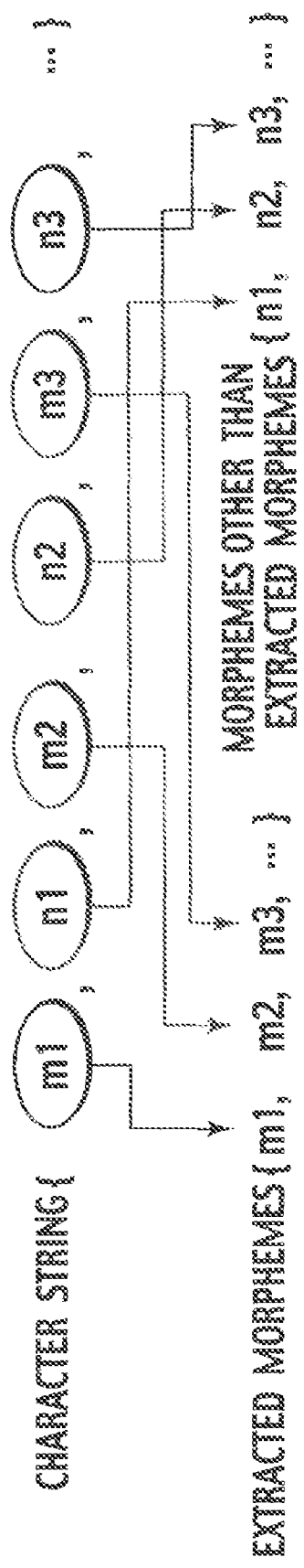
FIG. 26 is a view showing relationships among a character string and morphemes extracted from this character string.

In the present embodiment as shown in FIG. 26, the morphemes are indicated as m1, m2, m3, . . . . FIG. 26. is a diagram showing a relation between a character string and morphemes extracted from the character string. The morpheme extracting unit 420, which has received the character strings from the character string specifying unit 410, compares the received character strings and morpheme groups previously stored in the morpheme database 430 (each of the morpheme group is prepared as a morpheme dictionary in which a direction word, a reading, a word class and infected forms are described for each morpheme belonging to each word-class classification) as shown in FIG. 26. The morpheme extracting unit 420, which has executed the comparison, extracts coincident morphemes (m1, m2, . . . ) with any of the stored morpheme groups from the character strings. Other morphemes (n1, n2, n3, . . . ) than the extracted morphemes may be auxiliary verbs, for example.

The morpheme extracting unit 420 outputs the extracted morphemes to a topic specification information retrieval unit 350 as the first morpheme information. Note that the first morpheme information is not needed to be structurized. Here, "structurizing" means classifying and arranging morphemes included in a character string based on word classes. For example, it may be data conversion in which a character string as an uttered sentence is segmented into morphemes and then the morphemes are arranged in a prescribed order such as "Subject+Object+Predicate". Needless to say, the structurized first morpheme information doesn't prevent the operations of the present embodiment.

[5.1.2 Input Type Determining Unit]

The input type determining unit 440 determines an uttered contents type (utterance type) based on the character strings specified by the character string specifying unit 410. In the present embodiment, the utterance type is information for specifying the uttered contents type and, for example, corresponds to "uttered sentence type" shown in FIG. 27. FIG. 27 is a table showing the "uttered sentence types", two-alphabet codes representing the uttered sentence types, and uttered sentence examples corresponding to the uttered sentence types.

Here in the present embodiment as shown in FIG. 27, the "uttered sentence types" include declarative sentences (D: Declaration), time sentences (T: Time), locational sentences (L: Location), negational sentences (N: Negation) and so on. A sentence configured by each of these types is an affirmative sentence or an interrogative sentence. A "declarative sentence" means a sentence showing a user's opinion or notion. In the present embodiment, one example of the "declarative sentence" is the sentence "I like Sato" shown in FIG. 27. A "locational sentence" means a sentence involving a location concept. A "time sentence" means a sentence involving a time concept. A "negational sentence" means a sentence to deny a declarative sentence. Sentence examples of the "uttered sentence types" are shown in FIG. 27.

In the present embodiment as shown in FIG. 28, the input type determining unit 440 uses a declarative expression dictionary for determination of a declarative sentence, a negational expression dictionary for determination of a negational sentence and so on in order to determine the "uttered sentence type". Specifically, the input type determining unit 440, which has received the character strings from the character string specifying unit 410, compares the received character strings and the dictionaries stored in the utterance type database 450 based on the received character string. The input type determining unit 440, which has executed the comparison, extracts elements relevant to the dictionaries among the character strings.

The input type determining unit 440 determines the "uttered sentence type" based on the extracted elements. For example, if the character string includes elements declaring an event, the input type determining unit 440 determines that the character string including the elements is a declarative sentence. The input type determining unit 440 outputs the determined "uttered sentence type" to a reply retrieval unit 380.

[5.2. Conversation Database]

Figure 29:
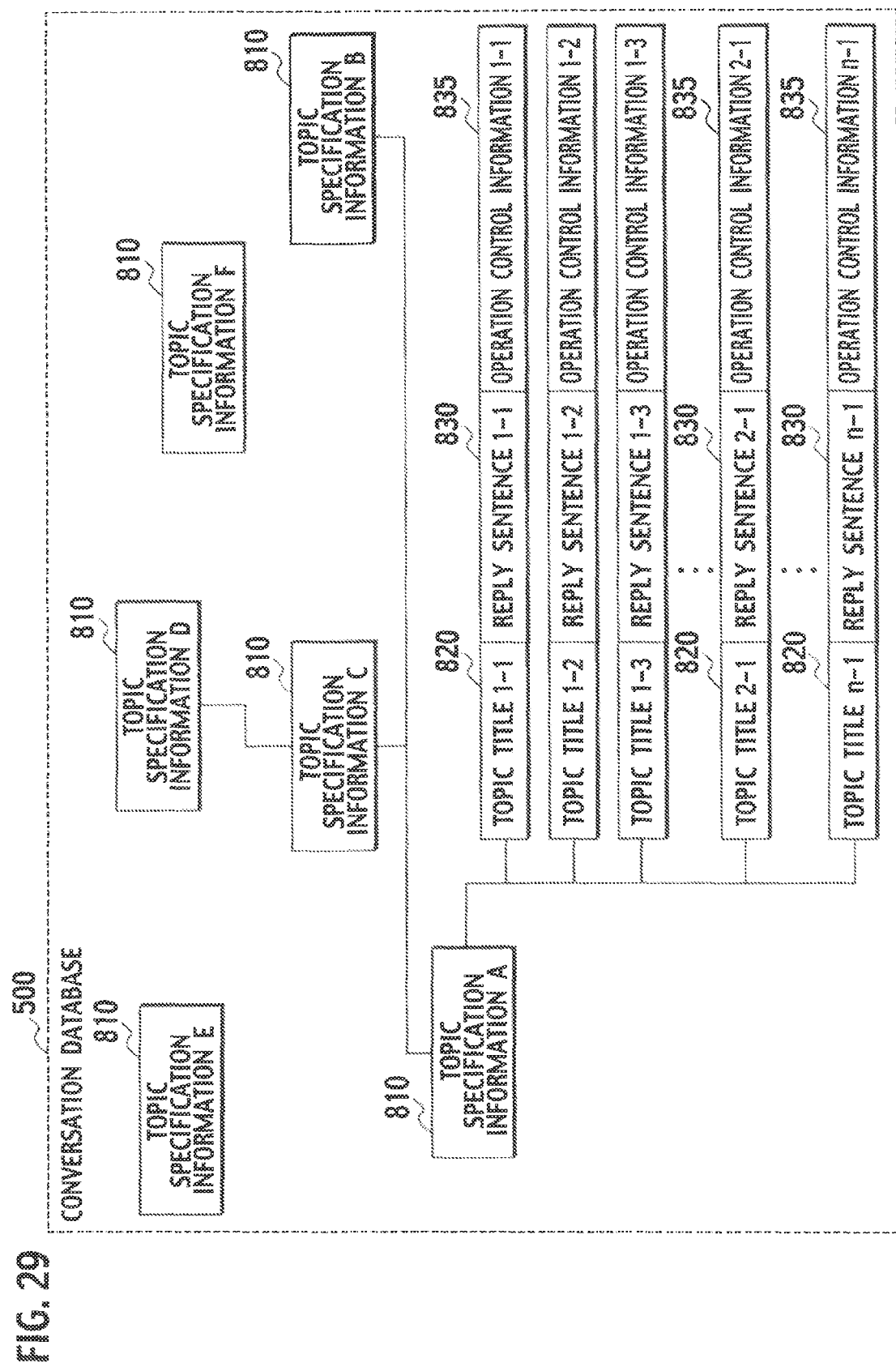
FIG. 29 is a conceptual diagram showing an example of data structures of data stored by a conversation database.

A configuration example of data structure stored in the conversation database 500 will be described with reference to FIG. 29. FIG. 29 is a conceptual diagram showing the configuration example of data stored in the conversation database 500.

As shown in FIG. 29, the conversation database 500 stores a plurality of topic specification information 810 for specifying a conversation topic. In addition, topic specification information 810 can be associated with other topic specification information 810. For example, if topic specification information C (810) is specified, three of topic specification information A (810), B (810) and D (810) associated with the topic specification information C (810) are also specified.

Specifically in the present embodiment, topic specification information 810 means "keywords" which are relevant to input contents expected to be input from users or relevant to reply sentences to users.

The topic specification information 810 is associated with one or more topic titles 820. Each of the topic titles 820 is configured with a morpheme composed of one character, plural character strings or a combination thereof. A reply sentence 830 to be output to users is stored in association with each of the topic titles 820. Response types indicate types of the reply sentences 830 and are associated with the reply sentences 830, respectively. The operation control information is stored in association with each of the reply sentences 830.

Figure 30:
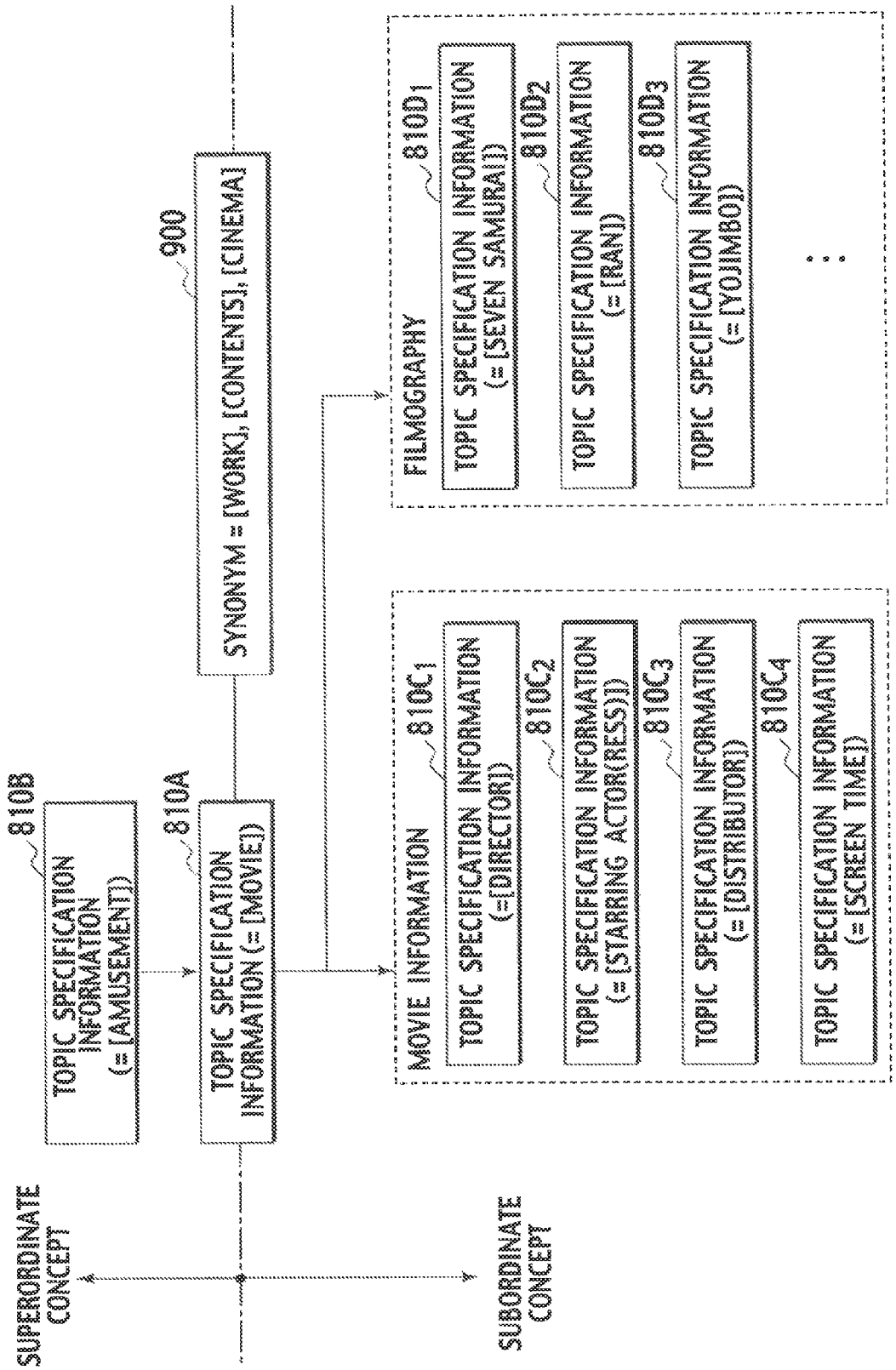
FIG. 30 is a view showing a link between a certain piece of topic specification information and another piece of topic specification information.

Next, an association between the topic specification information 810 and the other topic specification information 810 will be described. FIG. 30 is a diagram showing the association between certain topic specification information 810A and the other topic specification information 810B, $810C_1$-$810C_4$ and $810D_1$-$810D_3$ . . . Note that a phrase "stored in association with" mentioned below indicates that, when certain information X is read out, information Y stored in association with the information X can be also read out. For example, a phrase "information Y is stored 'in association with' the information X" indicates a state where information for reading out the information Y (such as, a pointer indicating a storing address of the information Y, a physical memory address or a logical address in which the information Y is stored, and so on) is implemented in the information X.

In the example shown in FIG. 30, the topic specification information can be stored in association with the other topic specification information with respect to a superordinate concept, a subordinate concept, a synonym or an antonym (not shown in FIG. 18). For example as shown in FIG. 18, the topic specification information 810B (amusement) is stored in association with the topic specification information 810A (movie) as a superordinate concept and stored in a higher level than the topic specification information 810B (amusement).

In addition, subordinate concepts of the topic specification information 810A (movie), the topic specification information $810C_1$ (director), $810C_2$ (starring actor[ress]), $810C_3$ (distributor), $810C_4$ (screen time), $810D_1$ ("Seven Samurai"), $810D_2$ ("Ran"), $810D_3$ ("Yojimbo"), . . . , are stored in association with the topic specification information 810A.

In addition, synonyms 900 are associated with the topic specification information 810A. In this example, "work", "contents" and "cinema" are stored as synonyms of "movie" which is a keyword of the topic specification information 810A. By defining these synonyms in this manner, the topic specification information 810A can be treated as included in an uttered sentence even though the uttered sentence doesn't include the keyword "movie" but includes "work", "contents" or "cinema".

In the reply process unit 21, when certain topic specification information 810 has been specified with reference to contents stored in the conversation database 500, other topic specification information 810 and the topic titles 820 or the reply sentences 830 of the other topic specification information 810, which are stored in association with the certain topic specification information 810, can be retrieved and extracted rapidly.

Next, data configuration examples of topic titles 820 (also referred as "second morpheme information") will be described with reference to FIG. 31. FIG. 31 is a diagram showing the data configuration examples of the topic titles 820.

The topic specification information $810D_1$, $810D_2$, $810D_3$, . . . , include the topic titles $820_1$, $820_2$, . . . , the topic titles $820_3$, $820_4$, . . . , the topic titles $820_5$, $820_6$, . . . , respectively. In the present embodiment as shown in FIG. 31, each of the topic titles 820 is information composed of first specification information 1001, second specification information 1002 and third specification information 1003. Here, the first specification information 1001 is a main morpheme constituting a topic. For example, the first specification information 1001 may be a Subject of a sentence. In addition, the second specification information 1002 is a morpheme closely relevant to the first specification information 1001. For example, the second specification information 1002 may be an Object. Furthermore, the third specification information 1003 in the present embodiment is a morpheme showing a movement of a certain subject, a morpheme of a noun modifier and so on. For example, the third specification information 1003 may be a verb, an adverb or an adjective. Note that the first specification information 1001, the second specification information 1002 and the third specification information 1003 are not limited to the above meanings. The present embodiment can be effected in case where contents of a sentence can be understood based on the first specification information 1001, the second specification information 1002 and the third specification information 1003 even though they are give other meanings (other ward classes).

For example as shown in FIG. 31, if the Subject is "Seven Samurai" and the adjective is "interesting", the topic title $820_2$ (second morpheme information) consists of the morpheme "Seven Samurai" included in the first specification information 1001 and the morpheme "interesting" included in the third specification information 1003. Note that the second specification information 1002 of this topic title $820_2$ includes no morpheme and a symbol "*" is stored in the second specification information 1002 for indicating no morpheme included.

Note that this topic title 8202 (Seven Samurai; *; interesting) has the meaning of "Seven Samurai is interesting." Hereinafter, parenthetic contents for a topic title $820_2$ indicate the specification information 1001, the second specification information 1002 and the third specification information 1003 from the left. In addition, when no morpheme is included in any of the first to third specification information, "*" is indicated therein.

Note that the specification information constituting the topic titles 820 is not limited to three and other specification information (fourth specification information and more) may be included.

The reply sentences 830 will be described with reference to FIG. 32. In the present embodiment as shown in FIG. 32, the reply sentences 830 are classified into different types (response types) such as declaration (D: Declaration), time (T: Time), location (L: Location) and negation (N: Negation) for making a reply corresponding to the uttered sentence type of the user's utterance. Note that an affirmative sentence is classified with "A" and an interrogative sentence is classified with "Q".

Figure 33:
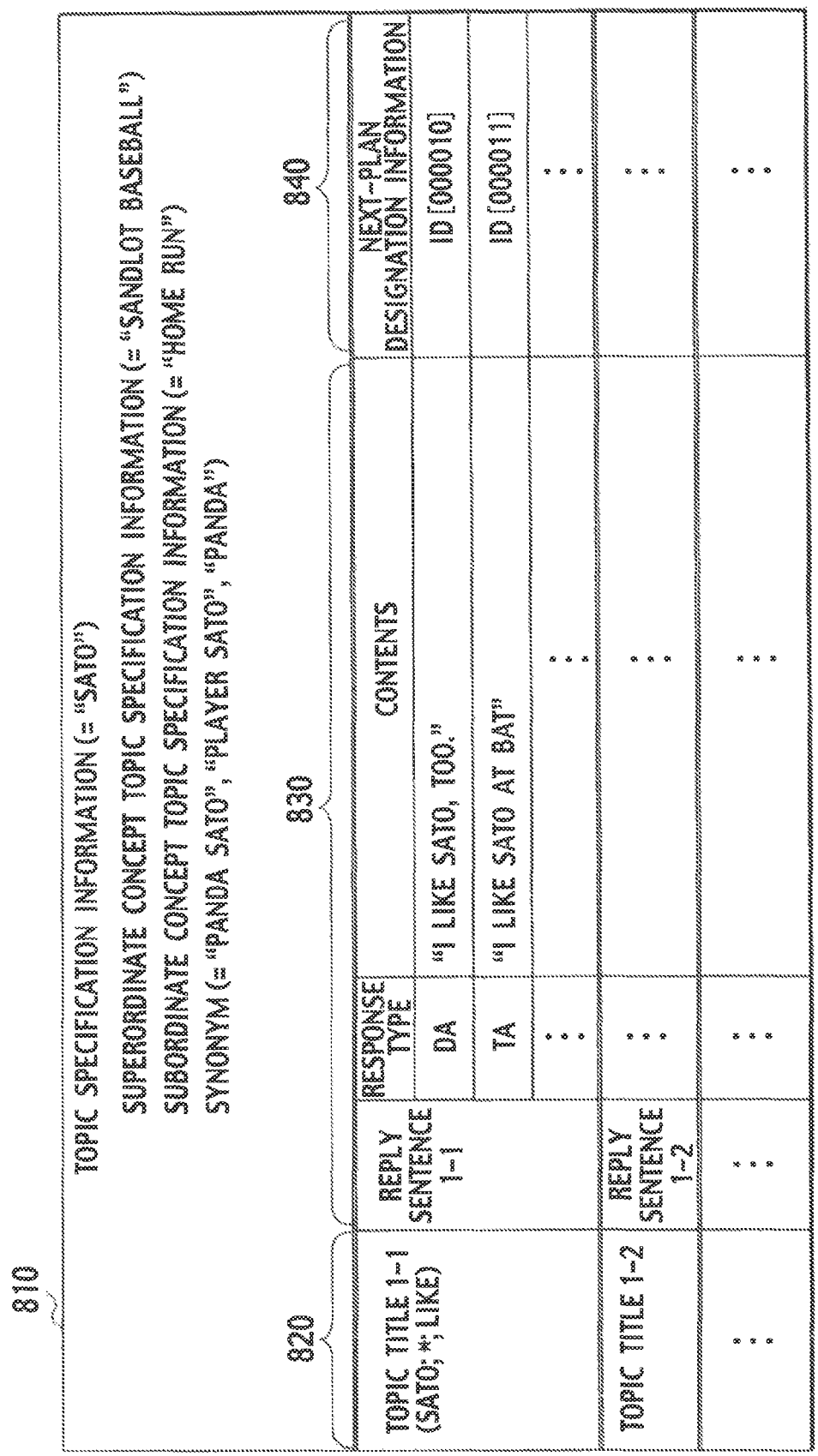
FIG. 33 is a view showing concrete examples of topic titles, reply sentences, and next-plan designation information linked with a certain piece of topic specification information.

A configuration example of data structure of the topic specification information 810 will be described with reference to FIG. 33. FIG. 33 shows a concrete example of the topic titles 820 and the reply sentences 830 associated with the topic specification information 810 "Sato".

The topic specification information 810 "Sato" is associated with plural topic titles (820) 1-1, 1-2, . . . . Each of the topic titles (820) 1-1, 1-2, . . . is associated with reply sentences (830) 1-1, 1-2, . The reply sentence 830 is prepared per each of the response types 840.

For example, when the topic title (820) 1-1 is (Sato; *; like) [these are extracted morphemes included in "I like Sato"], the reply sentences (830) 1-1 associated with the topic title (820) 1-1 include (DA: a declarative affirmative sentence "I like Sato, too.") and (TA: a time affirmative sentence "I like Sato at bat."). The after-mentioned reply retrieval unit 380 retrieves one reply sentence 830 associated with the topic title 820 with reference to an output from the input type determining unit 440.

Next-plan designation information 840 is allocated to each of the reply sentences 830. The next-plan designation information 840 is information for designating a reply sentence to be preferentially output against a user's utterance in association with the each of the reply sentences (referred as a "next-reply sentence"). The next-plan designation information 840 may be any information even if a next-reply sentence can be specified by the information. For example, the information may be a reply sentence ID, by which at least one reply sentence can be specified among all reply sentences stored in the conversation database 500.

In the present embodiment, the next-plan designation information 840 is described as information for specifying one next-reply sentence per one reply sentence (for example, a reply sentence ID). However, the next-plan designation information 840 may be information for specifying next-reply sentences per topic specification information 810 or per one topic title 820. (In this case, since plural replay sentences are designated, they are referred as a "next-reply sentence group". However, only one of the reply sentences included in the next-reply sentence group will be actually output as the reply sentence.) For example, the present embodiment can be effected in case where a topic title ID or a topic specification information ID is used as the next-plan designation information.

[5.3. Conversation Control Unit]

A configuration example of the conversation control unit 300 is further described with referring back to FIG. 25.

The conversation control unit 300 functions to control data transmitting between configuration components in the reply process unit 21 (the speech recognition unit 200, the sentence analyzing unit 400, the conversation database 500, the output unit 600 and the speech recognition dictionary memory 700), and determine and output a reply sentence in response to a user's utterance.

In the present embodiment shown in FIG. 25, the conversation control unit 300 includes a managing unit 310, a plan conversation process unit 320, a discourse space conversation control process unit 330 and a CA conversation process unit 340. Hereinafter, these configuration components will be described.

[5.3.1. Managing Unit]

The managing unit 310 functions to store discourse histories and update, if needed, the discourse histories. The managing unit 310 further functions to transmit some or entire of the stored discourse histories to a part or a whole of the discourse histories to a topic specification information retrieval unit 350, an elliptical sentence complementation unit 360, a topic retrieval unit 370 or a reply retrieval unit 380 in response to a request therefrom.

[5.3.2. Plan Conversation Process Unit]

The plan conversation process unit 320 functions to execute plans and establish conversations between a user and the reply process unit 21 according to the plans. A "plan" means providing a predetermined reply to a user in a predetermined order. Hereinafter, the plan conversation process unit 320 will be described.

The plan conversation process unit 320 functions to output the predetermined reply in the predetermined order in response to a user's utterance.

Figure 34:
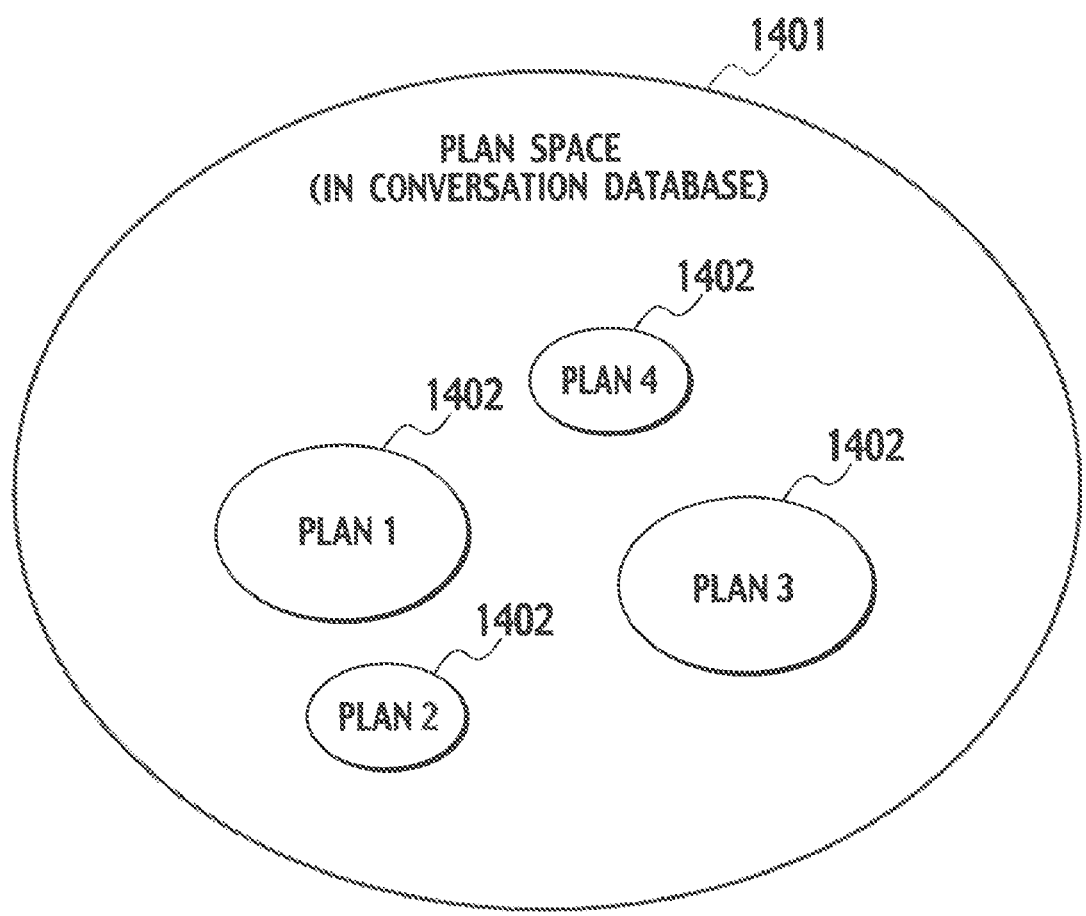
FIG. 34 is a view for explaining a plan space.

FIG. 34 is a conceptual diagram to describe plans. As shown in FIG. 34, various plans 1402 such as plural plans 1, 2, 3 and 4 are prepared in a plan space 1401. The plan space 1401 is a set of the plural plans 1402 stored in the conversation database 500. The reply process unit 21 selects a preset plan 1402 for a start-up on an activation or a conversation start or arbitrarily selects one of the plans 1402 in the plan space 1401 in response to a user's utterance contents in order to output a reply sentence against the user's utterance by using the selected plan 1402.

Figure 35:
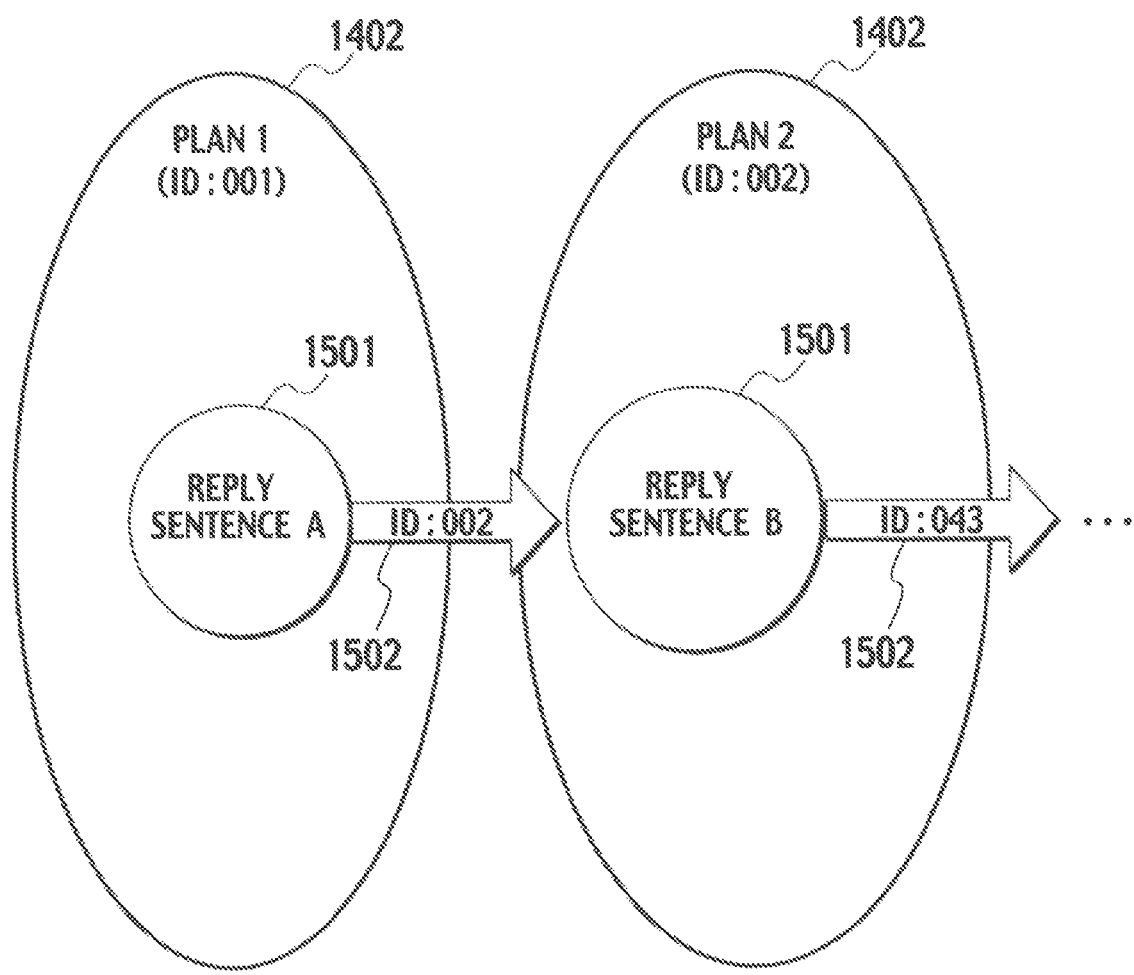
FIG. 35 is a view showing examples of plans.

FIG. 35 shows a configuration example of plans 1402. Each plan 1402 includes a reply sentence 1501 and next-plan designation information 1502 associated therewith. The next-plan designation information 1502 is information for specifying, in response to a certain reply sentence 1501 in a plan 1402, another plan 1402 including a reply sentence to be output to a user (referred as a "next-reply candidate sentence") In this example, the plan 1 includes a reply sentence A (1501) to be output at an execution of the plan 1 by the reply process unit 21 and next-plan designation information 1502 associated with the reply sentence A (1501). The next-plan designation information 1502 is information [ID: 002] for specifying a plan 2 including a reply sentence B (1501) to be a next-reply candidate sentence to the reply sentence A (1501). Similarly, since the reply sentence B (1501) is also associated with next-plan designation information 1502, another plan 1402 [ID: 043] including the next-reply candidate sentence will be designated when the reply sentence B (1501) has output. In this manner, plans 1402 are chained via next-plan designation information 1502 and plan conversations in which a series of successive contents can be output to a user. In other words, since contents expected to be provided to a user (an explanatory sentence, an announcement sentence, a questionnaire and so on) are separated into plural reply sentences and the reply sentences are prepared as a plan with their order predetermined, it becomes possible to provide a series of the reply sentences to the user in response to the user's utterances. Note that a reply sentence 1501 included in a plan 1402 designated by next-plan designation information 1502 is not needed to be output to a user immediately after an output of the user's utterance in response to an output of a previous reply sentence. The reply sentence 1501 included in the plan 1402 designated by the next-plan designation information 1502 may be output after an intervening conversation on a different topic from a topic in the plan between the reply process unit 21 and the user.

Note that the reply sentence 1501 shown in FIG. 35 corresponds to a sentence string of one of the reply sentences 830 shown in FIG. 33. In addition, the next-plan designation information 1502 shown in FIG. 35 corresponds to the next-plan designation information 840 shown in FIG. 33.

Figure 36:
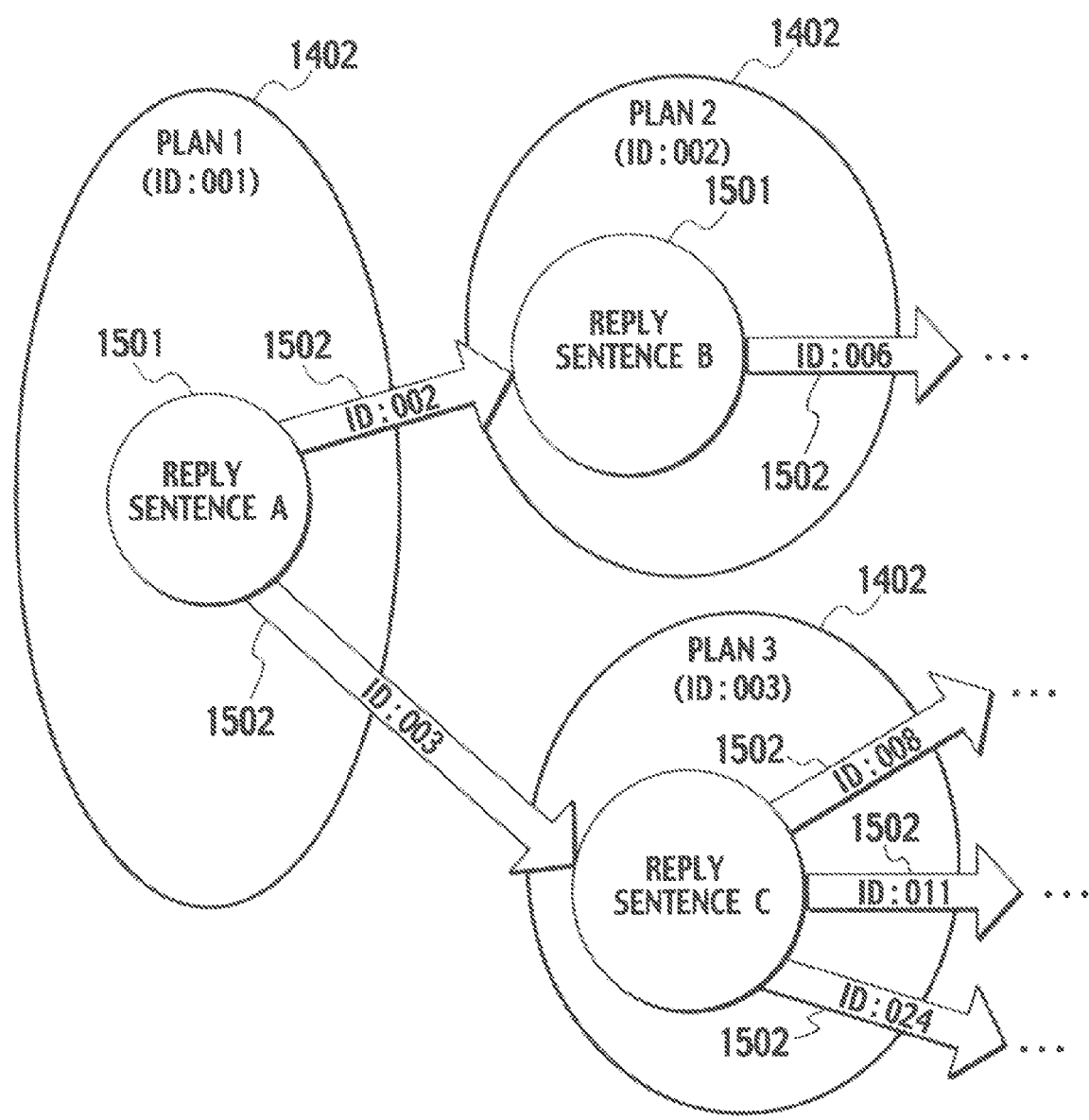
FIG. 36 is a view showing other examples of plans.

Note that linkages between the plans 1402 are not limited to form a one-dimensional geometry shown in FIG. 35. FIG. 36 shows an example of plans 1402 with another linkage geometry. In the example shown in FIG. 36, a plan 1 (1402) includes two of next-plan designation information 1502 to designate two reply sentences as next replay candidate sentences, in other words, to designate two plans 1402. The two of next-plan designation information 1502 are prepared in order that the plan 2 (1402) including a reply sentence B (1501) and the plan 3 (1402) including a reply sentence C (1501) are to be designated as plans each including a next-reply candidate sentence. Note that the reply sentences are selective and alternative, so that, when one has been output, another is not output and then the plan 1 (1501) is terminated. In this manner, the linkages between the plans 1402 is not limited to forming a one-dimensional geometry and may form a tree-diagram-like geometry or a cancellous geometry.

Note that it is not limited that how many next-reply candidate sentences each plan 1402 includes. In addition, no next-plan designation information $1502$ maybe included in a plan $1402$ which terminates a conversation.

Figure 37:
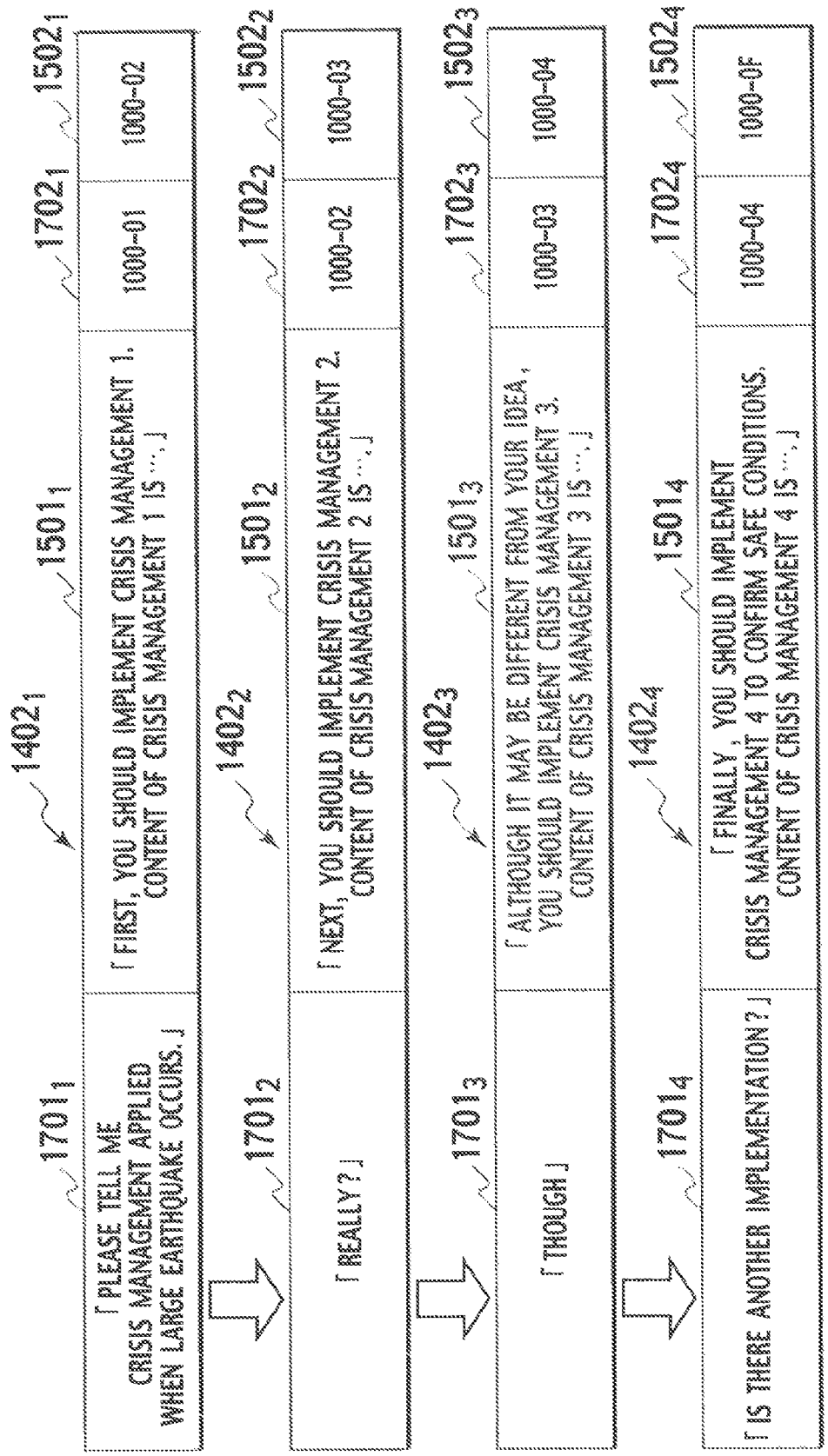
FIG. 37 is a view showing a concrete example of plan conversation processing.

FIG. 37 shows an example of a certain series of plans $1402$. As shown in FIG. 37, this series of plans $1402_1$ to $1402_4$ are associated with reply sentences $1501_1$ to $1501_4$ which notify crisis management information to a user. The reply sentences $1501_1$ to $1501_4$ constitute one coherent topic as a whole (an explanation sentence). Each of the plans $1402_1$ to $1402_4$ includes ID data $1702_1$ to $1702_4$ for indicating itself such as "1000-01, 1000-02", "1000-03" and "1000-04", respectively. Note that each value after a hyphen in the ID data is information indicating an output order. In addition, the plans $1402_1$ to $1402_4$ further include next-plan designation information $1502_1$ to $1502_4$ respectively. The content of the next-plan designation information $1502_4$ is a data of "1000-0F". This value after a hyphen "0F" is information indicating that there is no plan scheduled to be output next and this replay sentence is the final one among a series of topics (an explanation sentence).

In this example, the plan conversation process unit $320$ starts to execute this series of plans when a user has uttered's utterance has been "Please tell me a crisis management applied when a large earthquake occurs." Specifically, the plan conversation process unit $320$ searches in the plan space $1401$ and checks whether or not a plan $1402$ including a reply sentence $1501_1$ associated with the user's utterance "Please tell me a crisis management applied when a large earthquake occurs," when the plan conversation process unit $320$ has received the user's utterance "Please tell me a crisis management applied when a large earthquake occurs." In this example, a user's utterance character string $1701_1$ associated with the user's utterance "Please tell me a crisis management applied when a large earthquake occurs," is associated with a plan $1402_1$.

The plan conversation process unit $320$ retrieves the reply sentence $1501_1$ included in the plan $1402_2$ on discovering the plan $1402_2$ and outputs the reply sentence $1501_1$ to the user as a reply sentence in response to the user's utterance. And then, the plan conversation process unit $320$ specifies the next-reply candidate sentence with reference to the next-plan designation information $1502_1$.

Next, the plan conversation process unit $320$ executes the plan $1402_2$ on receiving another user's utterance via the input unit $100$, a speech recognition unit $200$ or the like after an output of the reply sentence $1501_1$. Specifically, the plan conversation process unit $320$ judges whether or not to execute the plan $1402_2$ designated by the next-plan designation information $15021$, in other words, whether or not to output the second reply sentence $1501_2$. More specifically, the plan conversation process unit $320$ compares a user's utterance character string (also referred as an illustrative sentence) $1701_2$ associated with the reply sentence $1501_2$ and the received user's utterance, or compares a topic title $820$ (not shown in FIG. 37) associated with the reply sentence $1501_2$ and the received user's utterance. And then, the plan conversation process unit $320$ determines whether or not the two are related to each other. If the two are related to each other, the plan conversation process unit $320$ outputs the second reply sentence $1501_2$. In addition, since the plan $1402_2$ including the second reply sentence $1501_2$ also includes the next-plan designation information $1502_2$, the next-reply candidate sentence is specified.

Similarly, according to ongoing user's utterances, the plan conversation process unit $320$ transit into the plans $1402_3$ and $1402_4$ in turn and can output the third and fourth reply sentences $1501_3$ and $1501_4$. Note that, since the fourth reply sentence $1501_4$ is the final reply sentence, the plan conversation process unit $320$ terminates plan-executions when the fourth reply sentence $1501_4$ has been output.

In this manner, the plan conversation process unit $320$ can provide previously prepared conversation contents to the user in a predetermined order by sequentially executing the plans $1402_2$ to $1402_4$.

[5.3.3 Discourse Space Conversation Control Process Unit]

The configuration example of the conversation control unit $300$ is further described with referring back to FIG. 25.

The discourse space conversation control process unit $330$ includes the topic specification information retrieval unit $350$, the elliptical sentence complementation unit $360$, the topic retrieval unit $370$ and the reply retrieval unit $380$. The managing unit $310$ totally controls the conversation control unit $300$.

A "discourse history" is information for specifying a conversation topic or theme between a user and the replay process unit $21$ and includes at least one of "focused topic specification information", a "focused topic title", "user input sentence topic specification information" and "reply sentence topic specification information". The "focused topic specification information", the "focused topic title" and the "reply sentence topic specification information" are not limited to be defined from a conversation done just before but may be defined from the previous "focused topic specification information", the "focused topic title" and the "reply sentence topic specification information" during a predetermined past period or from an accumulated record thereof.

Hereinbelow, each of the units constituting the discourse space conversation control process unit $330$ will be described.

[5.3.3.1. Topic Specification Information Retrieval Unit]

The topic specification information retrieval unit $350$ compares the first morpheme information extracted by the morpheme extracting unit $420$ and the topic specification information, and then retrieves the topic specification information corresponding to a morpheme in the first morpheme information among the topic specification information. Specifically, when the first morpheme information received from the morpheme extracting unit $420$ is two morphemes "Sato" and "like", the topic specification information retrieval unit $350$ compares the received first morpheme information and the topic specification information group.

If a focused topic title $820$ focus (indicated as $820$ focus to be differentiated from previously retrieved topic titles or other topic titles) includes a morpheme (for example, "Sato") in the first morpheme information, the topic specification information retrieval unit $350$ outputs the focused topic title $820$ focus to the reply retrieval unit $380$. On the other hand, if no focused topic title $820$ focus includes the morpheme in the first morpheme information, the topic specification information retrieval unit $350$ determines user input sentence topic specification information based on the received first morpheme information, and then outputs the first morpheme information and the user input sentence topic specification information to the elliptical sentence complementation unit $360$. Note that the "user input sentence topic specification information" is topic specification information corresponding-to or probably-corresponding-to a morpheme relevant to topic contents talked by a user among morphemes included in the first morpheme information.

[5.3.3.2. Elliptical Sentence Complementation Unit]

The elliptical sentence complementation unit $360$ generates various complemented first morpheme information by complementing the first morpheme information with the previously retrieved topic specification information $810$ (hereinafter referred as the "focused topic specification information") and the topic specification information 810 included in the final reply sentence (hereinafter referred as the "reply sentence topic specification information"). For example, if a user's utterance is "like", the elliptical sentence complementation unit 360 generates the complemented first morpheme information "Sato, like" by including the focused topic specification information "Sato" into the first morpheme information "like".

In other words, if it is assumed that the first morpheme information is defined as "W" and a set of the focused topic specification information and the reply sentence topic specification information is defined as "D", the elliptical sentence complementation unit 360 generates the complemented first morpheme information by including an element(s) in the set "D" into the first morpheme information "W".

In this manner, in case where, for example, a sentence constituted with the first morpheme information is an elliptical sentence which is unclear as a language, the elliptical sentence complementation unit 360 can include, by using the set "D", an element(s) (for example, "Sato") in the set "D" into the first morpheme information "W". As a result, the elliptical sentence complementation unit 360 can complement the first morpheme information "like" into the complemented first morpheme information "Sato, like". Note that the complemented first morpheme information "Sato, like" corresponds to a user's utterance "I like Sato."

That is, even when user's utterance contents are provided as an elliptical sentence, the elliptical sentence complementation unit 360 can complement the elliptical sentence by using the set "D". As a result, even when a sentence constituted with the first morpheme information is an elliptical sentence, the elliptical sentence complementation unit 360 can complement the sentence into an appropriate sentence as a language.

In addition, the elliptical sentence complementation unit 360 retrieves the topic title 820 related to the complemented first morpheme information based on the set "D". If the topic title 820 related to the complemented first morpheme information has been found, the elliptical sentence complementation unit 360 outputs the topic title 820 to the reply retrieval unit 380. The reply retrieval unit 380 can output a reply sentence 830 best-suited for the user's utterance contents based on the appropriate topic title 820 found by the elliptical sentence complementation unit 360.

Note that the elliptical sentence complementation unit 360 is not limited to including an element(s) in the set "D" into the first morpheme information. The elliptical sentence complementation unit 360 may include, based on a focused topic title, a morpheme(s) included in any of the first, second and third specification information in the topic title, into the extracted first morpheme information.

[5.3.3.3. Topic Retrieval Unit]

The topic retrieval unit 370 compares the first morpheme information and topic titles 820 associated with the user input sentence topic specification information to retrieve a topic title 820 best-suited for the first morpheme information among the topic titles 820 when the topic title 820 has not been determined by the elliptical sentence complementation unit 360.

Specifically, the topic retrieval unit 370, which has received a retrieval command signal from the elliptical sentence complementation unit 360, retrieves the topic title 820 best-suited for the first morpheme information among the topic titles associated with the user input sentence topic specification information based on the user input sentence topic specification information and the first morpheme information which are included in the received retrieval command signal.

The topic retrieval unit 370 outputs the retrieved topic title 820 as a retrieval result signal to the reply retrieval unit 380.

Above-mentioned FIG. 33 shows the concrete example of the topic titles 820 and the reply sentences 830 associated with the topic specification information 810 (="Sato"). For example as shown in FIG. 33, since topic specification information 810 (="Sato") is included in the received first morpheme information "Sato, like", the topic retrieval unit 370 specifies the topic specification information 810 (="Sato") and then compares the topic titles (820) 1-1, 1-2, . . . associated with the topic specification information 810 (="Sato") and the received first morpheme information "Sato, like".

The topic retrieval unit 370 retrieves the topic title (820) 1-1 (Sato; *; like) related to the received first morpheme information "Sato, like" among the topic titles (820) 1-1, 1-2, based on the comparison result. The topic retrieval unit 370 outputs the retrieved topic title (820) 1-1 (Sato; *; like) as a retrieval result signal to the reply retrieval unit 380.

[5.3.3.4. Reply Retrieval Unit]

The reply retrieval unit 380 retrieves, based on the topic title 820 retrieved by the elliptical sentence complementation unit 360 or the topic retrieval unit 370, a reply sentence associated with the topic title 820. In addition, the reply retrieval unit 380 compares, based on the topic title 820 retrieved by the topic retrieval unit 370, the response types associated with the topic title 820 and the utterance type determined by the input type determining unit 440. The reply retrieval unit 380, which has executed the comparison, retrieves one response type related to the determined utterance type among the response types.

In the example shown in FIG. 33, when the topic title retrieved by the topic retrieval unit 370 is the topic title 1-1 (Sato; *; like), the reply retrieval unit 380 specifies the response type (for example, DA) coincident with the "uttered sentence type" (DA) determined by the input type determining unit 440 among the reply sentences 1-1 (DA, TA and so on) associated with the topic title 1-1. The reply retrieval unit 380, which has specified the response type (DA), retrieves the reply sentence 1-1 ("I like Sato, too.") associated with the response type (DA) based on the specified response type (DA).

Here, "A" in above-mentioned "DA", "TA" and so on means an affirmative form. Therefore, when the utterance types and the response types include "A", it indicates an affirmation on a certain matter. In addition, the utterance types and the response types can include the types of "DQ", "TQ" and so on. "Q" in "DQ", "TQ" and so on means a question about a certain matter.

If the response type takes an interrogative form (Q), a reply sentence associated with this response type takes an affirmative form (A). A reply sentence with an affirmative form (A) may be a sentence for replying to a question and so on. For example, when an uttered sentence is "Have you ever operated slot machines?", the utterance type of the uttered sentence is an interrogative form (Q). A reply sentence associated with this interrogative form (Q) may be "I have operated slot machines before," (affirmative form (A)), for example.

On the other hand, when the response type is an affirmative form (A), a reply sentence associated with this response type takes an interrogative form (Q). A reply sentence in an interrogative form (Q) may be an interrogative sentence for asking back against uttered contents, an interrogative sentence for getting out a certain matter. For example, when the uttered sentence is "Playing slot machines is my hobby," the utterance type of this uttered sentence takes an affirmative form (A). A reply sentence associated with this affirmative form (A) may be "Playing pachinko is your hobby, isn't it?" (an interrogative sentence (Q) for getting out a certain matter), for example.

The reply retrieval unit 380 outputs the retrieved reply sentence 830 as a reply sentence signal to the managing unit 310. The managing unit 310, which has received the reply sentence signal from the reply retrieval unit 380, outputs the received reply sentence signal to the output unit 600.

[5.3.3.5. CA Conversation Process Unit]

When a reply sentence in response to a user's utterance has not been determined by the plan conversation process unit 320 or the discourse space conversation control process unit 330, the CA conversation process unit 340 functions to output a reply sentence for continuing a conversation with a user according to contents of the user's utterance.

With that, describing the configuration example of the reply process unit 21 has ended.

[5.4. Conversation Control Method]

The reply process unit 21 with the above-mentioned configuration puts a conversation control method in execution by operating as described hereinbelow. Operations of the reply process unit 21, more specifically the conversation control unit 300, according to the present embodiment will be described.

Figure 38:
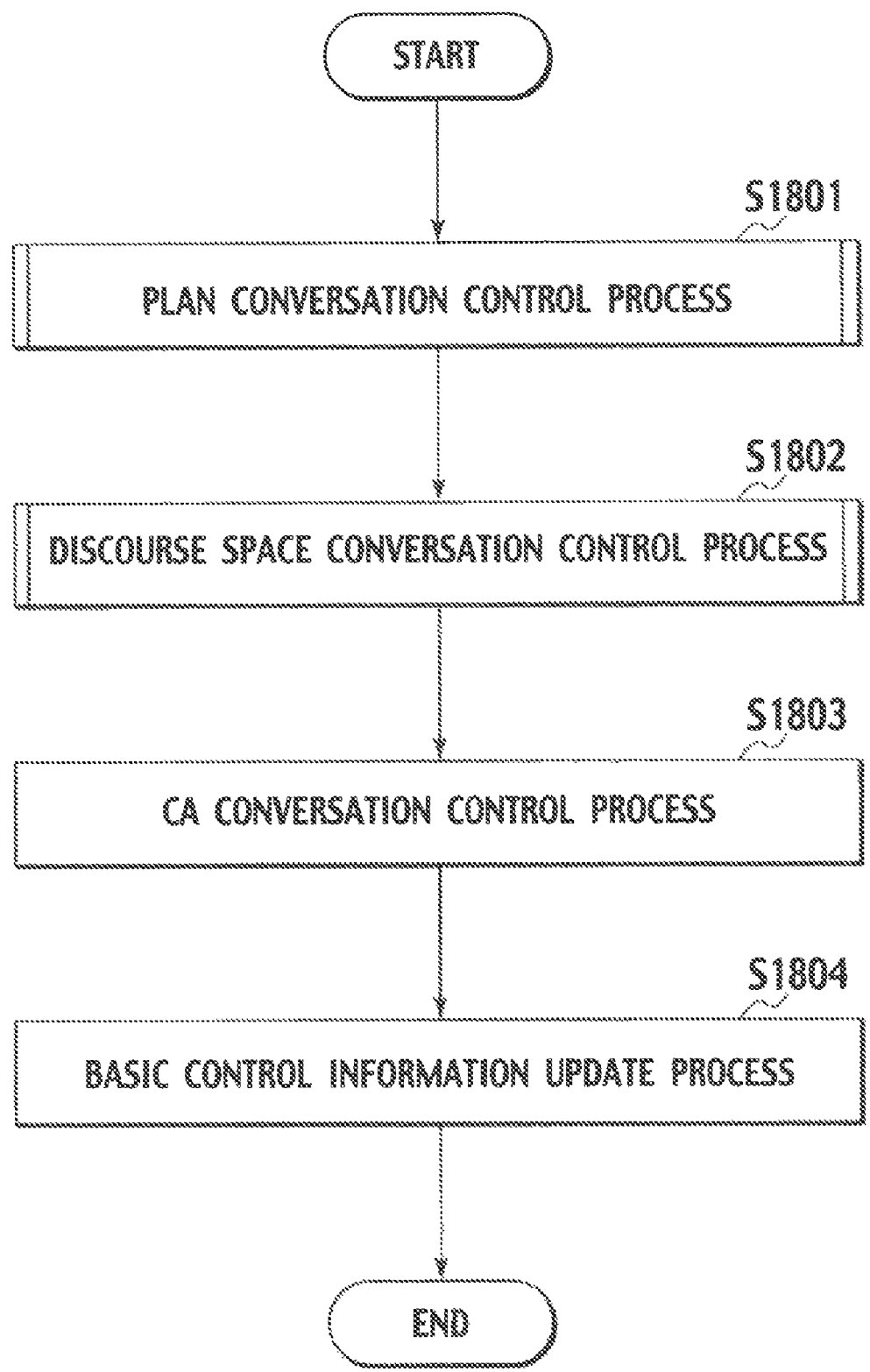
FIG. 38 is a flowchart showing an example of main processing by a conversation controller.

FIG. 38 is a flow-chart showing an example of a main process executed by conversation control unit 300. This main process is a process executed each time when the conversation control unit 300 receives a user's utterance. A reply sentence in response to the user's utterance is output due to an execution of this main process, so that a conversation (an interlocution) between the conversation device 10 and the conversation server 20 (the reply process unit 21) is established.

Upon executing the main process, the conversation controller 300, more specifically the plan conversation process unit 320 firstly executes a plan conversation control process (S1801). The plan conversation control process is a process for executing a plan(s).

Figure 39:
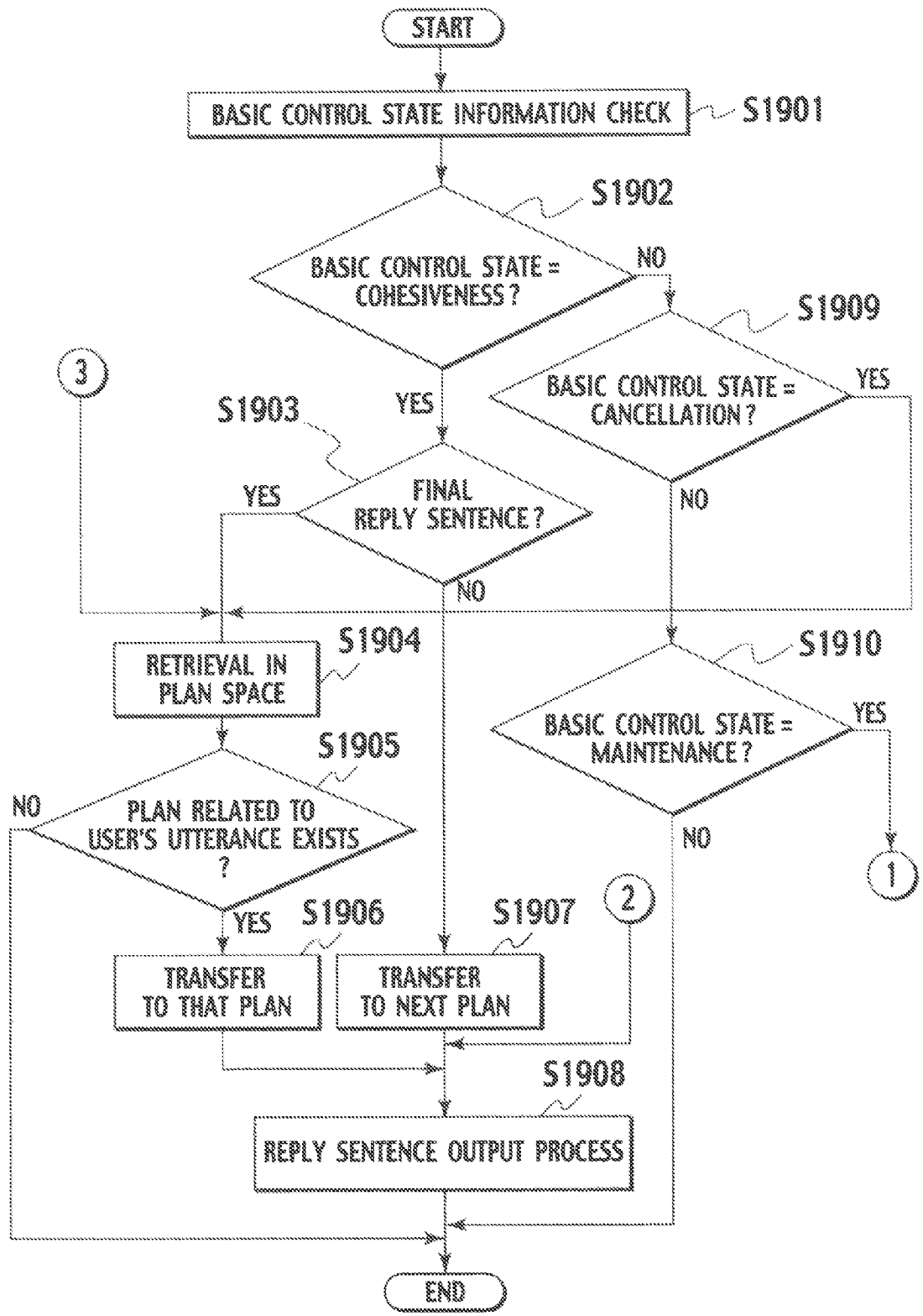
FIG. 39 is a flowchart showing an example of plan conversation control processing.
Figure 40:
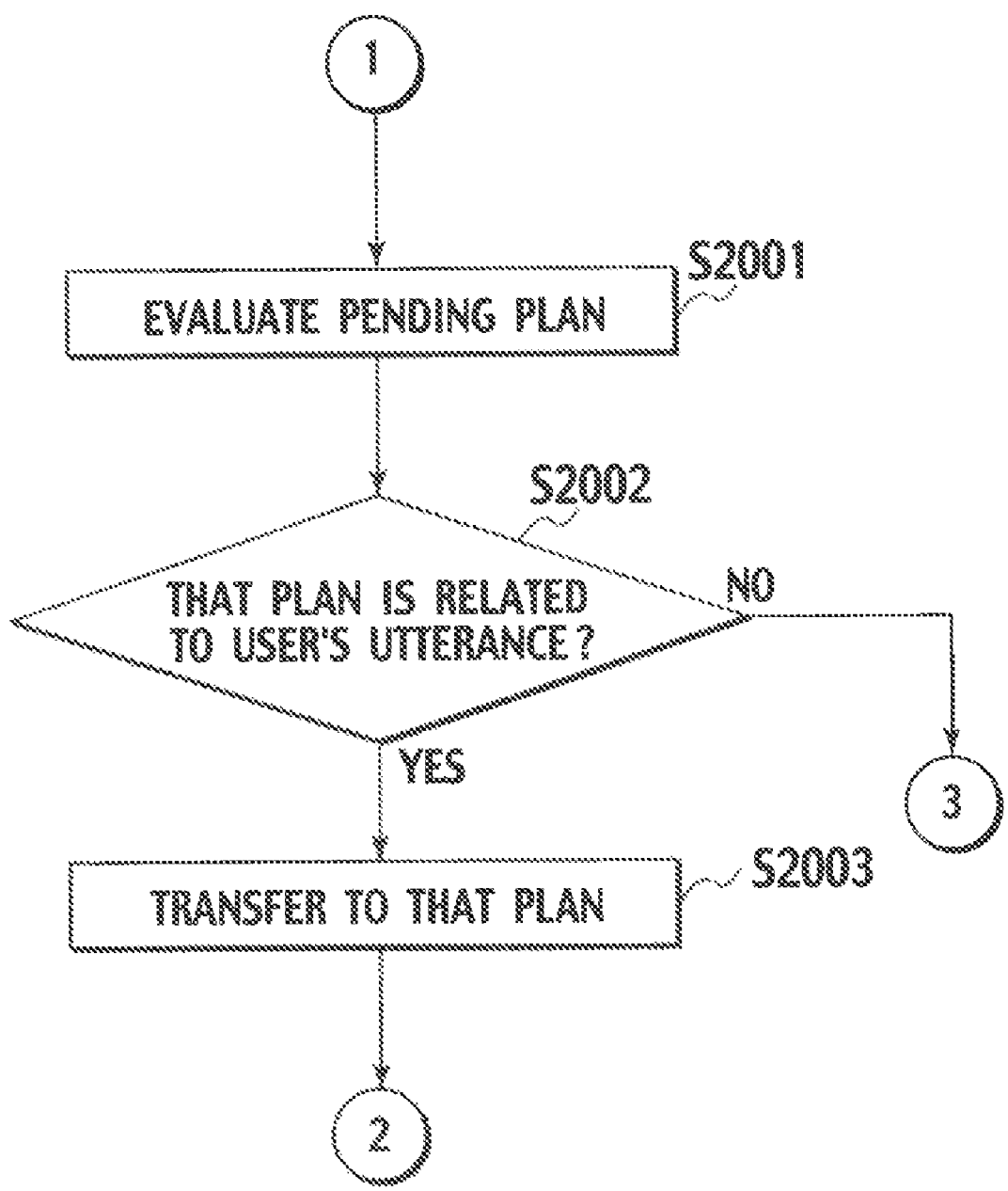
FIG. 40 is another flowchart showing the example of the plan conversation processing subsequent to the flowchart shown in FIG. 39.

FIGS. 39 and 40 are flow-charts showing an example of the plan conversation control process. Hereinbelow, the example of the plan conversation control process will be described with reference to FIGS. 39 and 40.

Upon executing the plan conversation control process, the plan conversation process unit 320 firstly executes a basic control state information check (S1901). The basic control state information is information on whether or not an execution(s) of a plan(s) has been completed and is stored in a predetermined memory area.

The basic control state information serves to indicate a basic control state of a plan.

Figure 41:
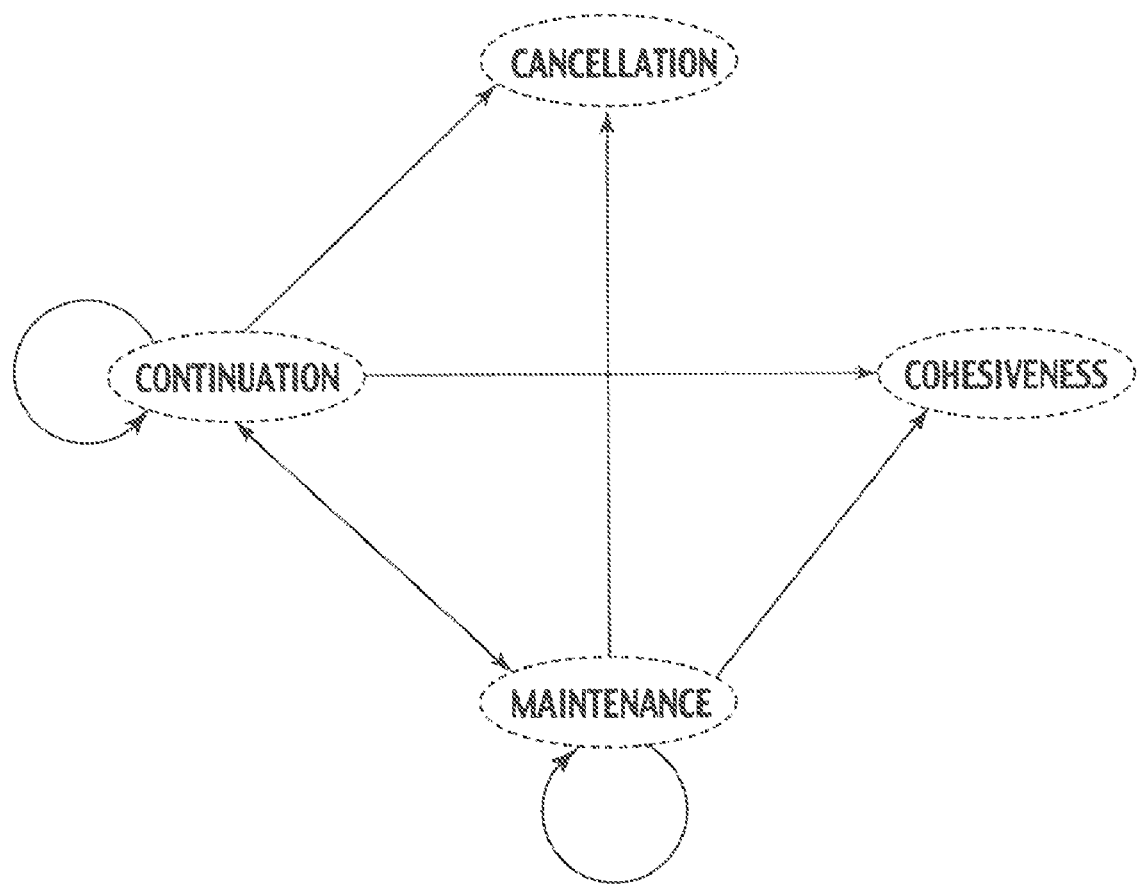
FIG. 41 is a view showing a basic control state.

FIG. 41 is a diagram showing four basic control states which are possibly established due to a so-called scenario-type plan.

(1) Cohesiveness

This basic control state corresponds to a case where a user's utterance is coincident with the currently executed plan 1402, more specifically the topic title 820 or the example sentence 1701 associated with the plan 1402. In this case, the plan conversation process unit 320 terminates the plan 1402 and then transfers to another plan 1402 corresponding to the reply sentence 1501 designated by the next-plan designation information 1502.

(2) Cancellation

This basic control state is a basic control state which is set in a case where it is determined that user's utterance contents require a completion of a plan 1402 or that a user's interest has changed to another matter than the currently executed plan. When the basic control state indicates the cancellation, the plan conversation process unit 320 retrieves another plan 1402 associated with the user's utterance than the plan 1402 targeted as the cancellation. If the other plan 1402 exists, the plan conversation process unit 320 start to execute the other plan 1402. If the other plan 1402 does not exist, the plan conversation process unit 320 terminates a execution(s) of a plan(s).

(3) Maintenance

This basic control state is a basic control state which is set in a case where a user's utterance is not coincident with the topic title 820 (see FIG. 33) or the example sentence 1701 (see FIG. 37) associated with the currently executed plan 1402 and also the user's utterance does not correspond to the basic control state "cancellation".

In the case of this basic control state, the plan conversation process unit 320 firstly determines whether or not to resume a pending or pausing plan 1402 on receiving the user's utterance. If the user's utterance is not adapted for resuming the plan 1402, for example, in case where the user's utterance is not related to a topic title 820 or an example sentence 1701 associated with the plan 1402, the plan conversation process unit 320 starts to execute another plan 1402, an after-mentioned discourse space conversation control process (S1802) and so on. If the user's utterance is adapted for resuming the plan 1402, the plan conversation process unit 320 outputs a reply sentence 1501 based on the stored next-plan designation information 1502.

In case where the basic control state is the "maintenance", the plan conversation process unit 320 retrieves other plans 1402 in order to enable outputting another reply sentence than the reply sentence 1501 associated with the currently executed plan 1402, or executes the discourse space conversation control process. However, if the user's utterance is adapted for resuming the plan 1402, the plan conversation process unit 320 resumes the plan 1402.

(4) Continuation

This state is a basic control state which is set in a case where a user's utterance is not related to reply sentences 1501 included in the currently executed plan 1402, contents of the user's utterance do not correspond to the basic control sate "cancellation" and use's intention construed from the user's utterance is not clear.

In case where the basic control state is the "continuation", the plan conversation process unit 320 firstly determines whether or not to resume a pending or pausing plan 1402 on receiving the user's utterance. If the user's utterance is not adapted for resuming the plan 1402, the plan conversation process unit 320 executes an after-mentioned CA conversation control process in order to enable outputting a reply sentence for getting out a further user's utterance.

The plan conversation control process is further described with referring back to FIG. 39.

The plan conversation process unit 320, which has referred to the basic control state, determines whether or not the basic control state indicated by the basic control state information is the "cohesiveness" (step S1902). If it has been determined that the basic control state is the "cohesiveness" (YES in step S1902), the plan conversation process unit 320 determines whether or not the reply sentence 1501 is the final reply sentence in the currently executed plan 1402 (step S1903).

If it has been determined that the final reply sentence 1501 has been output already (YES in step S1903), the plan conversation process unit 320 retrieves another plan 1402 related to the use's utterance in the plan space in order to determine whether or not to execute the other plan 1402 (step S1904) because the plan conversation process unit 320 has provided all contents to be replied to the user already. If the other plan 1402 related to the user's utterance has not been found due to this retrieval (NO in step S1905), the plan conversation process unit 320 terminates the plan conversation control process because no plan 1402 to be provided to the user exists.

On the other hand, if the other plan 1402 related to the user's utterance has been found due to this retrieval (YES in step S1905), the plan conversation process unit 320 transfers into the other plan 1402 (step S1906). Since the other plan 1402 to be provided to the user still remains, an execution of the other plan 1402 (an output of the reply sentence 1501 included in the other plan 1402) is started.

Next, the plan conversation process unit 320 outputs the reply sentence 1501 included in that plan 1402 (step S1908). The reply sentence 1501 is output as a reply to the user's utterance, so that the plan conversation process unit 320 provides information to be supplied to the user.

The plan conversation process unit 320 terminates the plan conversation control process after the reply sentence output process (step S1908).

On the other hand, if the previously output reply sentence 1501 is not determined as the final reply sentence in the determination whether or not the previously output reply sentence 1501 is the final reply sentence (step S1903), the plan conversation process unit 320 transfers into a plan 1402 associated with the reply sentence 1501 following the previously output reply sentence 1501, i.e. the specified reply sentence 1501 by the next-plan designation information 1502 (step S1907).

Subsequently, the plan conversation process unit 320 outputs the reply sentence 1501 included in that plan 1402 to provide a reply to the user's utterance (step 1908). The reply sentence 1501 is output as the reply to the user's utterance, so that the plan conversation process unit 320 provides information to be supplied to the user. The plan conversation process unit 320 terminates the plan conversation control process after the reply sentence output process (step S1908).

Here, if the basic control state is not the "cohesiveness" in the determination process in step S1902 (NO in step S1902), the plan conversation process unit 320 determines whether or not the basic control state indicated by the basic control state information is the "cancellation" (step S1909). If it has been determined that the basic control state is the "cancellation" (YES in step S1909), the plan conversation process unit 320 retrieves another plan 1402 related to the use's utterance in the plan space 1401 in order to determine whether or not the other plan 1402 to be started newly exists (step S1904) because a plan 1402 to be successively executed does not exist. Subsequently, the plan conversation process unit 320 executes the processes of steps S1905 to S1908 as well as the processes in case of the above-mentioned step S1903 (YES).

On the other hand, if the basic control state is not the "cancellation" in the determination process in step S1902 (NO in step S1902) in the determination whether or not the basic control state indicated by the basic control state information is the "cancellation" (step S1909), the plan conversation process unit 320 further determines whether or not the basic control state indicated by the basic control state information is the "maintenance" (step S1910).

If the basic control state indicated by the basic control state information is the "maintenance" (YES in step S1910), the plan conversation process unit 320 determined whether or not the user presents the interest on the pending or pausing plan 1402 again and then resumes the pending or pausing plan 1402 in case where the interest is presented (step S2001 in FIG. 40). In other words, the plan conversation process unit 320 evaluates the pending or pausing plan 1402 (step S2001 in FIG. 40) and then determines whether or not the user's utterance is related to the pending or pausing plan 1402 (step S2002).

If it has been determined that the user's utterance is related to that plan 1402 (YES in step S2002), the plan conversation process unit 320 transfers into the plan 1402 related to the user's utterance (step S2003) and then executes the reply sentence output process (step S1908 in FIG. 39) to output the reply sentence 1501 included in the plan 1402. Operating in this manner, the plan conversation process unit 320 can resume the pending or pausing plan 1402 according to the user's utterance, so that all contents included in the previously prepared plan 1402 can be provided to the user.

On the other hand, if it has been determined that the user's utterance is not related to that plan 1402 (NO in step S2002) in the above-mentioned S2002 (see FIG. 40), the plan conversation process unit 320 retrieves another plan 1402 related to the use's utterance in the plan space 1401 in order to determine whether or not the other plan 1402 to be started newly exists (step S1904 in FIG. 39). Subsequently, the plan conversation process unit 320 executes the processes of steps S1905 to S1908 as well as the processes in case of the above-mentioned step S1903 (YES).

If it is determined that the basic control state indicated by the basic control state information is not the "maintenance" (NO in step S1910) in the determination in step S1910, it means that the basic control state indicated by the basic control state information is the "continuation". In this case, the plan conversation process unit 320 terminates the plan conversation control process without outputting a reply sentence. With that, describing the plan control process has ended.

The main process is further described with referring back to FIG. 38.

The conversation control unit 300 executes the discourse space conversation control process (step S1802) after the plan conversation control process (step S1801) has been completed. Note that, if the reply sentence has been output in the plan conversation control process (step S1801), the conversation control unit 300 executes a basic control information update process (step S1804) without executing the discourse space conversation control process (step S1802) and the after-mentioned CA conversation control process (step S1803) and then terminates the main process.

Figure 42:
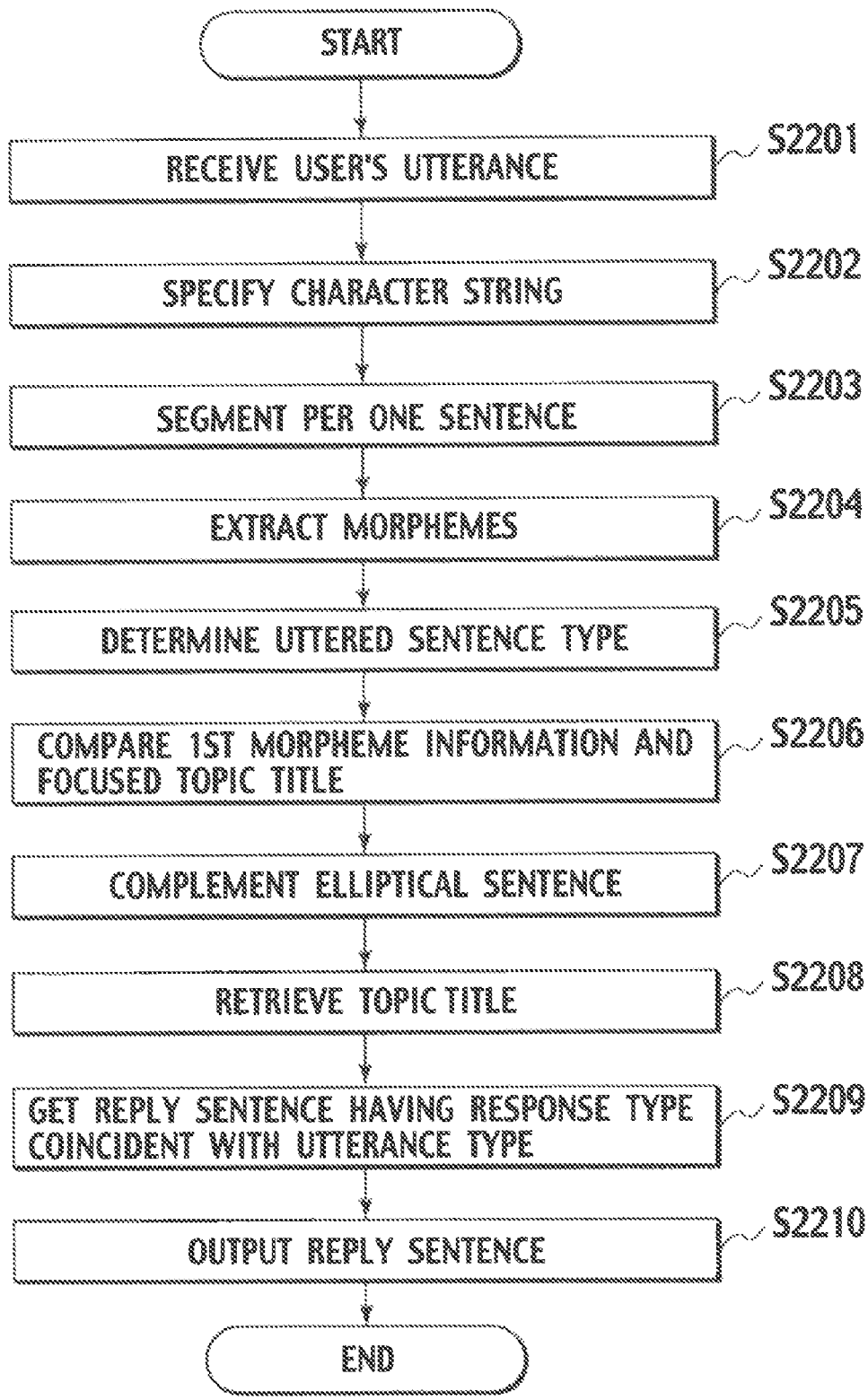
FIG. 42 is a flowchart showing an example of discourse space conversation control processing.

FIG. 42 is a flow-chart showing an example of a discourse space conversation control process according to the present embodiment.

The input unit 100 firstly executes a step for receiving a user's utterance (step S2201). Specifically, the input unit 100 receives voice sounds of the user's utterance. The input unit 100 outputs the received voice sounds to the speech recognition unit 200 as a voice signal. Note that the input unit 100 may receive a character string input by a user (for example, text data input in a text format) instead of the voice sounds. In this case, the input unit 100 may be a text input device such as a keyboard or a touchscreen.

Next, the speech recognition unit 200 executes a step for specifying a character string corresponding to the uttered contents based on the uttered contents retrieved by the input unit 100 (step S2202). Specifically, the speech recognition unit 200, which has received the voice signal from the input unit 100, specifies a word hypothesis (candidate) corresponding to the voice signal based on the received voice signal. The speech recognition unit 200 retrieves a character string corresponding to the specified word hypothesis and outputs the retrieved character string to the conversation control unit 300, more specifically the discourse space conversation control process unit 330, as a character string signal.

And then, the character string specifying unit 410 segments a series of the character strings specified by the speech recognition unit 200 into segments (step S2203). Specifically, if the series of the character strings have a time interval more than a certain interval, the character string specifying unit 410, which has received the character string signal or a morpheme signal from the managing unit 310, segments the character strings there. The character string specifying unit 410 outputs the segmented character strings to the morpheme extracting unit 420 and the input type determining unit 440. Note that it is preferred that the character string specifying unit 410 segments a character string at a punctuation, a space and so on in a case where the character string has been input from a keyboard.

Subsequently, the morpheme extracting unit 420 executes a step for extracting morphemes constituting minimum units of the character string as first morpheme information based on the character string specified by the character string specifying unit 410 (step S2204). Specifically, the morpheme extracting unit 420, which has received the character strings from the character string specifying unit 410, compares the received character strings and morpheme groups previously stored in the morpheme database 430. Note that, in the present embodiment, each of the morpheme groups is prepared as a morpheme dictionary in which a direction word, a reading, a word class and an inflected forms are described for each morpheme belonging to each word-class classification.

The morpheme extracting unit 420, which has executed the comparison, extracts coincident morphemes (m1, m2, . . . ) with the morphemes included in the previously stored morpheme groups from the received character string. The morpheme extracting unit 420 outputs the extracted morphemes to the topic specification information retrieval unit 350 as the first morpheme information.

Next, the input type determining unit 440 executes a step for determining the "uttered sentence type" based on the morphemes which constitute one sentence and are specified by the character string specifying unit 410 (step S2205). Specifically, the input type determining unit 440, which has received the character strings from the character string specifying unit 410, compares the received character strings and the dictionaries stored in the utterance type database 450 based on the received character strings and extracts elements relevant to the dictionaries among the character strings. The input type determining unit 440, which has extracted the elements, determines to which "uttered sentence type" the extracted element(s) belongs based on the extracted element(s). The input type determining unit 440 outputs the determined "uttered sentence type" (utterance type) to the reply retrieval unit 380.

And then, the topic specification information retrieval unit 350 executes a step for comparing the first morpheme information extracted by the morpheme extracting unit 420 and the focused topic title 820 focus (step S2206).

If a morpheme in the first morpheme information is related to the focused topic title 820 focus, the topic specification information retrieval unit 350 outputs the focused topic title 820 focus to the reply retrieval unit 380. On the other hand, if no morpheme in the first morpheme information is related to the focused topic title 820 focus, the topic specification information retrieval unit 350 outputs the received first morpheme information and the user input sentence topic specification information to the elliptical sentence complementation unit 360 as the retrieval command signal.

Subsequently, the elliptical sentence complementation unit 360 executes a step for including the focused topic specification information and the reply sentence topic specification information into the received first morpheme information based on the first morpheme information received from the topic specification information retrieval unit 350 (step S2207). Specifically, if it is assumed that the first morpheme information is defined as "W" and a set of the focused topic specification information and the reply sentence topic specification information is defined as "D", the elliptical sentence complementation unit 360 generates the complemented first morpheme information by including an element(s) in the set "D" into the first morpheme information "W" and compares the complemented first morpheme information and all the topic titles 820 to retrieve the topic title 820 related to the complemented first morpheme information. If the topic title 820 related to the complemented first morpheme information has been found, the elliptical sentence complementation unit 360 outputs the topic title 820 to the reply retrieval unit 380. On the other hand, if no topic title 820 related to the complemented first morpheme information has been found, the elliptical sentence complementation unit 360 outputs the first morpheme information and the user input sentence topic specification information to the topic retrieval unit 370.

Next, the topic retrieval unit 370 executes a step for comparing the first morpheme information and the user input sentence topic specification information and retrieves the topic title 820 best-suited for the first morpheme information among the topic titles 820 (step S2208). Specifically, the topic retrieval unit 370, which has received the retrieval command signal from the elliptical sentence complementation unit 360, retrieves the topic title 820 best-suited for the first morpheme information among topic titles 820 associated with the user input sentence topic specification information based on the user input sentence topic specification information and the first morpheme information included in the received retrieval command signal. The topic retrieval unit 370 outputs the retrieved topic title 820 to the reply retrieval unit 380 as the retrieval result signal.

Next, the reply retrieval unit 380 compares, in order to select the reply sentence 830, the user's utterance type determined by the sentence analyzing unit 400 and the response type associated with the retrieved topic title 820 based on the retrieved topic title 820 by the topic specification information retrieval unit 350, the elliptical sentence complementation unit 360 or the topic retrieval unit 370 (step S2209).

The reply sentence 830 is selected in particular as explained hereinbelow. Specifically, based on the "topic title" associated with the received retrieval result signal and the received "uttered sentence type", the reply retrieval unit 380, which has received the retrieval result signal from the topic retrieval unit 370 and the "uttered sentence type" from the input type determining unit 440, specifies one response type coincident with the "uttered sentence type" (for example, DA) among the response types associated with the "topic title".

Consequently, the reply retrieval unit 380 outputs the reply sentence 830 retrieved in step S2209 to the output unit 600 via the managing unit 310 (S2210). The output unit 600, which has received the reply sentence 830 from the managing unit 310, outputs the received reply sentence 830.

With that, describing the discourse space conversation control process has ended and the main process is further described with referring back to FIG. 38.

The conversation control unit 300 executes the CA conversation control process (step S1803) after the discourse space conversation control process has been completed. Note that, if the reply sentence has been output in the plan conversation control process (step S1801) or the discourse space conversation control (S1802), the conversation control unit 300 executes the basic control information update process (step S1804) without executing the CA conversation control process (step S1803) and then terminates the main process.

The CA conversation control process (Step S1803) is a process in which it is determined whether a user's utterance is an utterance for "explaining something", an utterance for "confirming something", an utterance for "accusing or rebuking something" or an utterance for "other than these", and then a reply sentence is output according to the user's utterance contents and the determination result. By the CA conversation control process, a so-called "bridging" reply sentence for continuing the uninterrupted conversation with the user can be output even if a reply sentence suited for the user's utterance can not be output by the plan conversation control process nor the discourse space conversation control process.

Next, the conversation control unit 300 executes the basic control information update process (step S1804). In this process, the conversation control unit 300, more specifically the managing unit 310, sets the basic control information to the "cohesiveness" when the plan conversation process unit 320 has output a reply sentence, sets the basic control information to the "cancellation" when the plan conversation process unit 320 has cancelled an output of a reply sentence, sets the basic control information to the "maintenance" when the discourse space conversation control process unit 330 has output a reply sentence, or sets the basic control information to the "continuation" when the CA conversation process unit 340 has output a reply sentence.

The basic control information set in this basic control information update process is referred in the above-mentioned plan conversation control process (step S1801) to be employed for continuation or resumption of a plan.

As described the above, the reply process unit 21 can executes a previously prepared plan(s) or can adequately respond to a topic(s) which is not included in a plan(s) according to a user's utterance by executing the main process each time when receiving the user's utterance.

(Second Embodiment)

Next a second embodiment of the present invention will be described.

This embodiment is proposed as a guide system using the above-described automatic conversation system 1. Here, the "guide system" means a system configured to provide a user with services including introduction, guidance, and assistance concerning information, contents, and so forth.

(6.1 Basic Configuration of Guide System)

Figure 43:
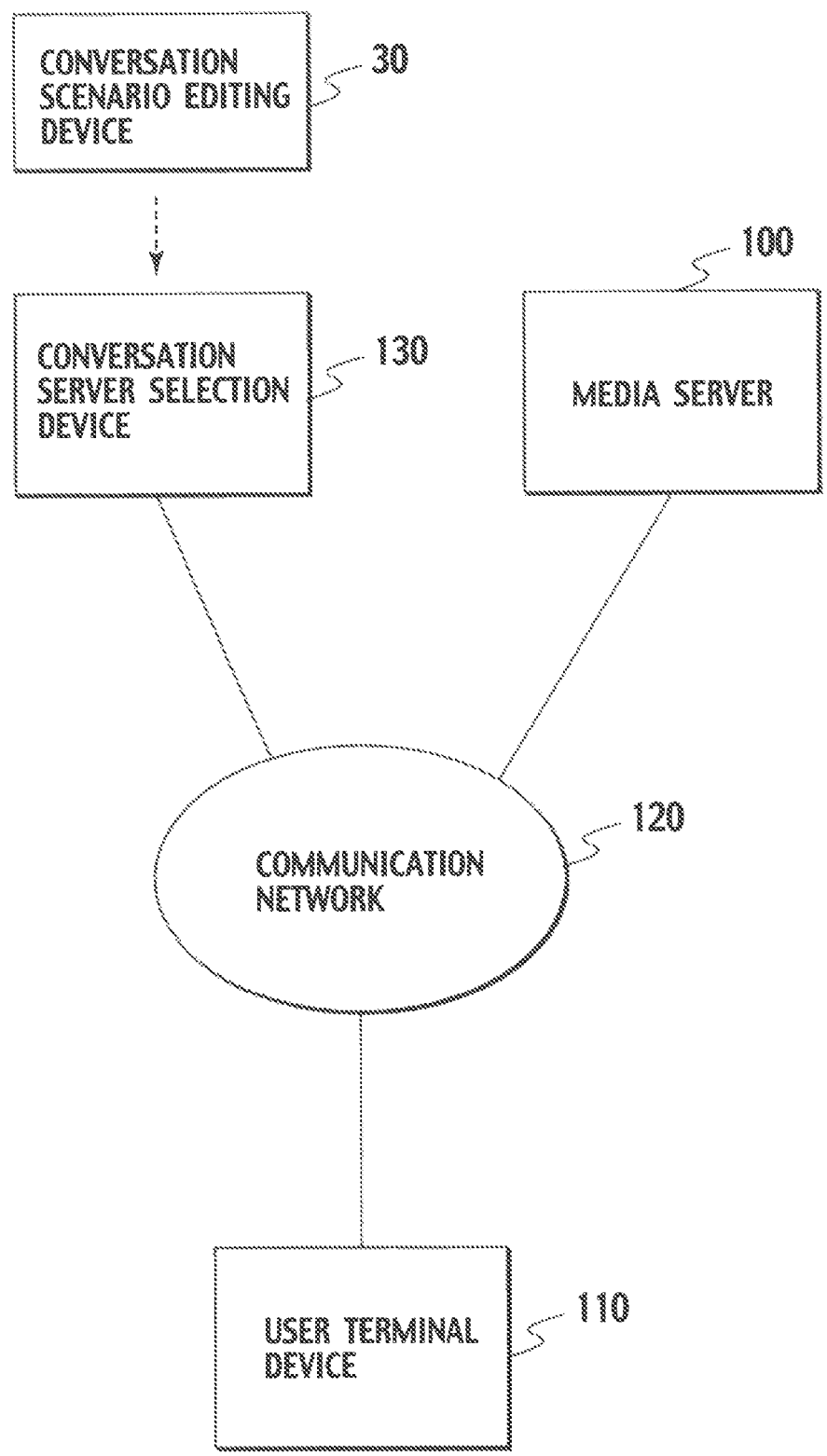
FIG. 43 is a block diagram showing a configuration example of a guide system.

First, a basic configuration of the guide system will be described. FIG. 43 is a block diagram showing a configuration example of the guide system. The guide system shown in FIG. 43 includes a user terminal device 110 connected to a communication network 120, a media server 100 connected to the communication network 120, and a conversation server selection device 130 connected to the communication network 120. Here the conversation scenario 40 used by the conversation server selection device 130 is rendered editable by the conversation scenario editing device 30 as similar to the above-described automatic conversation system 1.

(6.1.1 User Terminal Device)

The user terminal device 110 is the device connected to the media server 100 so as to allow the user to browse contents supplied from the media server 100, which is also configured to function as the above-described conversation device 10.

The user terminal device 110 is realized by an information processing device including a central processing unit (CPU), a main memory (RAM), a read-only memory (ROM), an input-output device (I/O), and an external storage device such as a hard disk device when necessary. Such an information processing device may be a PC (personal computer) having a network communication function, a cellular telephone or a portable game machine, for example. The PC stated herein also includes a product called a "netbook". A netbook is also called a nettop, which is a product having minimum functions as a relatively low-price, small, and lightweight personal computer (notebook PC/desktop PC).

Figure 44:
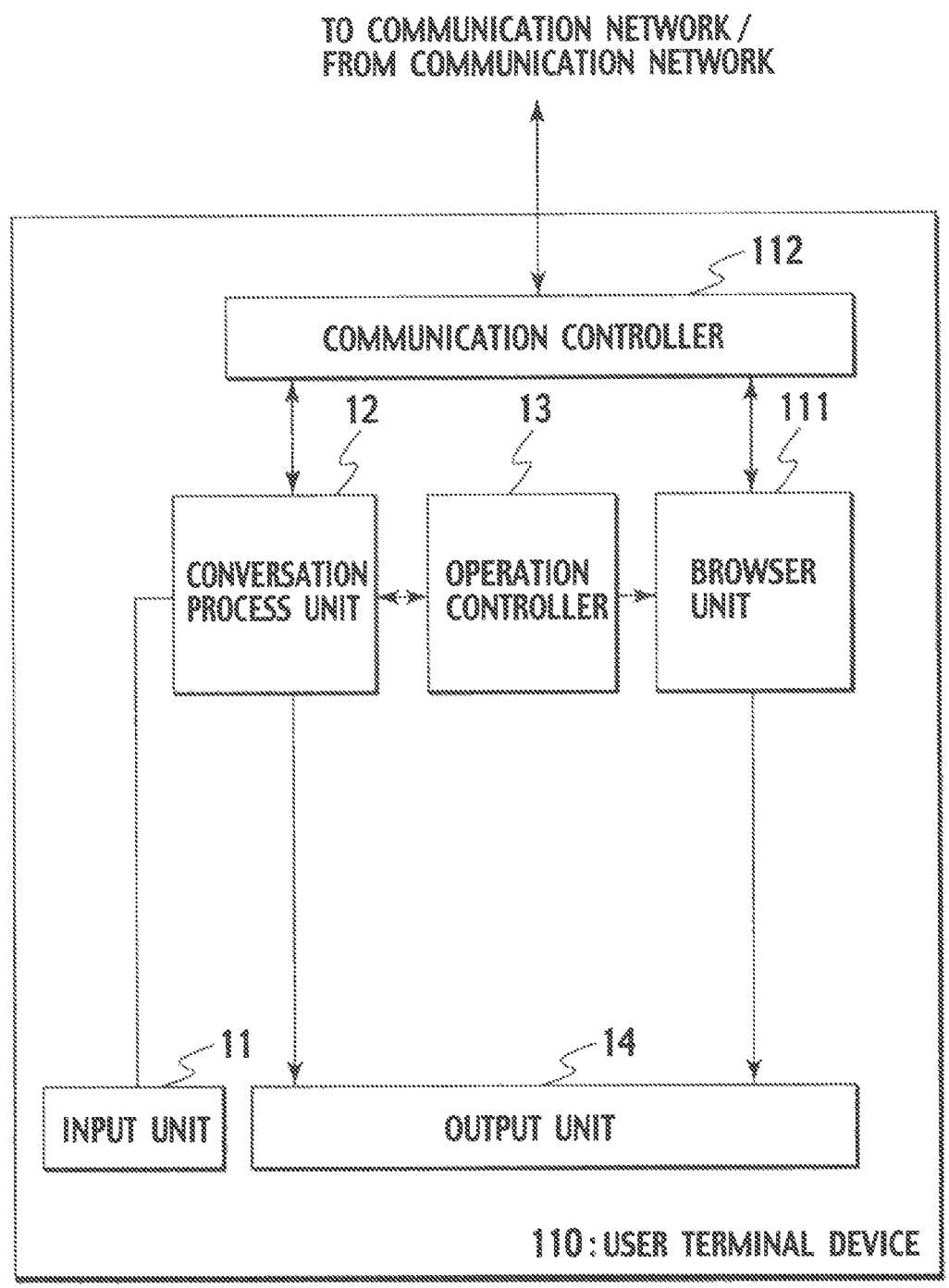
FIG. 44 is a functional block diagram showing a configuration example of a user terminal device.

FIG. 44 is a functional block diagram showing a configuration example of the user terminal device 110. The user terminal device 110 includes a communication controller 112, a browser unit 111 connected to the communication controller 112, the conversation process unit 12 connected to the communication controller 112, the operation controller 13 connected to the conversation process unit 12 and the browser unit 111, the input unit 11 connected to the conversation process unit 12, and the output unit 14 connected to the conversation process unit 12 and the browser unit 111. Here, the same constituents as those in the above-described conversation device 10 are designated by the same reference numerals and description of those constituents will therefore be omitted. Note that the conversation process unit 12 corresponds to a first process unit of the present invention while the operation controller 13 corresponds to second processing means of the present invention.

The communication controller 112 has a function to perform data transmission and reception with the conversation server selection device 130 and the media server 100 through the communication network 120. To be more precise, the communication controller 112 performs execution of predetermined protocols, interconversion between the data and electric signals, and the like. When the user terminal device 110 is the device configured to be connected to the communication network 120 by way of wireless communication (such as a cellular telephone), the communication controller 112 performs reception, demodulation, modulation and transmission of radio signals.

The browser unit 111 corresponding to browsing means of the present invention has functions to receive data of contents (movie files, Web documents such as HTML files, for example) from the media server 100 and to perform interpretation, reproduction, display, execution, and the like so that the user can browse the received contents. The browser unit 111 may be Internet browser software (a Web browser), for example.

(6.1.2. Conversation Server Selection Device)

The conversation server device 130 includes multiple conversation servers 20. The conversation server selection device 130 is the device configured to select and operate any of the conversation servers 20 upon a request from the user terminal device 110 or depending on a situation, and to be operated as the automatic conversation system 1 in tandem with the user terminal device 110.

The conversation server selection device 130 is realized by an information processing device including a central processing unit (CPU), a main memory (RAM), a read-only memory (ROM), an input-output device (I/O), and an external storage device such as a hard disk device when necessary. The information processing device is typically a PC, a workstation, a server or the like. The conversation server selection device 130 may also be constructed by connecting multiple information processing devices through a network.

Figure 45:
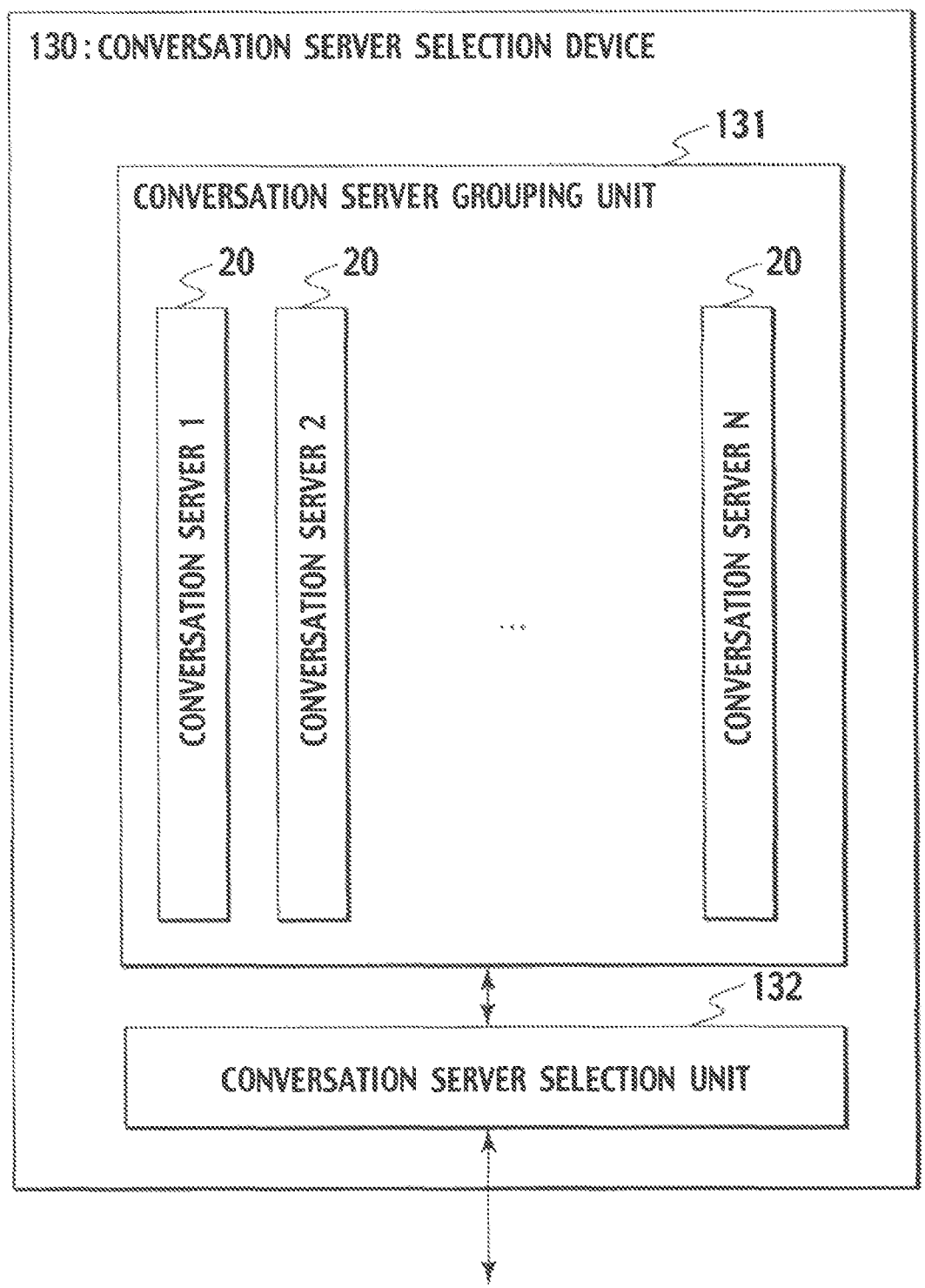
FIG. 45 is a functional block diagram showing a configuration example of a conversation server selection device.

FIG. 45 is a functional block diagram showing a configuration example of the conversation server selection device 130. The conversation server selection device 130 includes a conversation server grouping unit 131 having the multiple conversation servers 20, and a conversation server selection unit 132. Each of the multiple conversation servers 20 is independently provided with the semantic interpretation dictionary unit 23 and the conversation scenario 22 (see FIG. 3) and is prepared to deal with a topic dedicated to each of the servers 20. Among the conversation servers 20 there is prepared the conversation server 20 for dealing with general topics. First of all, this particular conversation server 20 (which will be hereinafter referred to as a general-purpose conversation server 20 for the purpose of distinction) is selected and started for performing conversations with the user. Then, other conversation servers 20 suitable for the topic emerging from the conversations will be started to take over the processing for conversations with the user.

The conversation server selection unit 132 selectively starts the conversation servers 20 included in the conversation server grouping unit 131 (newly starts the designated conversation server 20 and terminates the conversation 20 in operation at that point) in response to a request or an instruction from the user terminal device 110, or namely from the operation controller 13.

The user terminal device 110, or namely the operation controller 13 transmits the request or the instruction for selecting the conversation server 20 to the conversation server selection device 130 on the basis of operation control information. When an inputted sentence that is a user utterance represents "I WOULD LIKE TO KNOW ABOUT WEATHER.", for example, a sentence "THEN, LET'S TALK ABOUT WEATHER>" is prepared as a reply sentence. The operation control information for staring the particular conversation server 20 that includes the conversation scenario storage unit 22 storing the conversation scenario 40 concerning the weather may be prepared for this reply sentence.

(6.1.3. Media Server)

The media server 100 is the device configured to transmit the contents browsable by the user terminal device 110, or namely the browser unit 111, to the user terminal device 110 through the communication network 120.

(6.2. Operations)

Next, an operation example of the guide system will be described.

When the user terminal device 110 is started, the conversation process unit 12 requests the conversation server selection device 130 to start the general-purpose conversation server 20. The conversation server selection device 130 starts the general-purpose conversation server 20 in response to this request and stands by for an inputted sentence from the user.

Figure 46:
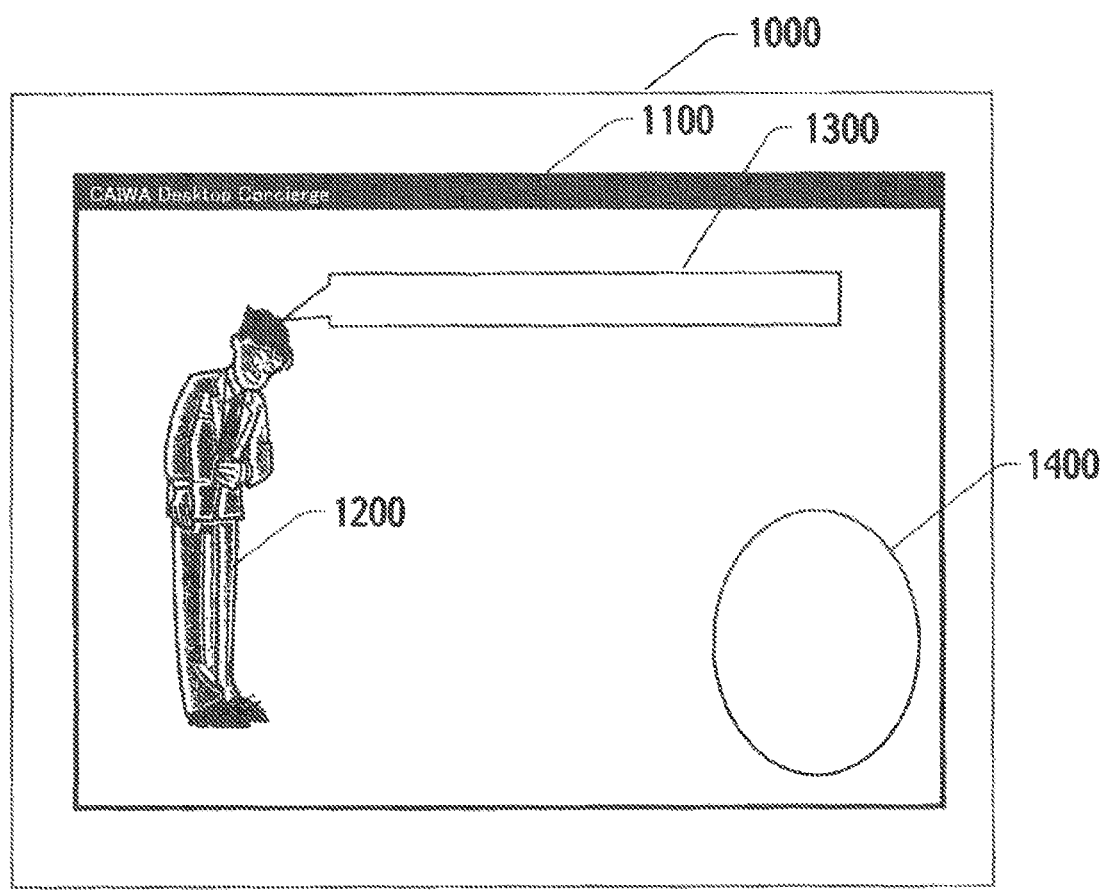
FIG. 46 is a view showing a screen example to be displayed on an output unit of the user terminal device.

FIG. 46 shows a screen example to be displayed on the output unit 14 (which is assumed to be a liquid crystal display device in this example) of the user terminal device 110 when the conversation server selection device 130 starts the general-purpose conversation server 20 and stands by for the inputted sentence from the user. As shown in the drawing, a window 1100 is created inside a display area 1000 of the liquid crystal display device serving as the output unit 14, and a character 1200 corresponding to the general-purpose conversation server 20 is displayed inside the window 1100. The character 1200 is provided with a character display box 1300 and a reply sentence is displayed as a character string in this character display box. Although the reply sentence is assumed to be outputted as the character string in the example described herein, it is also possible to provide the user with the reply sentence by means of voice output using artificial voice instead of displaying the character string or together with displaying the character string.

A started character display area 1400 is further provided on a lower right end inside the display area 1000. When any of the conversation servers 20 other than the general-purpose conversation server 20 is started by the conversation server selection device 130, a character corresponding to the conversation server 20 thus started (which will be hereinafter referred to as an active conversation server 20 for the purpose of distinction) is displayed in the started character display area 1400.

Now, an assumption will be made herein that a user utterance "I WANT TO WATCH A COOKING PROGRAM." is inputted to the user terminal device 110 in the state of FIG. 46 by using the input unit 11. The user terminal device 110 requests the general-purpose conversation server 20 started by the conversation server selection device 130 at this point to provide a reply sentence to the user utterance "I WANT TO WATCH A COOKING PROGRAM." The general-purpose conversation server 20 selects a sentence "CERTAINLY." as the reply sentence and transmits the reply sentence to the user terminal device 110. Meanwhile, the operation control information is attached to this reply sentence "CERTAINLY." This operation control information describes a request for the conversation server selection device 130 to start the conversation server 20 which deals with the topic concerning cooking programs.

Upon receipt of the reply sentence and the operation control information, the user terminal device 110 displays the reply sentence in the character display box 1300 and transmits a request message to the conversation server selection device 130 for starting the conversation server 20 that is designated by operation control information, and that deals with the topic concerning cooking programs.

In response to this message, the conversation server selection device 130 starts the designated conversation server 20 as the active conversation server 20. Reply sentences in response to subsequent user utterances will be determined by this active conversation server 20 instead of the general-purpose conversation server 20. Here, the active conversation server 20 selects a reply sentence "WHICH COOKING PROGRAM WOULD YOU LIKE TO WATCH?" in response to the precedent user utterance "I WANT TO WATCH A COOKING PROGRAM." from the conversation scenario storage unit 22 of the conversation server and transmits the reply sentence to the user terminal device 110 together with operation control information set up with the reply sentence. In this example, a command to display an image of a preset character as a character for this active conversation server 20 in the started character display area 1400 is assumed to be described as the operation control information.

Figure 47:
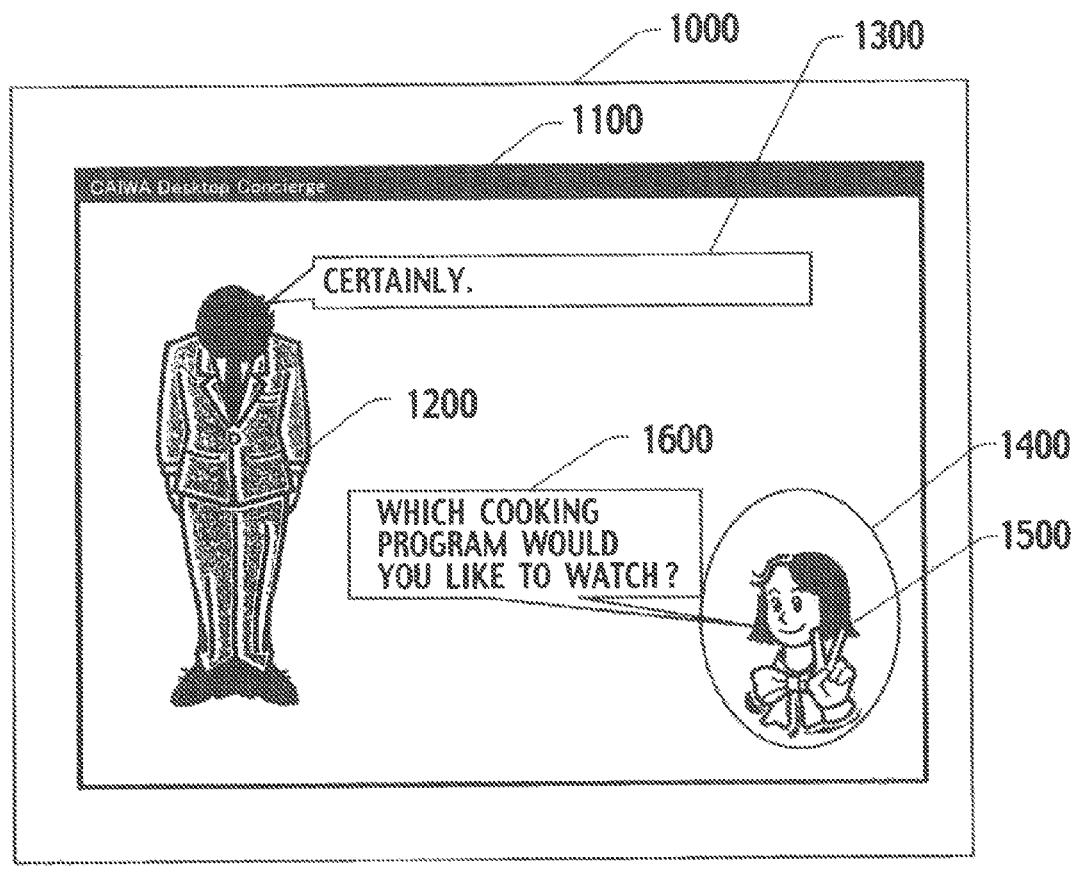
FIG. 47 is a view showing another screen example to be displayed on the output unit of the user terminal device.

FIG. 47 shows a screen example to be displayed on the output unit 14 of the user terminal device 110 upon receipt of the above-mentioned reply sentence "WHICH COOKING PROGRAM WOULD YOU LIKE TO WATCH?" and the operation control information thereof. On this screen, an image of a character 1500 preset as the character for the active conversation server 20 is displayed in the started character display area 1400 and the character string "WHICH COOKING PROGRAM WOULD YOU LIKE TO WATCH?" that represents the reply sentence is displayed in a character display box 1600 attached to this character 1500.

This active conversation server 20 processes subsequent user utterances and controls output of reply sentences, and operations of the user terminal device 110 and the like are controlled by the operation control information attached to the reply sentences.

Thereafter, when the cooking program to be watched is determined as a consequence of the conversations with the guide system, the operation control information to designate the cooking program is transmitted from the active conversation server 20 to the user terminal device 110. On the basis of this operation control information, the user terminal device 110 executes control such that the operation controller 13 downloads data of the relevant cooking program from the media server 100 to the browser unit 111, whereby the browser unit 111 reproduces the downloaded data of the cooking program. Hence the user is guided by the guide system to watch the desired contents.

(6.2.1, Operation During Watching Commercial Message)

This guide system also functions when the user is watching a CM (commercial message) from the media server 100 by use of the user terminal device 110.

Figure 48:
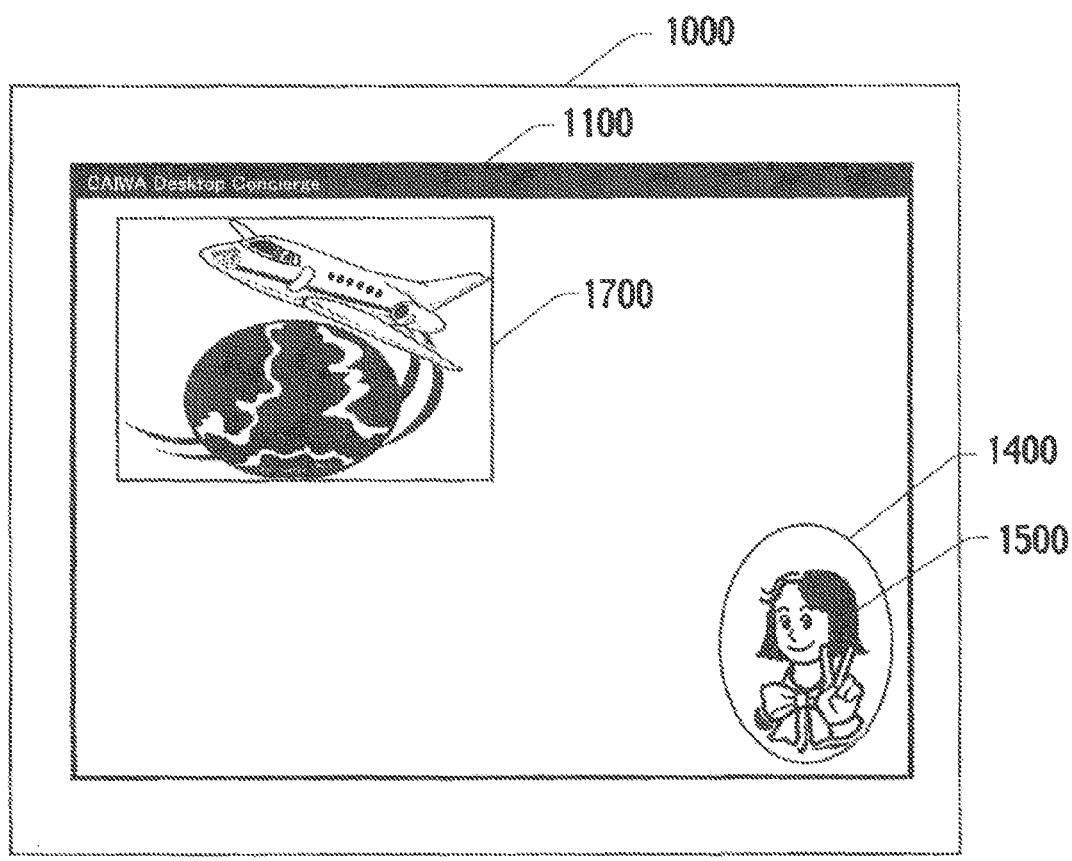
FIG. 48 is a view showing another screen example to be displayed on the output unit of the user terminal device.

FIG. 48 is a view showing a screen example when the user is watching a CM by using the user terminal device 110. In this example, a CM about a product (which is a DVD for a drama) related to certain contents is assumed to be displayed in a reproduction area 1700 of the user terminal device 110 and to be watched by the user. At this time, the conversation server 20 concerning this product is started as the active conversation server 20. Accordingly, the character 1500 corresponding to this active server 20 is displayed in the started character display area 1400.

Now, a user utterance "WHEN WILL THIS DRAMA BE ON AIR?" is assumed to be inputted to the user terminal device 110 by using the input unit 11 in the state shown in FIG. 48. The user terminal device 110 requests the active conversation server 20 to provide a reply sentence to the user utterance "WHEN WILL THIS DRAMA BE ON AIR?" The active conversation server 20 selects a reply sentence "THE PROGRAM WILL BE BROADCAST IN MORNING TIME ZONE FROM THE BEGINNING OF NEXT MONTH." with reference the conversation scenario storage unit 22 and transmits the reply sentence to the user terminal device 110. Meanwhile, the operation control information is attached to this reply sentence "THE PROGRAM WILL BE BROADCAST IN MORNING TIME ZONE FROM THE BEGINNING OF NEXT MONTH." This operation control information describes a command to download and reproduce data for an introductory program of the drama.

The reply sentence and the operation control information are transmitted from the active conversation server 20 to the user terminal device 110. On the basis of this operation control information, the user terminal device 110 executes control such that the operation controller 13 downloads the data of the introductory program from the media server 100 to the browser unit 111, whereby the browser unit 111 reproduces the downloaded data of the introductory program. Hence the user is guided by the guide system to watch the desired contents.

Figure 49:
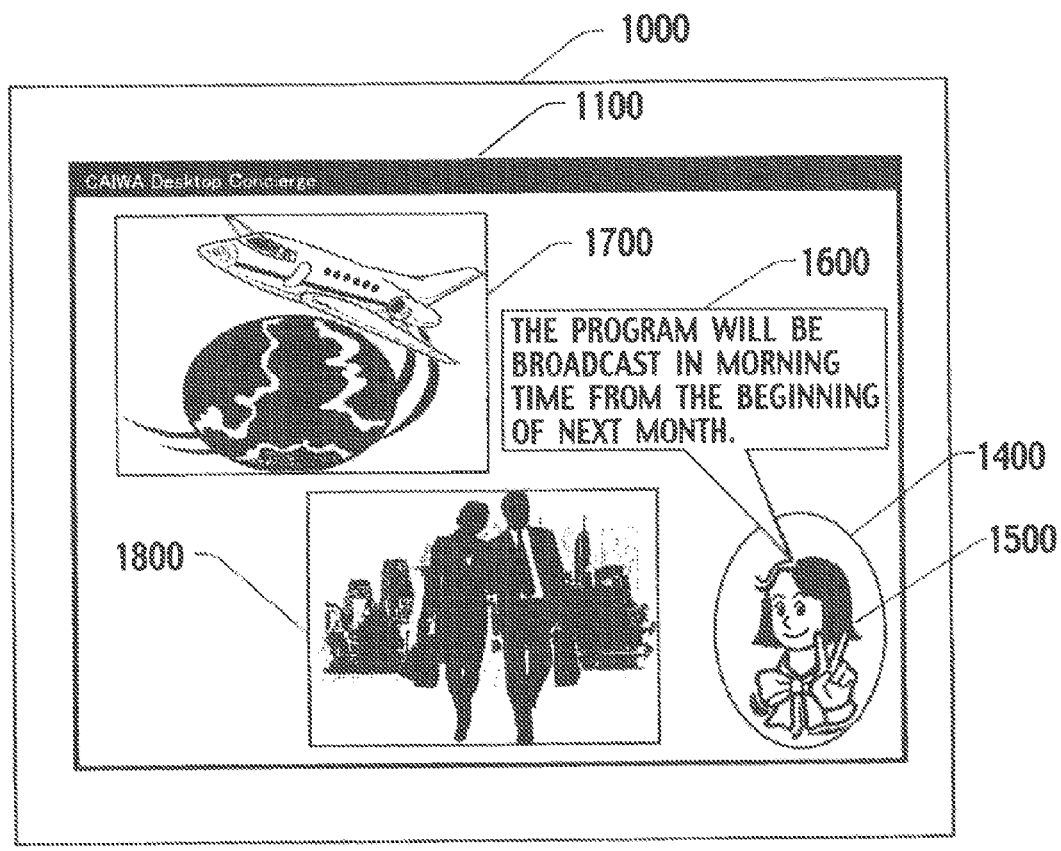
FIG. 49 is a view showing another screen example to be displayed on the output unit of the user terminal device.

FIG. 49 is a view showing a screen example to be displayed on the output unit 14 of the user terminal device 110 upon receipt of the reply sentence and the operation control information. The reply sentence "THE PROGRAM WILL BE BROADCAST IN MORNING TIME ZONE FROM THE BEGINNING OF NEXT MONTH." is displayed on the character display box 1600 and the introductory program is reproduced in a reproduction area 1800 created inside the window 1100.

(6.2.2. Operation Between Programs)

This guide system also functions during a program interval which is a period from a point when the user finishes watching the program (the contents) to a point when the user starts watching the next program (the contents).

Figure 50:
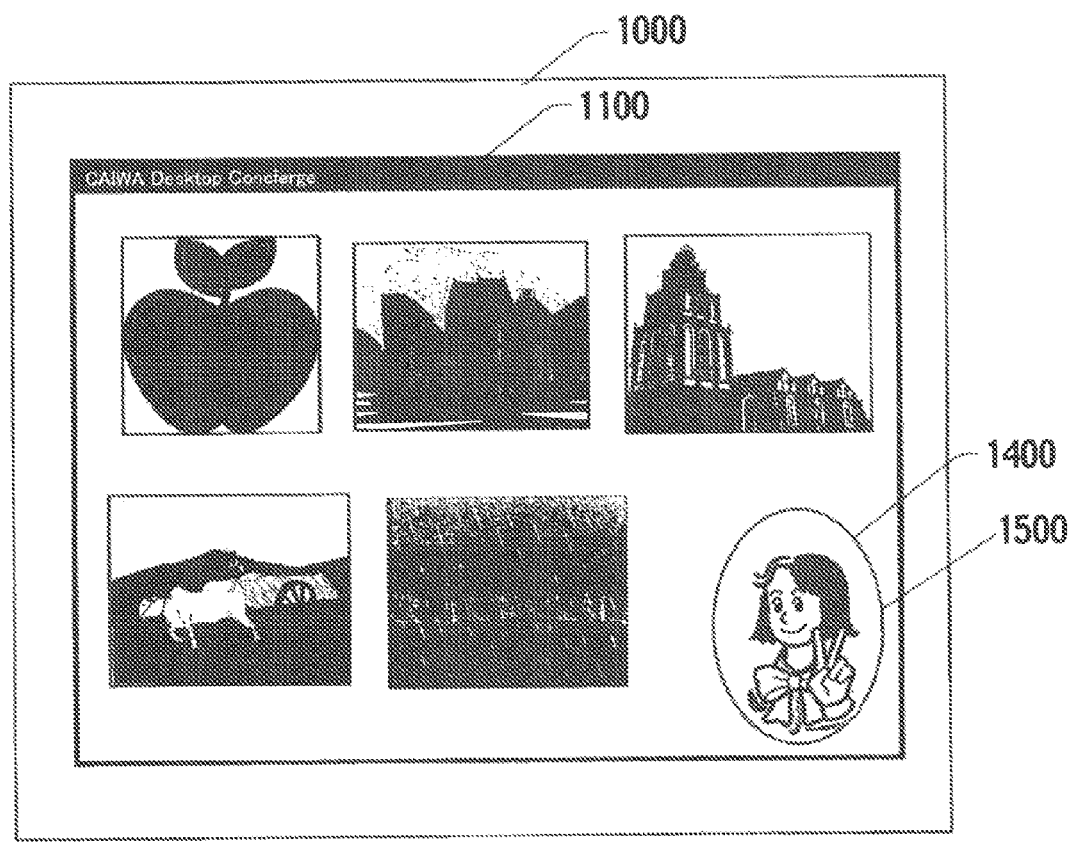
FIG. 50 is a view showing another screen example to be displayed on the output unit of the user terminal device.

FIG. 50 is a vie showing a screen example of the user terminal device 110 at the program interval. Introductory screens of programs that the user can watch are enumerated in the window 1100 and the character 1500 corresponding to the active conversation server 20 to be started at the program interval is displayed in the started character display area 1400.

In this example, the active conversation server 20 outputs a reply sentence "DID YOU ENJOY THE PROGRAM?" This is the reply sentence to be outputted without waiting for a user utterance by using the <timer> script in the operation control information, for example.

In this case, it is possible to establish conversations between the character 1500 and the user by allowing the user to input a user utterance as a reply, and thereby to guide the user to certain information (such as a product promotion site) or to execute a questionnaire concerning a product so as to acquire answers to the questionnaire as marketing information, for example.

(6.2.3. Operation During Program Watching)

This guide system also functions when the user is watching the program (the contents).

Figure 51:
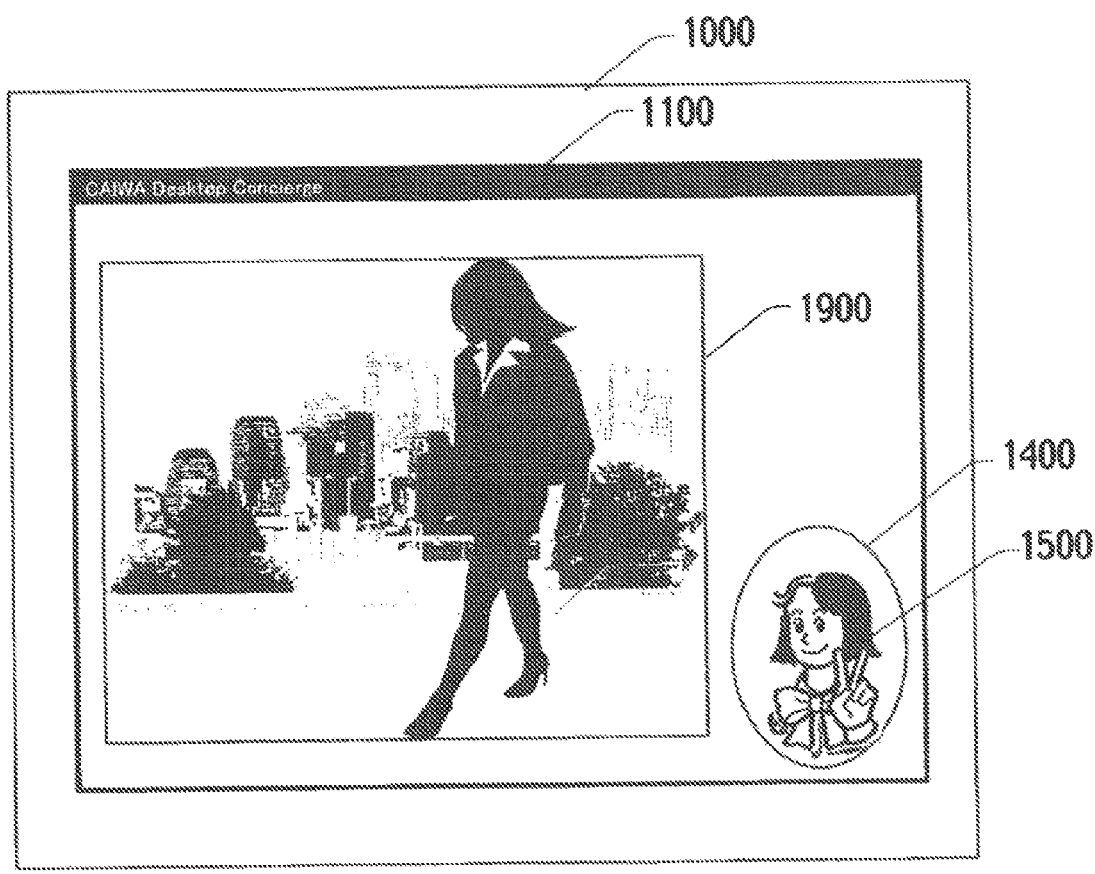
FIG. 51 is a view showing another screen example to be displayed on the output unit of the user terminal device.

FIG. 51 is a view showing a screen example of the user terminal device 110 during program watching. A screen 1900 of the program being watched is created in the window 1100 and the character 1500 corresponding to the active conversation server 20 started during the program is displayed in the started character display area 1400.

Here, an assumption is made that the user gets interested in a certain dress (which is a coat in this case) of a performer in the program and makes a question to the guide system. Specifically, the user is assumed to input a user utterance "THIS COAT LOOKS REALLY NICE. " by using the input unit 11. Then, the conversation server selection device 130, or namely the active conversation server 20 returns a reply sentence "MAY I SHOW YOU A SHOPPING SITE?" to the user terminal device 110. When the user terminal device 110 outputs this reply sentence, the user may further input a subsequent user utterance "YES, PLEASE." In this context, the active conversation server 20 selects a reply sentence "WELL, PLEASE TAKE A LOOK AT THE LEFT SIDE OF THE SCREEN.", and transmits, to the user terminal device 110, the operation control information set up as the reply sentence. The operation control information is set up as an instruction to access a shopping site selling products including the coat, and to display a site screen on the output unit 14.

Upon receipt of the reply sentence and the operation control information, the user terminal device 110 displays the reply sentence "WELL, PLEASE TAKE A LOOK AT THE LEFT SIDE OF THE SCREEN.", and then accesses to the designated shopping site, displays a shopping page on the site, and urges the user to browse the page.

Figure 52:
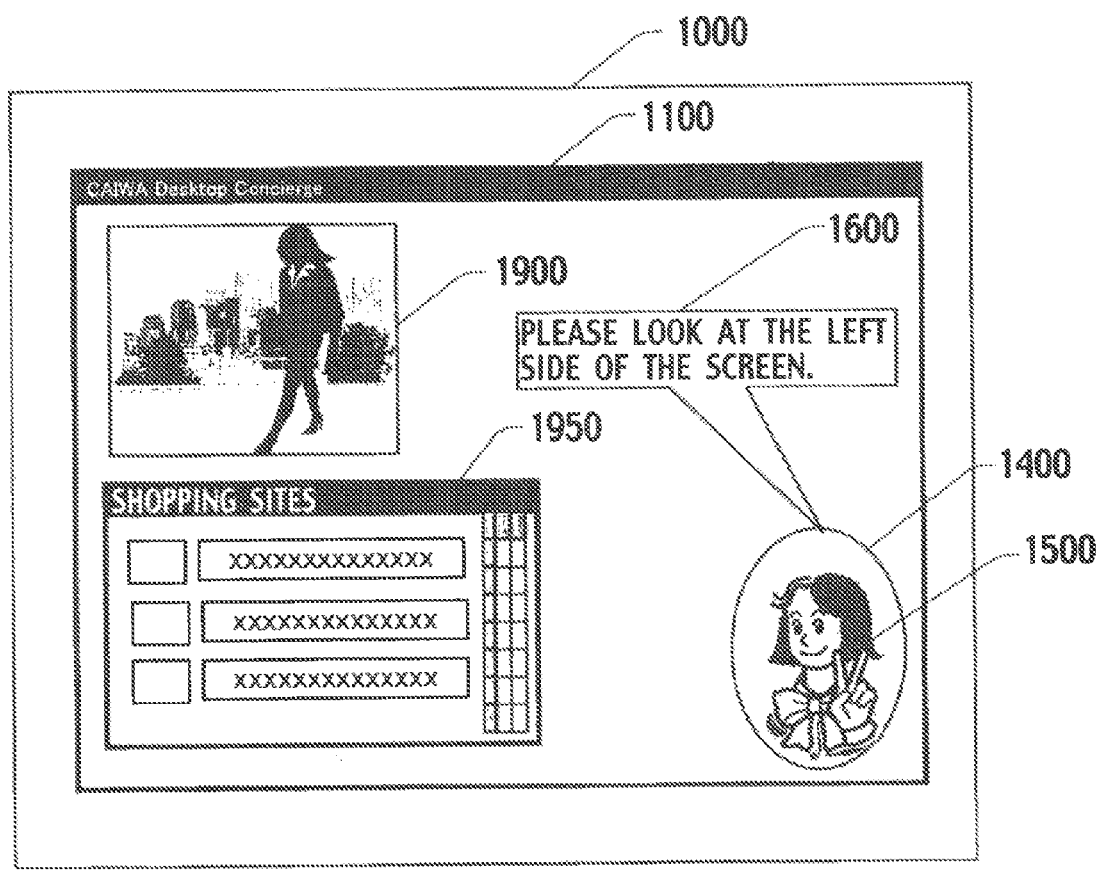
FIG. 52 is a view showing another screen example to be displayed on the output unit of the user terminal device.

FIG. 52 is a view showing a screen example in a state where the reply sentence and the shopping site are displayed as a consequence of transition from the image display illustrated in FIG. 51. In this screen example, the screen 1900 of the program being watched is downsized and a display area 1950 for newly displaying the screen of the shopping site is created therebelow. Moreover, the above-mentioned reply sentence is displayed in the character display box 1600.

By configuring the guide system as described above, it is possible to create new sales opportunities.

(6.2.4. Content Navigator)

This guide system also functions as a content navigator. The content navigator is a system configured to assist in acquisition of contents for obtaining knowledge required by the user. The contents for obtaining the knowledge required by the user may include movies that record lectures and courses, which are so-called e-learning, for example.

Here, an operation of this guide system in the case where the system functions as a content navigator for introducing contents to teach cooking recipes will be described.

First, the user is assumed to start preparation for cooking while starting and putting the user terminal device 110 in a kitchen. Here, the user thinks about cooking sweet and sour pork but does not clearly remember the recipe. Accordingly, the user attempts to view the recipe for sweet and sour pork by using this guide system.

Figure 53:
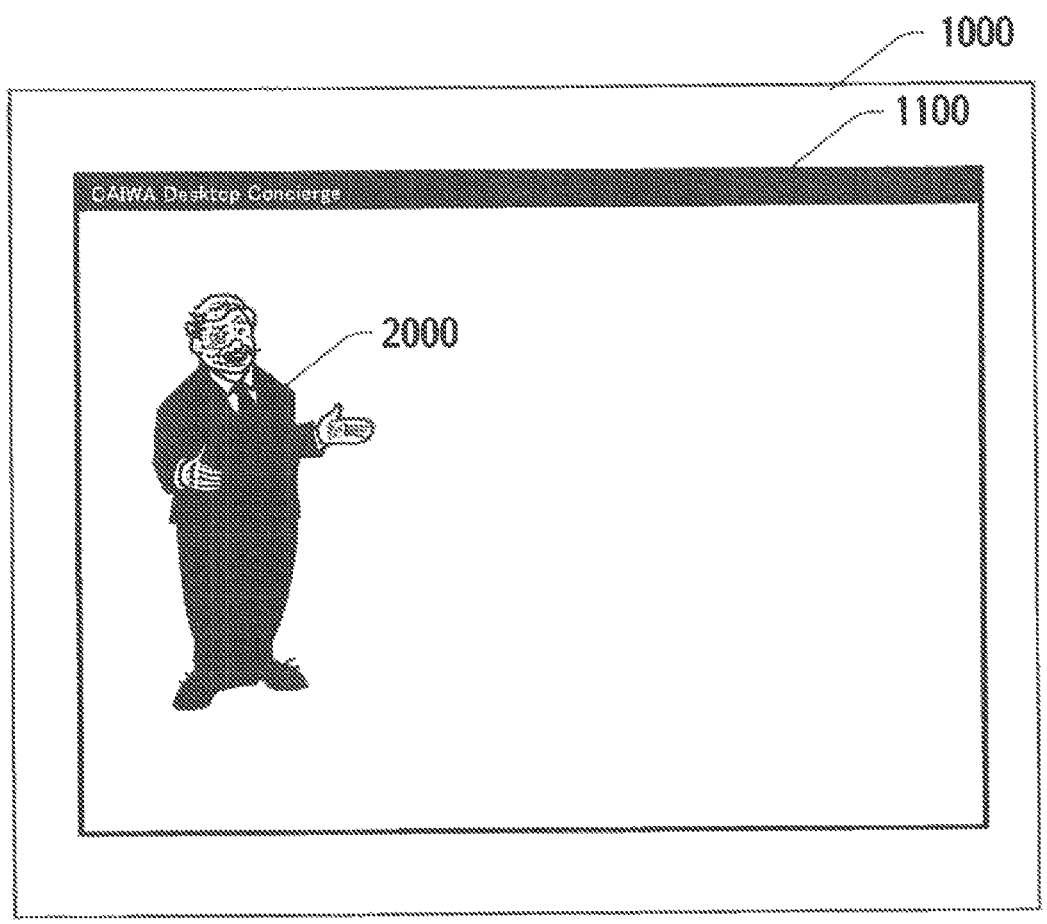
FIG. 53 is a view showing another screen example to be displayed on the output unit of the user terminal device.

FIG. 53 is a view showing a screen example to be displayed on the output unit 14 when the user terminal device 110 is placed and started in the kitchen. A character 2000 corresponding to the conversation server 20 which deals with topics concerning cooking recipes is displayed on the window 1100. In order to call this character, i.e. to define the conversation server 20 configured to deal with the topics concerning the cooking recipes as the active conversation server 20 in the conversation server selection device 130, it is only necessary to input a user utterance "I WANT TO USE A COOKING RECIPE." to the general-purpose conversation server 20 in advance and thereby to cause the conversation server selection device 130 to switch the conversation server 20 as appropriate.

When the user input a user utterance "PLEASE SHOW ME A RECIPE FOR SWEET AND SOUR PORK." to the user terminal device 110 in this state, the conversation server 20 configured to deal with the topics concerning the cooking recipes, which is set up as the active conversation server 20, selects a reply sentence corresponding to the user utterance "PLEASE SHOW ME A RECIPE FOR SWEET AND SOUR PORK." from the conversation scenario storage unit 22 and transmits the reply sentence to the user terminal device 110 together with operation control information set up with the reply sentence. This operation control information is an instruction to acquire and reproduce a movie file for introducing the recipe for sweet and sour pork.

As the reply sentence and the operation control information are transmitted from the active conversation server 20 to the user terminal device 110 and the operation controller 13 in the user terminal device 110 executes control such that the browser unit 111 downloads the data of the movie file from a stored location (which may be located at the media server 100 or any other devices), whereby the browser unit 111 reproduces the downloaded data of the movie file. Hence the user is guided by the guide system to watch the desired recipe.

Figure 54:
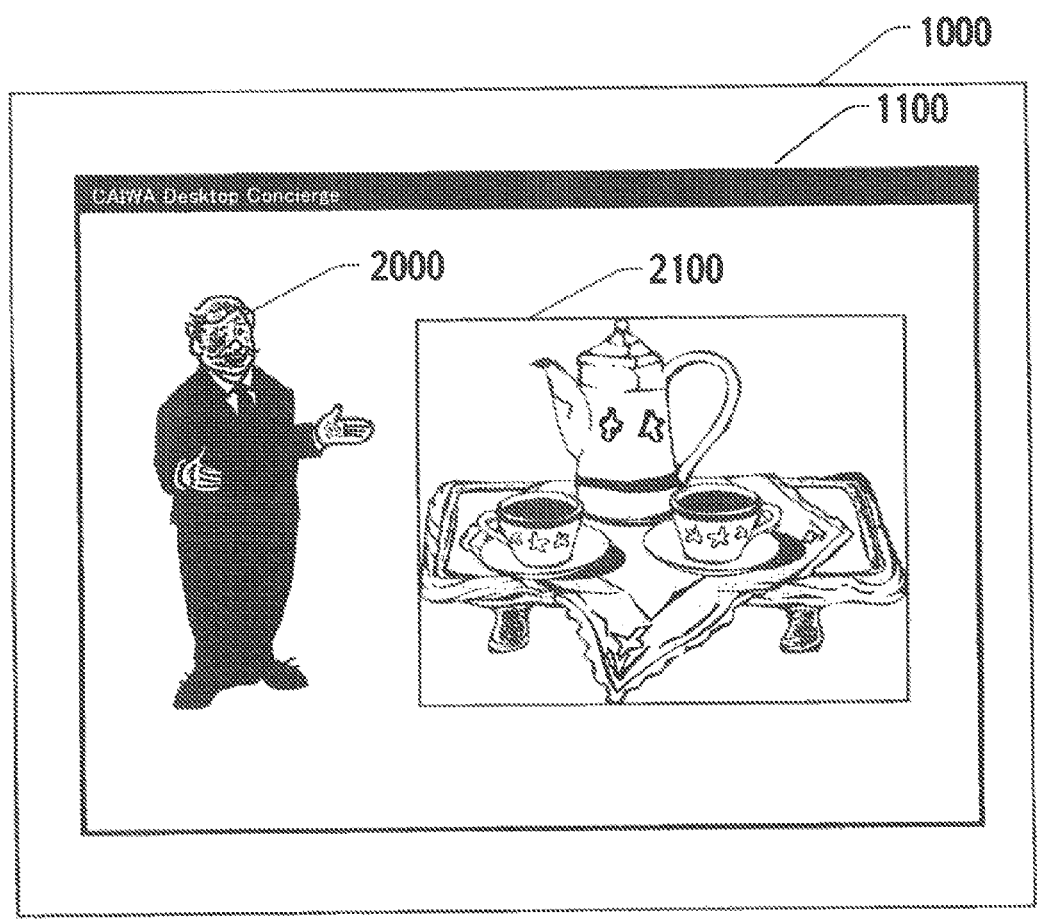
FIG. 54 is a view showing another screen example to be displayed on the output unit of the user terminal device.

FIG. 54 is view showing a screen example in which the movie for the cooking recipe is reproduced by this guide system. A movie reproduction area 2100 for the cooking recipe is created in the window 1100 and the movie for the cooking recipe requested by the user is displayed in this area. According to this guide system, the user is able to temporarily stop the movie file or to repeat reproduction thereof by using user utterances including "PAUSE RIGHT THERE", "REPEAT THAT PART", and so forth.

(6.2.5. Interactive Tickers)

This guide system allows the user to enjoy conversations with the guide system concerning the program which the user is watching.

First, the user is assumed to have determined the program to watch by way of conversations with this guide system. In this way, this guide system starts the conversation server which deals with the conversations concerning the program as the active conversation server 20 provided that reproduction (viewing) of the program is started. This active conversation server 20 has a scenario for dealing with the conversations concerning the program. For example, when a scene of the program scheduled in advance is reproduced, a reply sentence that triggers conversations concerning the scene is outputted so as to conduct conversations with the user. If the user utters in response to the reply sentence functioning as a trigger, the active conversation server 20 outputs another reply sentence in response thereto, for example. Here, the active conversation 20 may also be operated not only to output the reply sentences in response to the user utterances but also to output comments corresponding to the tickers as the reply without the user utterances.

Figure 55:
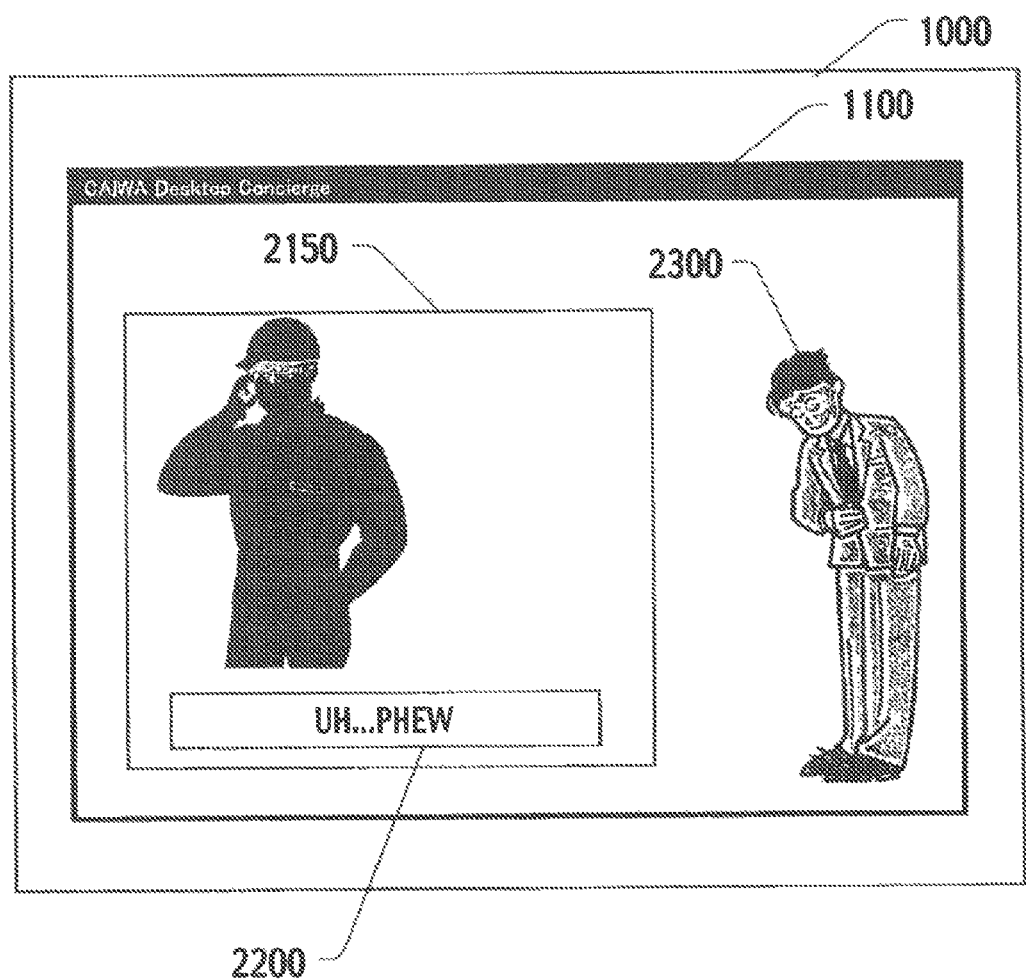
FIG. 55 is a view showing another screen example to be displayed on the output unit of the user terminal device.

FIG. 55 is a view showing a screen example when a ticker is displayed in the program that the user is watching. A program display area 2150 for the program that the user is watching is created on a window in the display area 1000. A ticker 2200 is displayed on this program. Meanwhile, a character 2300 corresponding to the conversation server 20 in operation is displayed on a right side of the program display area 2150.

Figure 56:
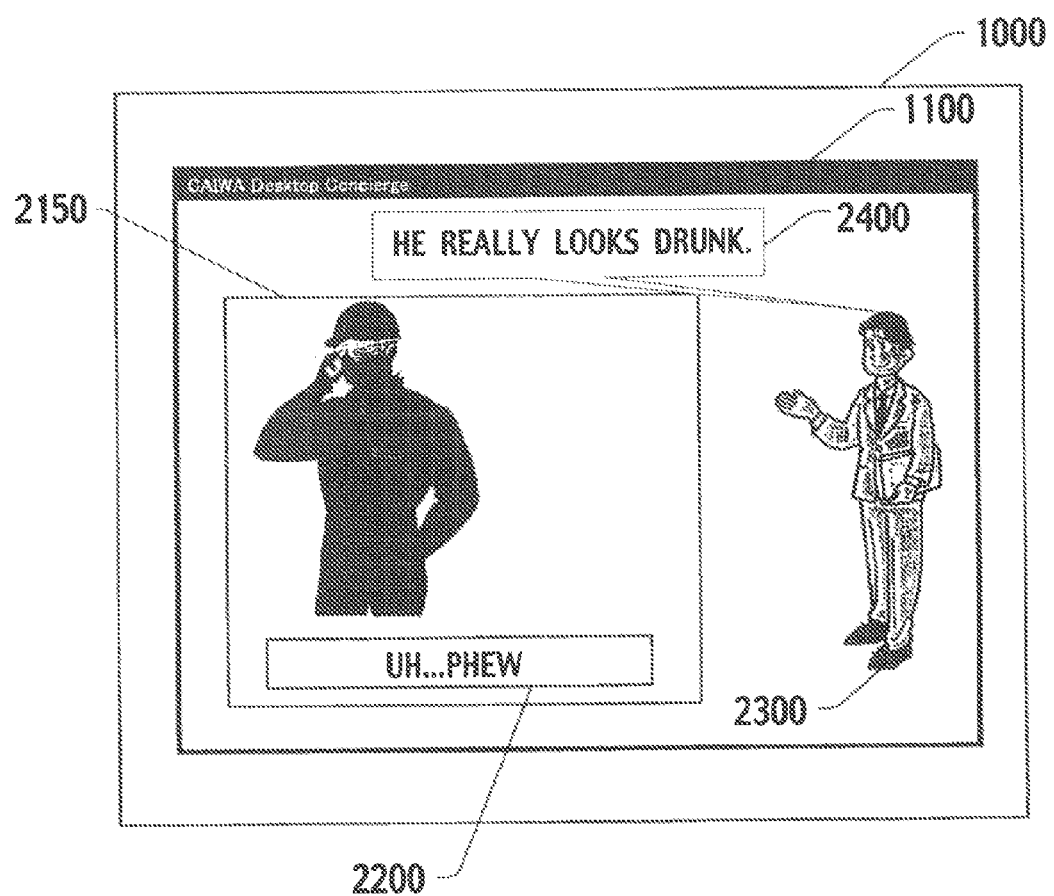
FIG. 56 is a view showing another screen example to be displayed on the output unit of the user terminal device.

FIG. 56 is a view showing a screen example when a reply sentence is outputted as a comment concerning the content of the ticker. A character display box 2400 for displaying the reply sentence is created above the character 2300 and the reply sentence which is the comment concerning the content of the program (which is the content of the ticker in this case) is displayed therein. The user may utter in response to this reply sentence. The user utterance is acquired by the guide system so as to allow the guide system to output more reply sentences, thereby establishing conversations between the user and the guide system while watching the program.

(Third Embodiment: Telephone Relay System)

This automatic conversation system can be utilized as a telephone relay system. This telephone relay system is the system configured to make a telephone call to an opponent on behalf of the user when the user attempts to make the telephone call to the opponent and to relay the call to the user when the opponent answers the call. Meanwhile, when there is an incoming call from another person to the user, the telephone relay system notifies the user about who is making this incoming call and to connect the call from the opponent to the user when the user responds to answer the telephone call.

Figure 57:
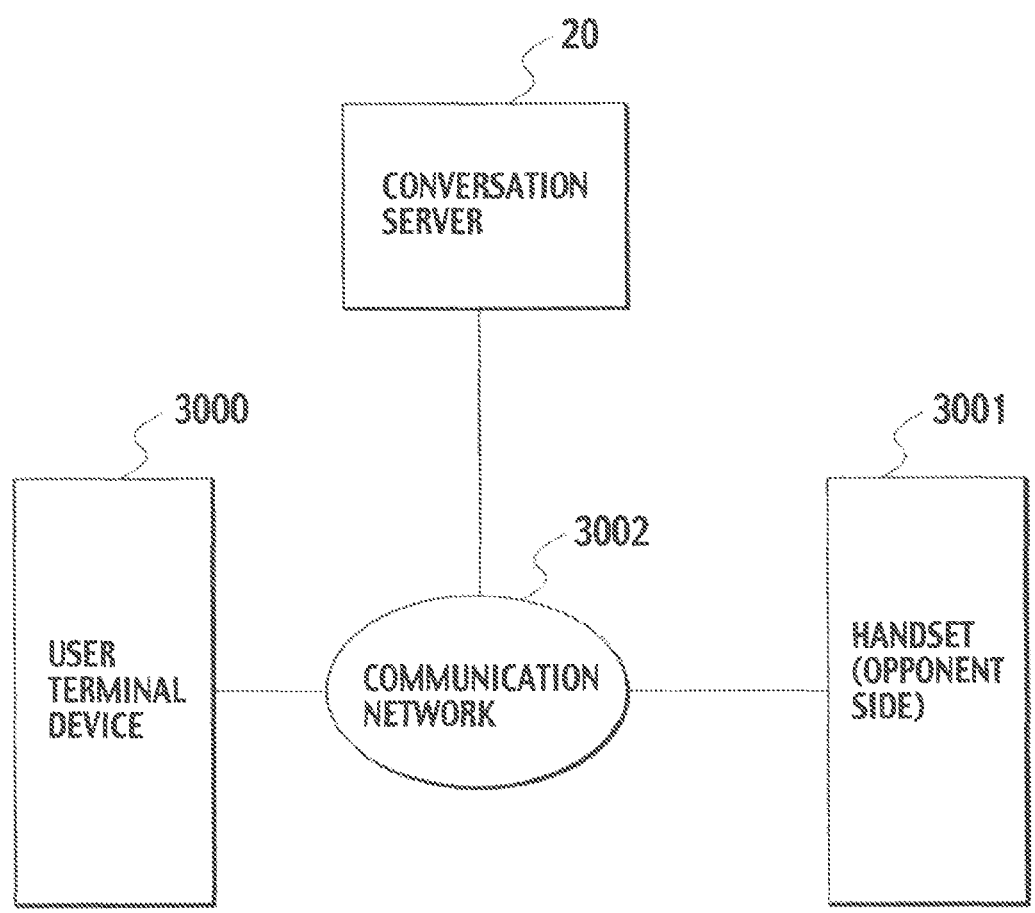
FIG. 57 is a block diagram showing a configuration example of a telephone relay system.

FIG. 57 is a block diagram showing a configuration example of the above-described telephone relay system. The telephone relay system includes a user terminal device 3000 connected to a communication network 3002, and the conversation server 20 connected to the communication network 3002. A hand set 3001 on the opponent side which is a counterpart of a call with the user is connected to the communication network 3002.

Figure 58:
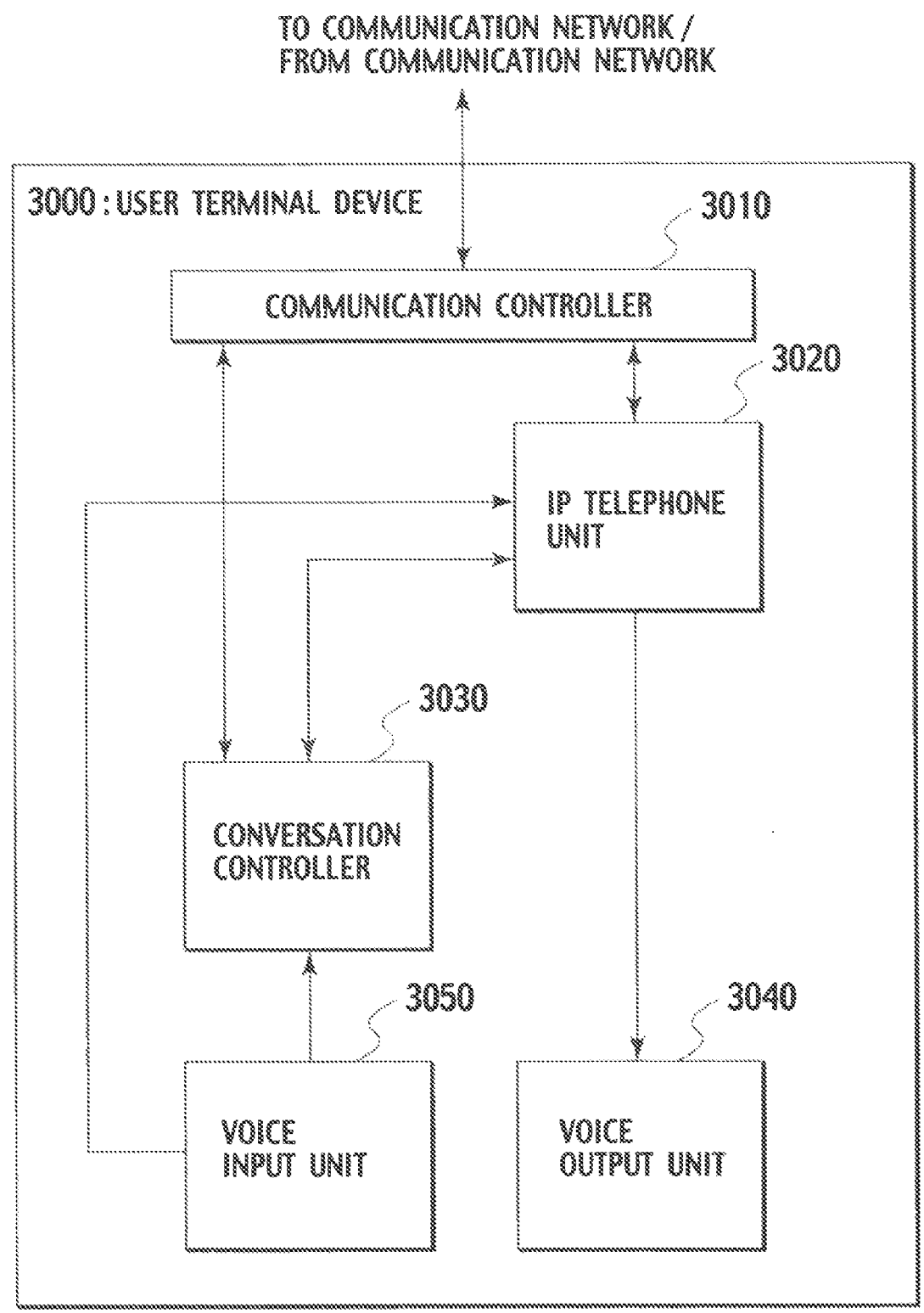
FIG. 58 is a functional block diagram showing a configuration example of another user terminal device.

The user terminal device 3000 is an information processing device which functions as a telephone set of IP (Internet protocol) telephone and also functions as the conversation device 10 of the present invention, which is a PC or an IP telephone set, for example. FIG. 58 is a functional block diagram showing a configuration example of the user terminal device 3000. The user terminal device 3000 includes a communication controller 3010 rendered connectable to the communication network 3002, an IP telephone unit 3020 connected to the communication controller 3010, a conversation controller 3030 connected to the communication controller 3010 and to the IP telephone unit 3020, a voice input unit 3050 connected to the conversation controller 3030 and to the IP telephone unit 3020, and a voice output unit 3040 connected to the IP telephone unit 3020.

The IP telephone unit corresponding to telephone means of the present invention has functions to conduct an outgoing call, an incoming call, and a telephone call as an IP telephone terminal, which is a Skype (a registered trademark of Skype Technologies) application, for example.

The conversation controller 3030 corresponding to conversation controlling means of the present invention is the constituent corresponding to the conversation device 10, i.e. the constituent including the conversation input unit 12, the operation controller 13, the input unit 11, and the output unit 14. It is to be noted, however, that the input unit 11 and the output unit 14 may be replaced by the voice input unit 3050 and the voice output unit 3050, respectively. Upon receipt of a user utterance stating that the user wishes to make a telephone call to someone, the conversation controller 3030 requests the conversation server 20 to provide a reply sentence thereto. The conversation server 20 transmits a reply sentence to the user utterance and operation control information attached thereto to the user terminal device 3000, or namely the conversation controller 3030. The operation control information to be attached to this reply sentence has a content to instruct the IP telephone unit 3020 to start a call addressed to a telephone number of the opponent. Then the handset 3001 of the opponent answers the outgoing call, the conversation controller 3030 acquires an answering voice signal of the opponent through the IP telephone unit 3020, replaces a voice signal with an inputted sentence by means of voice recognition, and requests the conversation server 20 to provide a reply sentence in response thereto. The conversation server 20 determines a reply sentence in response to this inputted sentence and transmits the reply sentence together with operation control information to the user terminal device 3000, or namely the conversation controller 3030. When the inputted sentence acknowledges that it is a response from the opponent requested by the user, the operation control information to be attached to the reply sentence has a content to instruct the IP telephone unit 3020 to hold the call.

When there is an incoming call from a certain opponent to the user, the IP telephone unit 3020 establishes a call with the opponent and passes a voice signal from the opponent to the conversation controller 3030. The conversation controller 3030 converts the voice signal into an inputted sentence and request the conversation server 20 to provide a reply sentence in response thereto. The conversation server 20 transmits the reply sentence, which inquires whether or not the user wishes to answer the call from the opponent, to the user terminal device 3000, or namely the conversation controller 3030 as the reply to the inputted sentence. The conversation controller 3030 causes the output unit 14 to output the reply sentence in order to urge a subsequent user utterance. When there is the user utterance, the conversation controller 3030 requests the conversation server 20 to provide a reply sentence in response to the user utterance. If the user utterance has a content indicating that the user wishes to answer the call, the conversation server 20 transmits a reply sentence provided with operation control information having a content to instruct the IP telephone unit 3020 to start the call between the user and the opponent to the user terminal device 3000, or namely the conversation controller 3030. The conversation controller 3030, or namely the operation controller 13, instructs the IP telephone unit 3020 to start the call between the user and the opponent.

On the other hand, if the user utterance has a content indicating that the user does not wish to answer the call, the conversation server 20 transmits a reply sentence provided with operation control information having a content to instruct the IP telephone unit 3020 to terminate the call between the user and the opponent to the user terminal device 3000, or namely the conversation controller 3030. The conversation controller 3030, or namely the operation controller 13, instructs the IP telephone unit 3020 to disconnect the call from the opponent.

The voice input unit 3050 is the constituent that converts a voice into an electric signal, which is typically a microphone, for example. The voice output unit 3040 is the constituent that converts an electric signal into a voice, which is typically a loudspeaker, for example.

(7.1. Operation Example)

An operation example of the telephone relay system will now be described.

(7.1.1. Calling)

Figure 59:
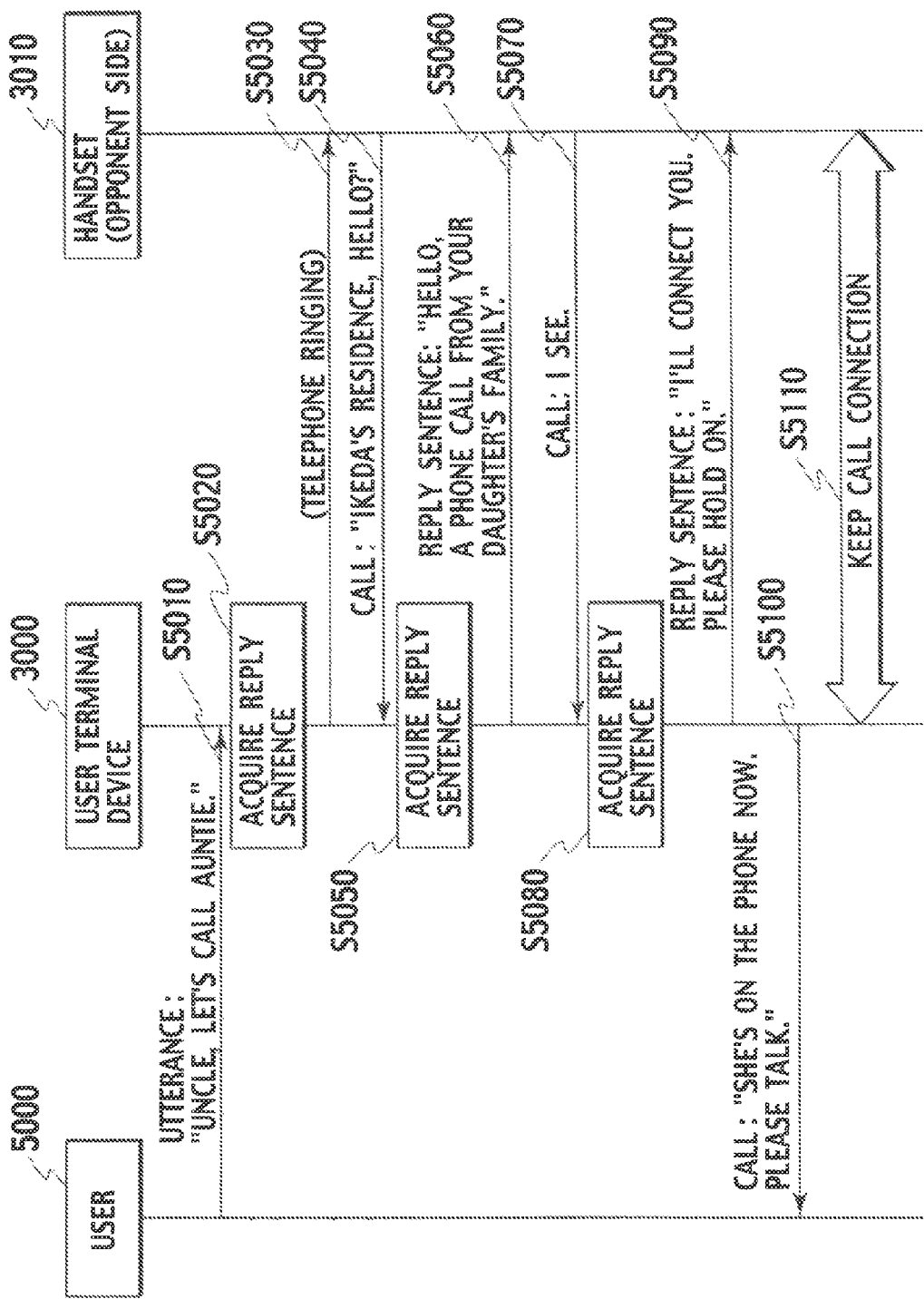
FIG. 59 is a sequence diagram showing an operation example when a user makes a call to an opponent through this telephone relay system.

FIG. 59 is a sequence diagram showing an operation example when the user makes a call to the opponent through this telephone relay system.

First, when making a call, the user inputs an utterance stating that the user makes the call to the opponent to the user terminal device 3000 (S5010). The user terminal device 3000 requests the conversation server 20 to provide a reply sentence in response to this user utterance and acquires the reply sentence and operation control information from the conversation server 20 (S5020). The operation control information has a content to execute the outgoing call to the telephone number of the opponent. The user terminal device 3000 executes the outgoing call to the handset on the basis of this operation control information (S5030). The opponent responds to this calling in order to start the call, and performs an utterance to give the name of the opponent (S5040). The content of this utterance is received by the user terminal device 3000, and the user terminal device 3000 requests the conversation server 20 to provide a reply sentence in response to this user utterance and acquires the reply sentence and operation control information from the conversation server 20 (S5050). The operation control information in this case intends to convert the content of the reply sentence into a voice signal and to transmit the voice signal to the handset 3001. The user terminal device 3000 transmits the content of the reply sentence by voice to the handset 3001 in accordance with this operation control information (S5060).

Now, the opponent is assumed to utter a reply stating that the opponent wants to answer the call. This utterance is transmitted to the user terminal device 3000 (S5070). The user terminal device 3000 requests the conversation server 20 to provide a reply sentence in response to this utterance, and acquires the reply sentence and operation control information from the conversation server 20 (S5080). The user terminal device 3000 outputs the reply sentence indicating connection of the call to the opponent and to the user (S5090 and S5100). Meanwhile, a start of the call between the user and the opponent is defined as operation control information, whereby connection of the call between the user terminal device 3000 and the handset 3001 is maintained (S5110). Hence the relay operation by the telephone relay system is completed.

If the reply from the opponent in Step S5070 indicates that the opponent does not want to answer the call, termination of connection between the user terminal device 3000 and the handset is defined in the operation control information attached to the reply sentence in response thereto. Accordingly, the user terminal device 3000 is operated so as to terminate the call.

(7.1.2. Incoming Call)

Figure 60:
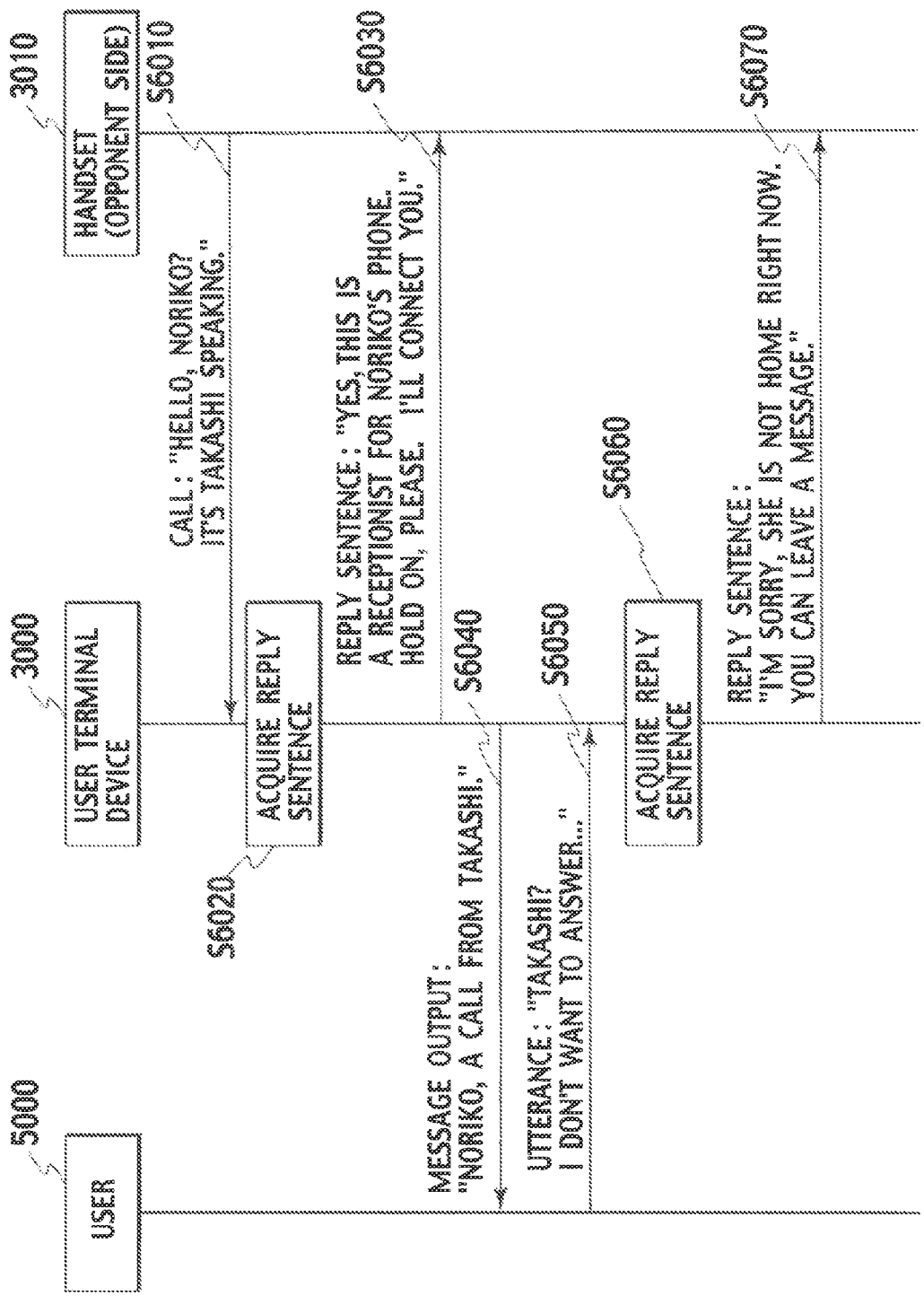
FIG. 60 is a sequence diagram showing an operation example when there is an incoming call from the opponent to the user through this telephone relay system.

FIG. 60 is a sequence diagram showing an operation example of this telephone relay system when there is an incoming call from the opponent to the user.

First, there is an incoming call from the handset 3001 to the user terminal device 3000 and an utterance giving the name of the caller is transmitted to the user terminal device 3000

(S6010). The user terminal device 3000 requests the conversation server 20 to provide reply sentences in response thereto and acquires the reply sentences and operation control information from the conversation server 20 (S6020). The reply sentences include a reply sentence to the opponent stating that the call is being relayed and a reply sentence to the user informing the name of the opponent. The user terminal device 3000 outputs the respective reply sentences to the opponent and to the user (S6030 and S6040). Here, the user is assumed to utter that the user does not want to answer the call (S6050). The user terminal device 3000 requests the conversation server 20 to provide a reply sentence in response to this utterance, and acquires the reply sentence and operation control information from the conversation server 20 (S6020). This reply sentence has a content to inform that the user is not available on the telephone and the operation control information has contents to start recording a message and to terminate the call thereafter. The user terminal device 3000 transmits the reply sentence to the handset 3001, and executes recording of the message as well as termination of the call thereafter in accordance with the operation control information.

Here, if the content of the user utterance in Step S6050 has the content that the user wishes to answer the call, operation control information to be attached to a reply sentence in response thereto has a content to maintain the call between the user terminal device 3000 and the handset 3001. Accordingly, the call between the user and the opponent is started in accordance with this operation control information.

(Fourth Embodiment: Customer Relations System)

Next, a fourth embodiment of the present invention will be described. The fourth embodiment is proposed as a customer relations system.

(8.1. Configuration Example)

Now, a customer relations system representing one embodiment of the present invention will be described below. The customer relations system is a system configured to transmit replies and information through a network in response to questions and inquiries from customers received via the network.

Figure 61:
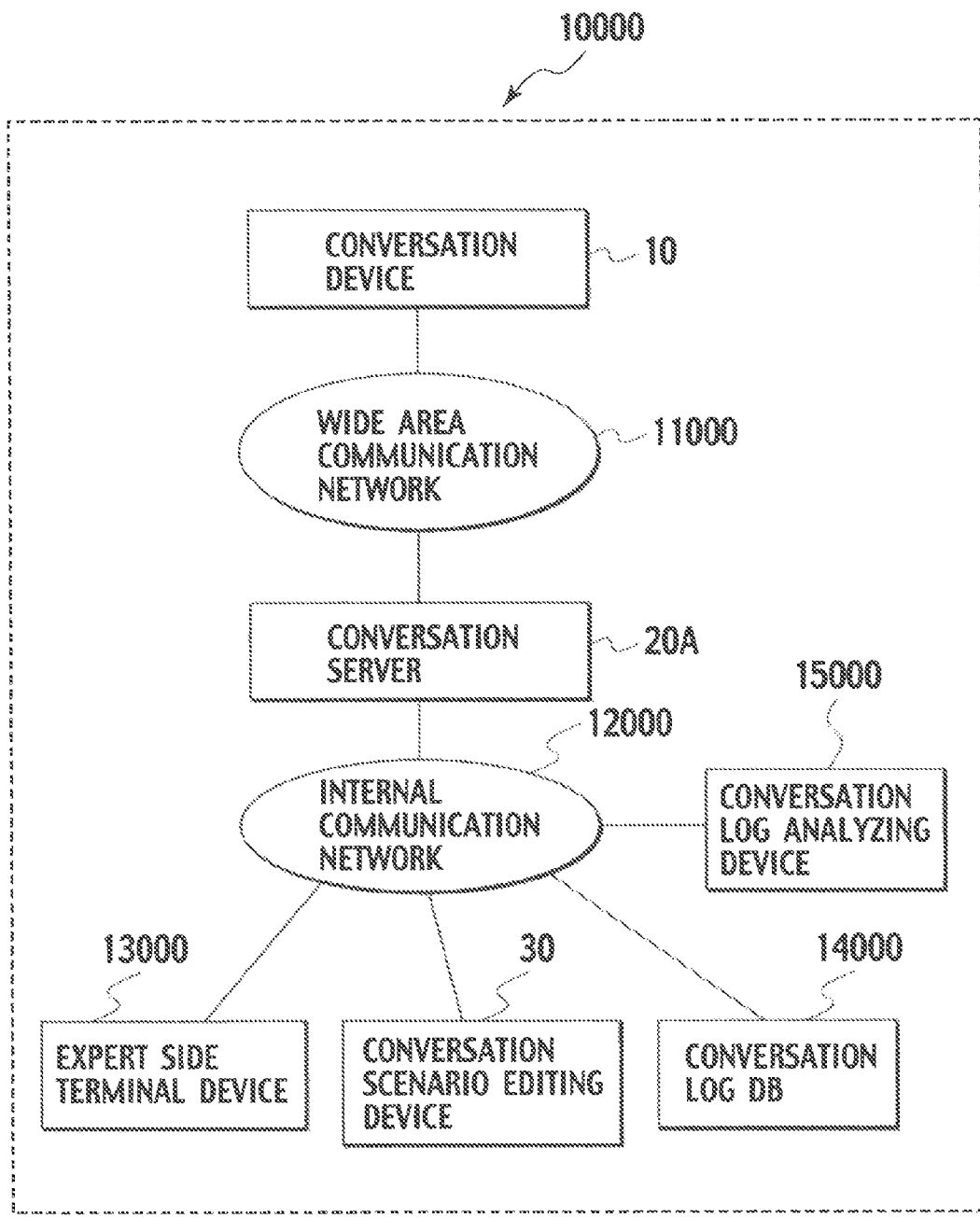
FIG. 61 is a block diagram showing a configuration example of a customer relations system.

FIG. 61 is a block diagram showing a configuration example of the customer relations system of this embodiment.

A customer relations system 10000 includes the conversation device 10 which functions as a user side terminal machine rendered connectable to a wide area network (WAN) 11000, a conversation server 20A connected to the wide area network 11000, an expert side terminal device 13000 connected to a local area network (LAN) 12000, the conversation scenario editing device 30, a conversation log database (hereinafter abbreviated as DB) 14000, and a conversation log analyzing device 15000. Note that the conversation server 20A can communicate with the expert side terminal device 13000, the conversation scenario editing device 30, the conversation log DB 14000, and the conversation log analyzing unit 15000 through the local area network 12000.

Although the above-described example is configured to establish communication among the conversation server 20A, the expert side terminal device 13000, the conversation scenario editing device 30, the conversation log DB 14000, and the conversation log analyzing unit 15000 through the local area network 12000, the present invention can also be realized by establishing communication among these constituents through the wide area network 11000 or other wide area networks.

It is to be noted that the "expert" used herein refers to a person having a roll for replying to questions and inquiries from the user. Such an "expert" does not necessarily have to be a person who has professional knowledge.

Now, the constituents of the above-described customer relations system will be described below.

(8.1.1. Conversation Device)

1. The conversation device 10 which corresponds to first means of the present invention is the device configured to allow a user (a customer) to transmit a question or an inquiry to the conversation server 20A in the form of a user utterance (an inputted sentence), and to receive a reply sentence thereto from the conversation server 20A. The conversation device 10 of this customer relations system is the device having a similar configuration to the conversation device 20 in the first embodiment and detailed description of the configuration example will therefore be omitted.

(8.1.2. Conversation Server)

The conversation server 20A which corresponds to second means of the present invention has: functions to determine a reply sentence on the basis of the conversation scenario 40 in response to a user utterance transmitted from the conversation device 10, and to transmit the reply sentence and operation control information linked with the reply sentence to the conversation device 10; functions to transmit a content of the user utterance to the expert side terminal device 13000 so as to cause the expert to reply to the user utterance when an appropriate reply sentence to the user utterance is not found in the conversation scenario, then to receive a content of the reply transmitted from the expert side terminal device 13000 in response thereto, and to transmit the received content of the reply to the conversation device 10; functions to store the user utterance, the reply sentence and the content of the reply from the expert side terminal device 1300 along the time series thereof, and to transmit the stored contents (hereinafter referred to as a "conversation log") to the conversation log DB 14000; and functions to receive the conversation scenario 40 to be transmitted from the conversation scenario editing device 30, and to add the contents of the conversations to, or to replace the contents of the conversations with, the conversation scenario 40 stored in advance.

The conversation server 20A is realized by an information processing device including a central processing unit (CPU), a main memory (RAM), a read-only memory (ROM), an input-output device (I/O), and an external storage device such as a hard disk device when necessary. The information processing device is typically a PC, a workstation or a server, for example. The conversation server 20A may also be constructed by connecting multiple information processing devices through a network.

Figure 62:
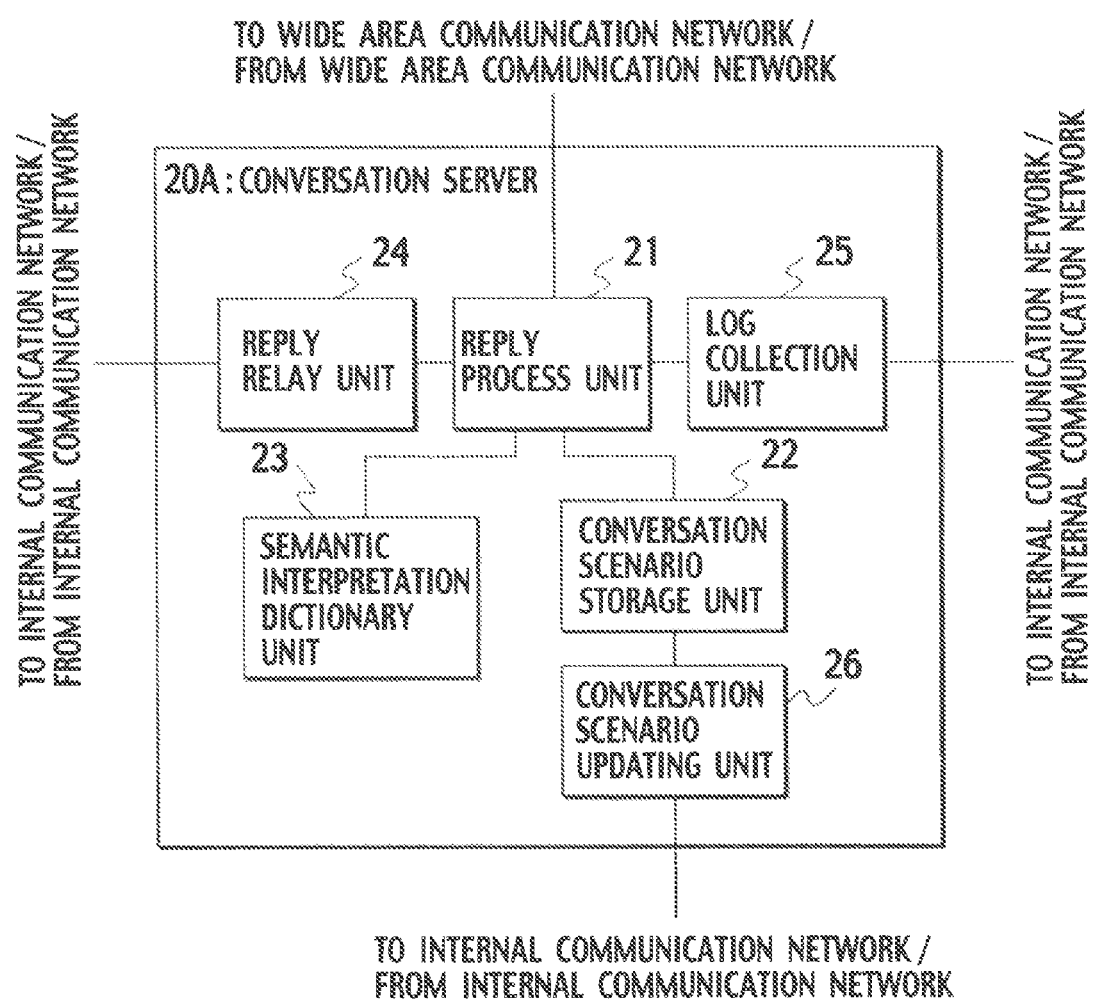
FIG. 62 is a functional block diagram showing a configuration example of a conversation server according to a fourth embodiment.

FIG. 62 is a functional block diagram showing a configuration example of the conversation server 20A. Note that the conversation server 20A in this embodiment includes constituents common to those in the above-described conversation server 20A. Accordingly, those common constituents are designated by the same reference numerals and detailed description thereof will be omitted.

The conversation server 20A includes the reply process unit 21, a reply relay unit 24 and a log collection unit 25 which are connected to the reply process unit 21, the semantic interpretation dictionary unit 23 and the conversation scenario storage unit 22 which are connected to the reply process unit 21, and a conversation scenario updating unit 26 connected to the conversation scenario storage unit 22.

The reply process unit 21, the semantic interpretation dictionary unit 23, and the conversation scenario storage unit 22 are the constituents having similar functions to those in the conversation server 20 of the first embodiment and description of these constituents will therefore be omitted. It is to be noted, however, that functions to pass or receive user utterances, reply sentences, and contents of replies to and from the reply relay unit 24 as well as the log collection unit 25 are added to the reply process unit 21.

The reply relay unit 24 has functions to communicate with the expert side terminal device 13000, to transmit the content of the user utterance received from the reply process unit 21 to the expert side terminal device 13000, to receive the content of the reply transmitted from the expert side terminal device in response thereto, and to pass the received content of the reply to the reply process unit 21.

The log collection unit 25 has functions: to acquire the user utterance and the content of the reply from the expert side terminal device 13000 to be received by the reply processing unit 21, and the reply sentence supposed to be transmitted from the reply process unit 21 to the conversation device 10 from the reply process unit 21; and to transmit these data to the conversation log DB 14000 as the conversation log. Here, as for timing to transmit the conversation log, it is possible to apply arbitrary timing to be determined by the conversation server 20A, timing when a transmission request is received from the conversation log DB 14000 or any other timing (when an operator executes conversation log transmission processing, for example).

The conversation scenario updating unit 26 has functions to add a new conversation scenario 40 to the conversation scenario 40 stored in the conversation scenario storage unit 22 in advance, and to replace the conversation scenario 40 either partially or entirely. For example, a new conversation scenario (hereinafter referred to as an "additional conversation scenario" for the purpose of distinction) including a question which is a user utterance and a content of a reply thereto which is made by the expert is created by the conversation scenario editing device 30. The additional conversation scenario from the conversation scenario editing device 30 is received by the conversation scenario updating unit 26, and is added for storage to the conversation scenario 40 that is stored the conversation scenario storage unit 22 in advance. After this processing, the reply process unit 21 can transmit a reply sentence having the same content as the above-described content of the reply on the basis of the portion of the additional conversation scenario when the conversation server 20A accepts the same question which is the user utterance once again.

Description of the configuration example of the conversation server 20A has been completed.

Now, back to FIG. 61, description of the constituents of the customer relations system 10000 will be continued.

(8.1.3. Expert Side Terminal Device)

The expert side terminal device 13000 corresponding to third means of the present invention is the device having functions to receive the user utterance that is transmitted (transferred) from the conversation server 20A, to present the content of the user utterance to the expert who is the operator of the expert side terminal device 13000 to urge input of a reply thereto, and to transmit data representing the content of the reply to the conversation server 20A when the reply is inputted.

The expert side terminal device 13000 may apply any types of devices as long as such a device can execute reception of the user utterance and transmission of the content of the reply. The expert side terminal device 13000 is typically a personal computer, a mobile communication tool (a cellular telephone) or a special-purpose terminal device, for example.

(8.1.4. Conversation Scenario Editing Device)

The conversation scenario editing device 30 corresponding to fifth means of the present invention is a similar device to the conversation scenario editing device 30 in the first embodiment. Accordingly, detailed description of the configuration will be omitted herein. It is to be noted, however, that the conversation scenario editing device 30 of this embodiment further has functions to acquire the conversation log, or more specifically the conversation log that contains the content of the reply transmitted from the expert side terminal device 13000 from the conversation log DB 14000, to edit and output this conversation log as the conversation scenario 40, and to transmit the conversation scenario 40 to the conversation server 20A so as to perform addition and updating of the conversation scenario.

(8.1.5. Conversation Log DB)

The conversation log DB 14000 corresponding to fourth means of the present invention is the device having functions to receive the conversation log transmitted from the conversation server 20A, and to store this conversation log. The conversation log DB 14000 is realized by an information processing device including a central processing unit (CPU), a main memory (RAM), a read-only memory (ROM), an input-output device (I/O), and an external storage device such as a hard disk device when necessary. The information processing device is typically a PC, a workstation or a server, for example. The conversation log DB may also be constructed by connecting multiple information processing devices through a network.

(8.1.6. Conversation Log Analyzing Device)

The conversation log analyzing device 15000 generates conversation tendency statistics (such as statistical data of access numbers depending on questions) by receiving the conversation log from the conversation log DB 14000 and analyzing the conversation log.

Description of the configuration example of the customer relations system 10000 has been completed.

(8.2. Operations of Customer Relations System)

Next, operations of the customer relations system 10000 will be described.

(8.2.1. Operation when Conversation Server Can Reply on the Basis of Conversation Scenario)

Figure 63:
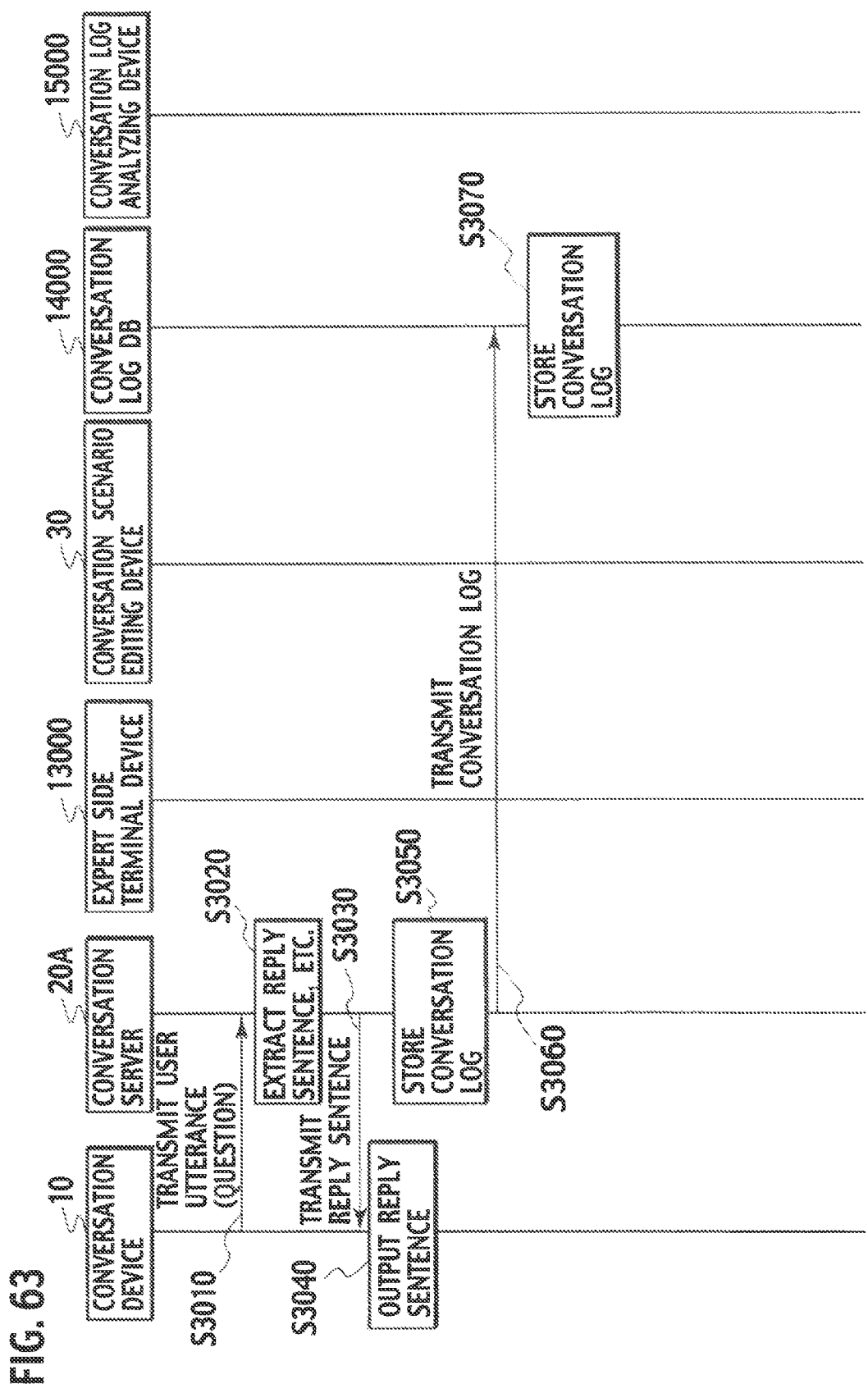
FIG. 63 is a sequence diagram showing an operation example of a customer relations system when the conversation server accepts a user utterance which can be replied on the basis of a conversation scenario.

FIG. 63 is a sequence diagram showing an operation example of the customer relations system 10000 when the conversation server 20A accepts a user utterance which can be replied on the basis of the conversation scenario.

First, the user accesses the conversation server through the conversation device 10. After establishing the communication, the user inputs a user utterance (which is assumed to be a certain question in this case) to the conversation device 10. The conversation device 10 transmits the user utterance to the conversation server 20A (S3010). Upon receipt of the user utterance, the conversation server 20A extracts a reply sentence as well as operation control information corresponding to the reply sentence on the basis of the conversation scenario stored in the conversation scenario storage unit 22 (S3020). The conversation server 20A transmits the reply sentence and the operation control information thus extracted to the conversation device 10 (S3030). The conversation device 10 displays the received reply sentence, thereby providing the user with the content of the reply (S3040). The user obtains the reply to the question out of the content of the reply.

Meanwhile, the conversation server 20A acquires the user utterance and the reply sentence as the conversation log (S3050), and transmits this conversation log to the conversation log DB 14000 (S3060). The conversation log DB 14000 stores the received conversation log (S3070).

(8.2.2. Operation when Conversation Server Requests for Reply from Expert Side Terminal Device)

Figure 64:
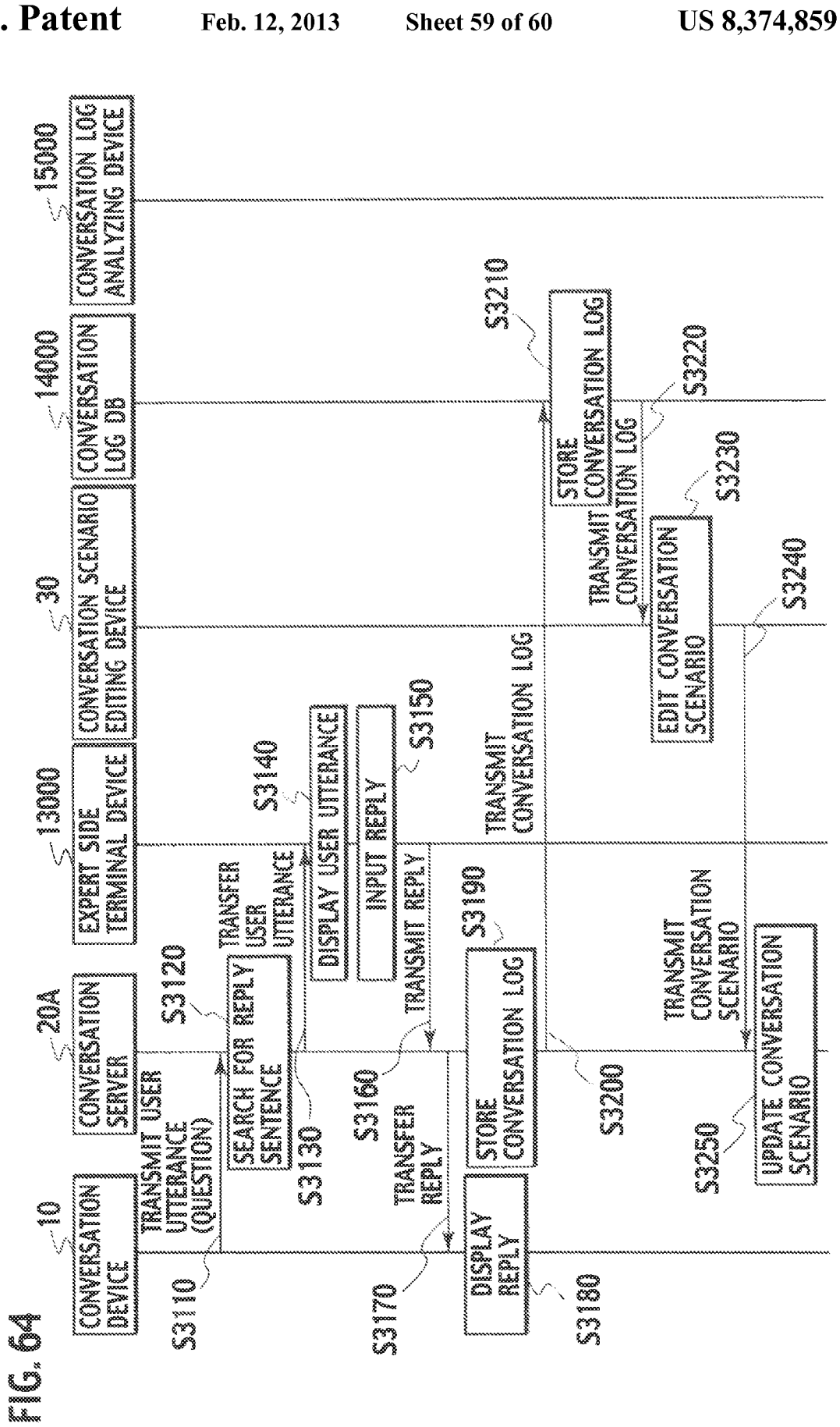
FIG. 64 is a sequence diagram showing an operation example of the customer relations system when the conversation server determines that there are no appropriate replies in the conversation scenario and requests for a reply from an expert side terminal device.

FIG. 64 is a sequence diagram showing an operation example of the customer relations system 10000 when the conversation server 20A determines that there are no appropriate replies in the conversation scenario and requests for a reply from the expert side terminal device 13000.

The user accesses the conversation server 20A through the conversation device 10. After establishing the communication, the user inputs a user utterance (which is assumed to be a certain question in this case as well) to the conversation device 10. The conversation device 10 transmits the user utterance to the conversation server 20A (S3110). Upon receipt of the user utterance, the conversation server 20A searches for a reply sentence as well as operation control information corresponding to the reply sentence on the basis of the conversation scenario 40 stored in the conversation scenario storage unit 22 (S3120). Here, the conversation server 20A is assumed to determine that there are no appropriate replies in the stored conversation scenario 40. The conversation server 20A establishes communication with the expert side terminal device 13000, then transmits the user utterance received from the conversation device 10 in previous Step S3110 (S3130), and requests the expert who stands by the expert side terminal device 13000 to reply to the question which is the user utterance.

Upon receipt of the user utterance, the expert side terminal device 13000 displays the content thereof (displays a text representing the content of the user utterance on a liquid crystal display device, for example) (S3140). Regarding the content of the user utterance, the expert prepares the reply to the question on the basis of his own knowledge or by making reference to a database which is prepared in advance, and inputs the reply to the expert side terminal device 13000 (S3150). When the reply is inputted, the expert side terminal device 13000 transmits the reply as data to the conversation server 20A (S3160).

Upon receipt of the data representing the reply from the expert side terminal device 13000, the conversation server 20A transmits the received reply to the conversation device 10 (S3170). The conversation device 10 displays the received reply sentence and thereby provides the user with the content of the reply (S3180). The user obtains the reply to the question out of the content of the reply.

Meanwhile, the conversation server 20A acquires the user utterance and the response as the conversation log (S3190) and transmits this conversation log to the conversation log DB 14000 (S3200). The conversation log DB 14000 stores the received conversation log (S3210).

Thereafter, the conversation log DB 14000 transmits the conversation log that is transmitted in Step S3200, that is, the conversation log including the response transmitted from the expert side terminal device 13000 and the user utterance (the question) corresponding to the reply to the conversation scenario editing device 30 (S3220). Upon receipt of the conversation log, the conversation scenario editing device 30 generates the conversation scenario on the basis of the conversation log (S3230). Here, generation of this conversation scenario 40 may be conducted by an operator of the conversation scenario editing device 30, or alternatively by installing an automatic editing program on the conversation scenario editing device 30 and causing the conversation scenario editing device 30 to generate the conversation scenario in accordance with this automatic editing program.

The conversation scenario editing device 30 transmits the conversation scenario 40 generated in precedent step S3230 to the conversation server 20A (S3240). Upon receipt of the conversation scenario 40, the conversation server 20A stores the received conversation scenario 40 in its conversation scenario storage device 22 and updates the conversation scenario (S3250). In this way, when a question similar to the user utterance transmitted in Step S3110 is accepted again, the conversation serve 20A can extract the reply sentence and the operation control information from the conversation scenario 40 so as to provide the user with the appropriate reply without requesting the expert to provide the reply.

(8.2.3. Conversation Log Analysis)

Next, an operation example of an analysis of the conversation log will be described.

Figure 65:
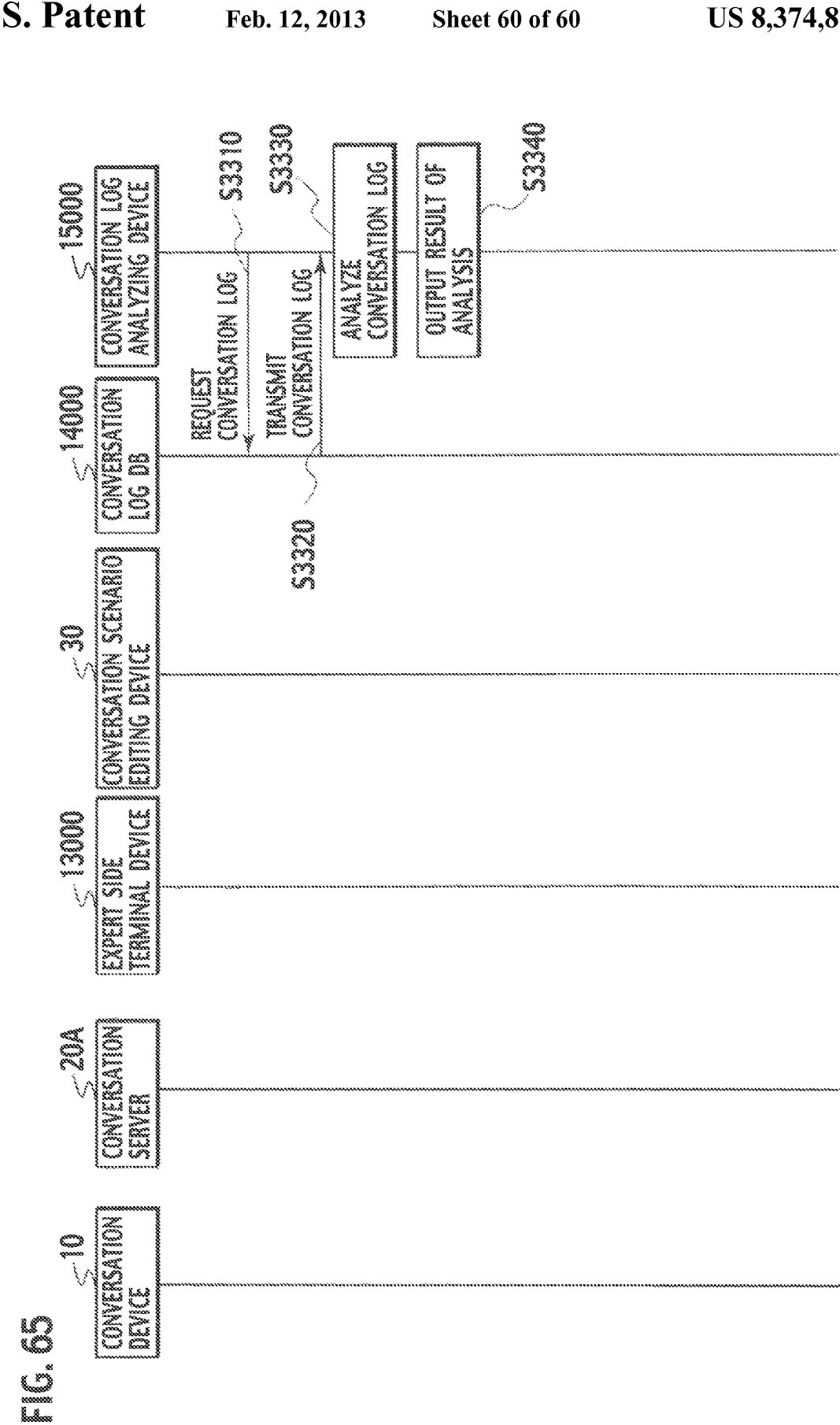
FIG. 65 is a sequence diagram showing an operation example when the customer relations system analyzes a conversation log.

FIG. 65 is a sequence diagram showing an operation example when the customer relations system 10000 analyzes the conversation log.

First, the conversation log analyzing device 15000 sends a request for transmission of the conversation log to the conversation log DB 14000 (S3310). The conversation log DB 14000 transmits the conversation log to the conversation log analyzing device 15000 (S3320). The conversation log analyzing device 15000 subjects the received conversation log to analytical processing (S3330) and outputs a result of analysis (S3340). The result of analysis is utilized as information valuable for marketing interests of users, reactions of users depending on attributes, and so forth.

Now, description of the operations of the customer relations system 10000 has been completed.

Although the embodiments of the present invention have been described hereinabove, the embodiments are only showing specific examples, and do not particularly limit the present invention. Accordingly, the specific configuration of each means or the like can be modified in design appropriately. In addition, the effects described in the embodiments of the present invention are only listing the most preferable effects that can arise from the present invention. For this reason, the effects produced by the present invention are not limited to those described in the embodiments of the present invention.

In addition, in the foregoing detail description, the characteristic portions of the present invention have been mainly described in order to make the present invention easily understandable. The present invention is not limited to the embodiments described above in the foregoing detail description, and can be applied to other embodiments, and its applicable range is wide. Moreover, the terms and the terminology used in the present specification are used for the purpose of precisely explaining the present invention, and not used for the purpose of limiting interpretations of the present invention. Further, it should be easy for those skilled in the art to contemplate other configurations, systems, methods, etc., which are included in the concept of the present invention, from the concept of the present invention described in the present specification. For this reason, the description of the appended claims must be construed as containing equivalent configurations within a range of not departing from a range of the technical ideas of the present invention. Moreover, the abstract aims to allow the Patent Office, general public office, and engineers who are not familiar with a patent, legal terms and technical terms, and who pertain to the technical field of the present invention, to quickly judge the technical content and essence of the present application with a simple study. Accordingly, the abstract is not intended to limit the scope of the invention that should be assessed from the description of the appended claims. Furthermore, it is desirable that the present invention be interpreted by fully taking already-disclosed literatures and the like into consideration in order to fully understand the object of the present invention and unique effects of the present invention.

What is claimed is:

1. An automatic answering device configured to answer automatically to a user utterance, the automatic answering device comprising:
    an input unit configured to accept a user utterance; and
    an output unit configured to output a reply sentence in a form recognizable by a user, in response to the user utterance accepted by the input unit,
    wherein the reply sentence is determined based on a conversation scenario which is a set of inputted sentences and reply sentences, the inputted sentences each corresponding to a user utterance assumed to be uttered by the user, the reply sentences each being a reply from the automatic answering device to the inputted sentence, and
    data of the conversation scenario have a data structure that enables the inputted sentences and the reply sentences to be expressed in a state transition diagram in which each of the inputted sentences is defined as a morphism and the reply sentence corresponding to the inputted sentence is defined as an object.

2. The automatic answering device according to claim 1, wherein
    the conversation scenario includes a scenario which describes, as a single morphism, an inputted sentence corresponding to all the user utterances other than a user utterance containing a predetermined content, and
    any of inputted sentences corresponding to all the user utterances are linked with any one of the reply sentences in the scenario.

3. The automatic answering device according to claim 1, wherein
    the conversation scenario includes a scenario which describes a silent state of the user as a morphism, and
    an inputted sentence corresponding to a user utterance representing the silent state of the user is linked with any one of the reply sentences in the scenario.

4. The automatic answering device according to claim 1, wherein
    the conversation scenario includes a scenario which describes a composition of a plurality of morphisms as a single morphism, and
    in the scenario, a reply sentence corresponding to a last morphism of the plurality of morphisms is identical to a reply sentence corresponding to the single morphism formed of the composition of the plurality of morphisms.

5. The automatic answering device according to claim 1, wherein
    the conversation scenario includes a scenario which describes a morphism representing a unit element that does not allow transition of the object, and
    in the scenario, an inputted sentence corresponding to a predetermined user utterance is linked with a reply sentence identical to a reply sentence outputted to the user in a precedent session.

6. The automatic answering device according to claim 1, wherein
    the conversation scenario includes a scenario which describes a unit element that does not allow transition of the object, the unit element being formed of a composition of a plurality of morphisms and objects which are coupled to each other in a circulating manner, and
    a closed loop is formed by the inputted sentences and the reply sentences in the scenario.

7. The automatic answering device according to claim 1, further comprising:
    a conversation process unit configured to transmit the user utterance accepted by the input unit, and to receive the reply sentence corresponding to the transmitted user utterance and operation control information which is information describing an operation to be executed corresponding to the reply sentence by the automatic answering device; and
    an operation control unit configured to receive the operation control information from the conversation process unit, and to execute the operation in accordance with the received operation control information.

8. The automatic answering device according to claim 7, further comprising:
    a browser unit configured to receive data of a content, and to allow the user to browse the received content,
    wherein the operation control unit drives the browser unit to execute processing determined by the received operation control information.

9. The automatic answering device according to claim 7, further comprising:
    a telephone unit configured to execute an outgoing call, an incoming call, and a telephone call by way of an Internet protocol telephone,
    wherein the operation control information is information driving the telephone unit to execute connection, continuation, and termination of a telephone call from the user to an opponent, and
    the operation control unit drives the telephone unit to execute processing determined by the received operation control information.

10. The automatic answering device according to claim 7, further comprising:
    a conversation device including the input unit, the output unit, the conversation process unit, and the operation process unit; and
    a conversation server configured to receive the user utterance from the conversation device, to search for and to determine a reply sentence corresponding to the received user utterance on the basis of the conversation scenario, and to transmit the determined reply sentence to the conversation device,
    wherein, when the conversation server determines, as a consequence of a search, that the conversation scenario does not includes a reply sentence corresponding to the user utterance accepted from the user, the conversation server
        transmits the user utterance in order to obtain a reply to the user utterance from an expert,
        receives data of a reply from the expert corresponding to the transmitted user utterance,
        transmits the received data of the reply from the expert to the conversation device,
        transmits a conversation log storing the inputted sentence corresponding to the user utterance, the data of the reply from the expert, and a reply sentence corresponding to the data of the reply from the expert, and
        receives and stores a conversation scenario generated based on the transmitted conversation log.

11. An automatic answering system comprising:
    an automatic answering device configured to answer automatically to a user utterance and to present, to a user, a reply sentence in response to the user utterance determined based on a conversation scenario; and a conversation scenario editing device configured to generate the conversation scenario for the automatic answering device, wherein the conversation scenario is a set of inputted sentences and reply sentences, the inputted sentences each corresponding to a user utterance assumed to be uttered by the user, the reply sentences each being a reply from the automatic answering device to the inputted sentence, and data of the conversation scenario have a data structure that enables the inputted sentences and the reply sentences to be expressed in a state transition diagram in which each of the inputted sentences is defined as a morphism and the reply sentence corresponding to the inputted sentence is defined as an object.

12. The automatic answering system according to claim 11, further comprising:

a conversation server configured to receive the user utterance from the automatic answering device, to determine the reply sentence corresponding to the received inputted sentence on the basis of the conversation scenario generated by the conversation scenario editing device, and to transmit the determined reply sentence to the automatic answering device.

13. The automatic answering system according to claim 12, wherein, when the conversation server determines that the conversation scenario does not includes a reply sentence corresponding to the user utterance accepted from the user, the conversation server transmits the user utterance in order to obtain a reply corresponding to the user utterance from an expert, receives data of a reply from the expert corresponding to the transmitted user utterance, transmits the received data of the reply from the expert to the conversation device, transmits a conversation log storing the inputted sentence corresponding to the user utterance, the data of the reply from the expert, and a reply sentence corresponding to the data of the reply from the expert, and receives and stores a conversation scenario generated based on the transmitted conversation log.

14. The automatic answering system according to claim 13, further comprising:

an expert side terminal device configured to receive the user utterance accepted from the user from the conversation server, to accept the reply from the expert to the received user utterance, and to transmit the data of the reply from the expert to the conversation server; and a conversation log database configured to receive, from the conversation server, the conversation log including the user utterance and the data of the reply from the expert transmitted from the expert side terminal device, and to store the conversation log, wherein the conversation scenario editing device generates the conversation scenario based on the user utterance and the data of the reply from the expert corresponding to the user utterance in the conversation log stored in the conversation log database, and transmits the generated conversation scenario to the conversation server.

* * * * *